(12) United States Patent
Chen et al.

(10) Patent No.: US 11,921,260 B2
(45) Date of Patent: Mar. 5, 2024

(54) LENS ASSEMBLY INCLUDING SIX LENSES OF +−+++−, +−+−+−, OR ++−++−; OR SEVEN LENSES OF+−++−+−, OR +−+++−− REFRACTIVE POWERS

(71) Applicants: Sintai Optical (Shenzhen) Co., Ltd., ShenZhen (CN); Asia Optical Co., Inc., Taichung (TW)

(72) Inventors: Chien-Hung Chen, Taichung (TW); Hsi-Ling Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 121 days.

(21) Appl. No.: 16/548,975

(22) Filed: Aug. 23, 2019

(65) Prior Publication Data
US 2020/0116980 A1    Apr. 16, 2020

(30) Foreign Application Priority Data

Oct. 11, 2018   (CN) .......................... 201811184086.2
Apr. 2, 2019    (CN) .......................... 201910261402.X

(51) Int. Cl.
*G02B 13/00*   (2006.01)
*G02B 9/62*    (2006.01)

(52) U.S. Cl.
CPC ........... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS

| | | | |
|---|---|---|---|
| 9,594,232 B2 | 3/2017 | Chen et al. |
| 10,073,245 B2 | 9/2018 | Park |
| 10,156,702 B2 | 12/2018 | Hsueh et al. |
| 10,310,227 B2 | 6/2019 | Hsu et al. |

(Continued)

FOREIGN PATENT DOCUMENTS

| CN | 203941337 U | 11/2014 |
|---|---|---|
| CN | 204556941 | 8/2015 |

(Continued)

*Primary Examiner* — Wen Huang
(74) *Attorney, Agent, or Firm* — McClure, Qualey & Rodack, LLP

(57) ABSTRACT

A lens assembly includes a first lens, a second lens, a third lens, a fourth lens, a fifth lens, and a sixth lens, wherein the first, second, third, fourth, fifth, and sixth lenses are arranged in order from an object side to an image side along an optical axis. The first lens is a meniscus lens with positive refractive power and includes a convex surface facing the object side and a concave surface facing the image side. The second, third, and fourth lenses are with refractive power. The fifth lens is with positive refractive power and includes a convex surface facing the image side. The sixth lens is with negative refractive power and includes a concave surface facing the image side. The lens assembly satisfies: $3<D_1/T_6<9$; wherein $D_1$ is an effective optical diameter of the convex surface of the first lens and $T_6$ is a thickness of the sixth lens.

12 Claims, 32 Drawing Sheets

(56) References Cited

U.S. PATENT DOCUMENTS

| | | | |
|---|---|---|---|
| 2015/0009578 A1* | 1/2015 | Shinohara | G02B 9/64 |
| | | | 359/708 |
| 2018/0067283 A1 | 3/2018 | Jhang et al. | |
| 2018/0100991 A1 | 4/2018 | Sekine | |
| 2018/0188485 A1* | 7/2018 | Fan | G02B 9/64 |
| 2018/0203208 A1* | 7/2018 | Hsueh | G02B 3/04 |
| 2018/0239115 A1* | 8/2018 | Hsu | G02B 13/0045 |
| 2019/0121099 A1* | 4/2019 | Li | G02B 13/0045 |
| 2019/0170983 A1* | 6/2019 | Li | G02B 13/0045 |
| 2019/0212527 A1* | 7/2019 | Jung | G02B 9/62 |
| 2020/0041765 A1* | 2/2020 | Chen | G02B 9/62 |
| 2020/0041767 A1* | 2/2020 | Peng | G02B 9/62 |
| 2020/0249442 A1* | 8/2020 | You | G02B 9/62 |
| 2021/0048624 A1* | 2/2021 | Liu | G02B 13/0045 |

FOREIGN PATENT DOCUMENTS

| | | |
|---|---|---|
| CN | 106526797 | 3/2017 |
| CN | 107664820 A | 2/2018 |
| CN | 107664821 A | 2/2018 |
| CN | 107817581 A | 3/2018 |
| CN | 107861218 | 3/2018 |
| CN | 108415145 A | 8/2018 |
| CN | 108562997 A | 9/2018 |
| CN | 208636558 U | 3/2019 |
| JP | 2015004842 A | 1/2015 |
| TW | 201602630 | 1/2016 |
| TW | 201723561 | 7/2017 |
| TW | I612324 | 1/2018 |
| TW | 201827883 | 8/2018 |
| TW | 201831945 | 9/2018 |

\* cited by examiner

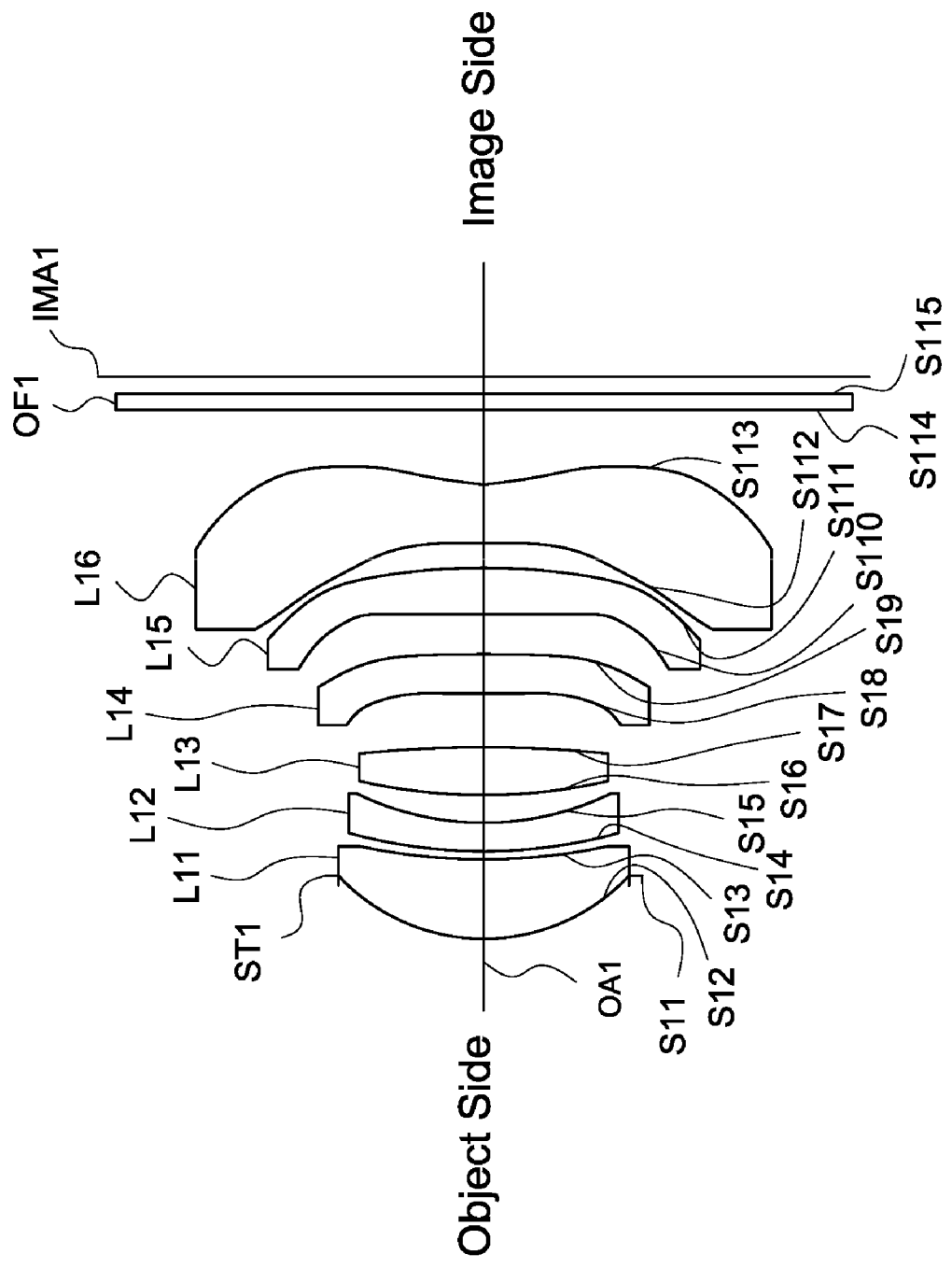

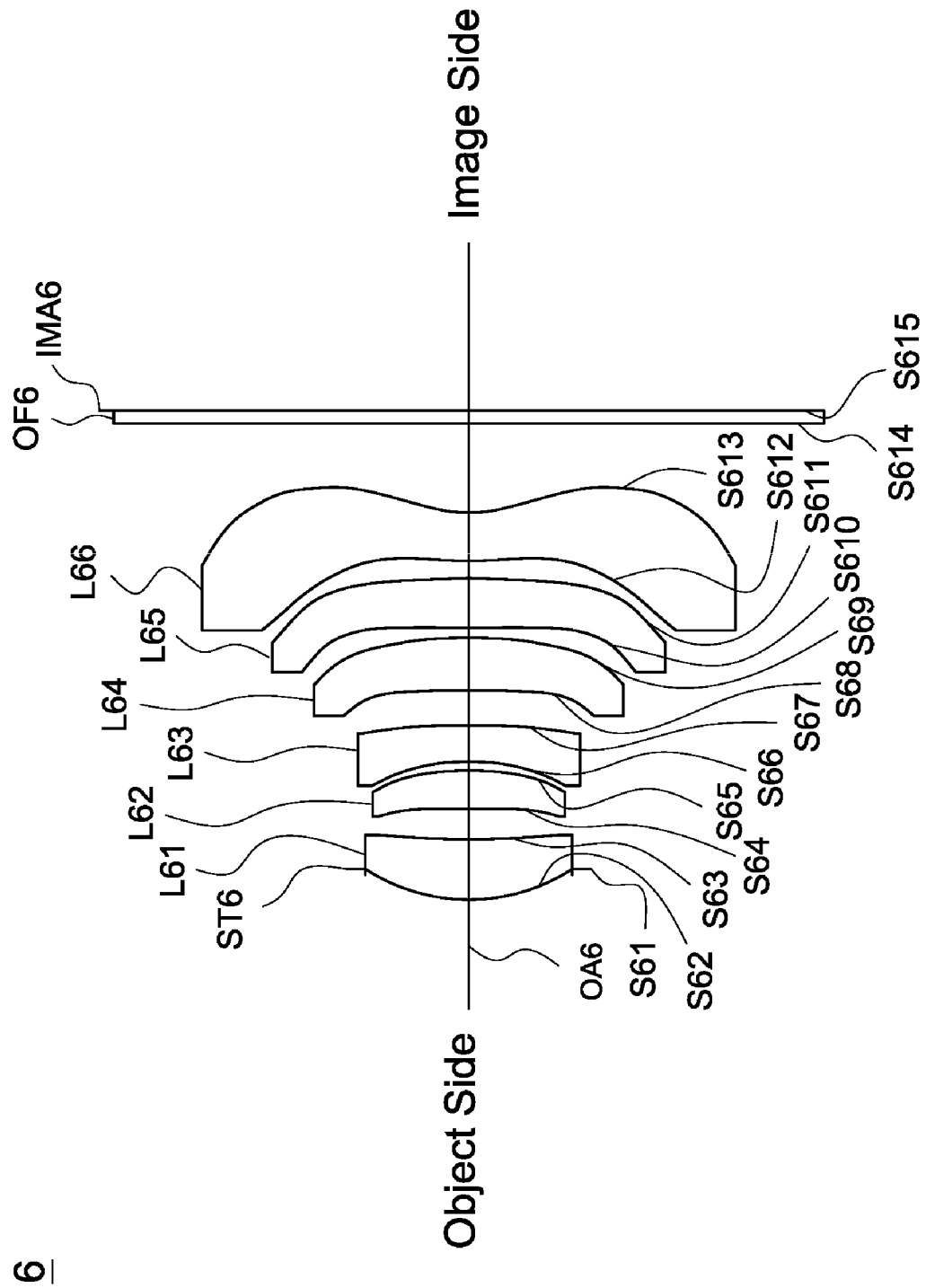

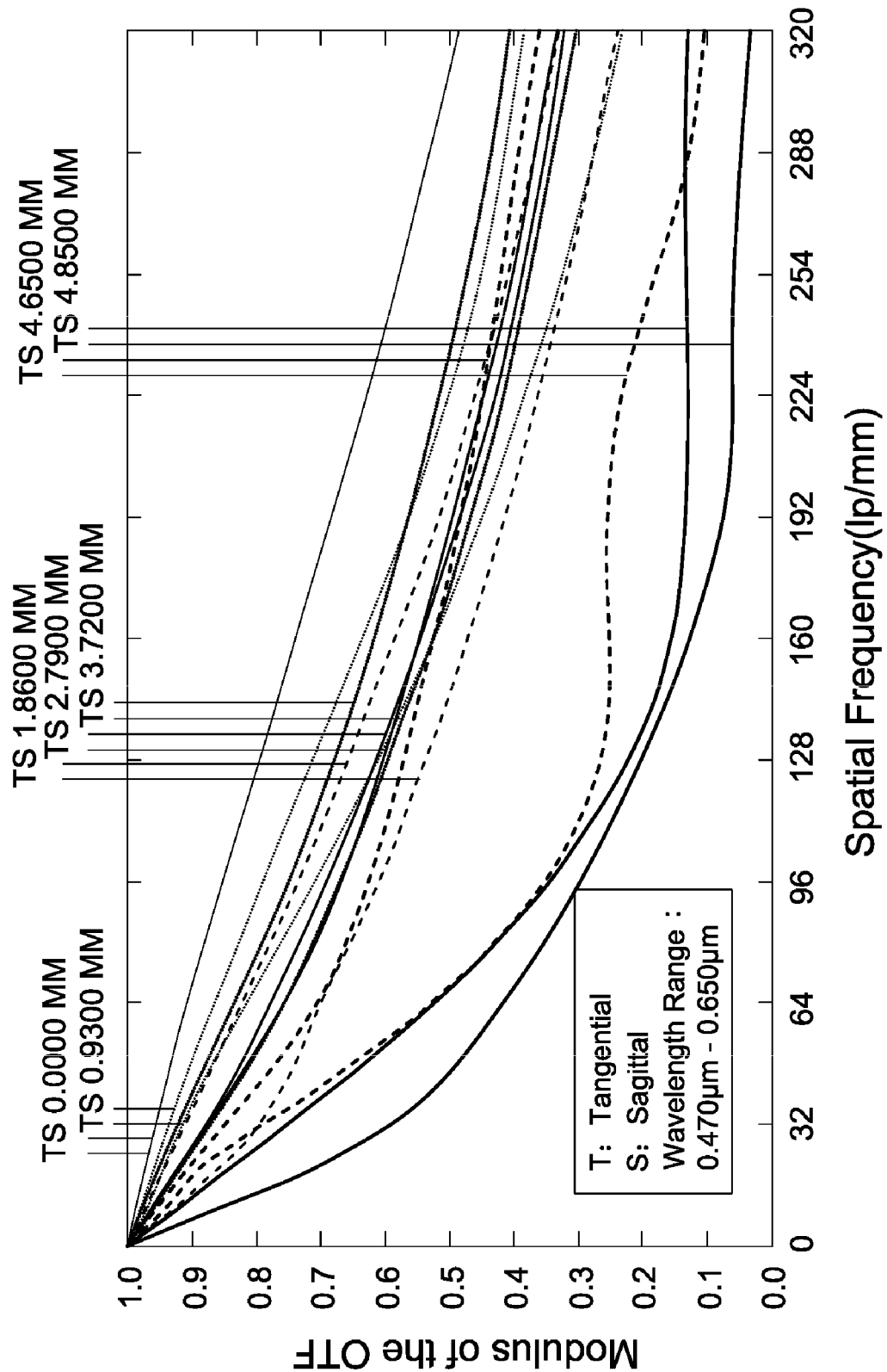

LENS ASSEMBLY INCLUDING SIX LENSES OF +−+++−, +−+−+−, OR ++−++−; OR SEVEN LENSES OF+−++−+−, OR +−+++−−REFRACTIVE POWERS

This application is a Divisional of U.S. patent application Ser. No. 16/242,228, filed Jan. 8, 2019 and entitled "Display devices and methods for manufacturing the same", now U.S. Pat. No. 11,018,089, the entirety of which is incorporated by reference herein.

BACKGROUND OF THE INVENTION

Field of the Invention

Description of the Related Art

The current development trend of a lens assembly is toward small F-number. Additionally, the lens assembly is developed to have miniaturization and high resolution capability in accordance with different application requirements. However, the known lens assembly can't satisfy such requirements. Therefore, the lens assembly needs a new structure in order to meet the requirements of small F-number, miniaturization, and high resolution at the same time.

BRIEF SUMMARY OF THE INVENTION

The invention provides a lens assembly to solve the above problems. The lens assembly of the invention is provided with characteristics of a smaller F-number, a shortened total lens length, a higher resolution, and still has a good optical performance.

The lens assembly in accordance with an exemplary embodiment of the invention includes a first lens, a second lens, a third lens, a fourth lens, a fifth lens, and a sixth lens, wherein the first, second, third, fourth, fifth, and sixth lenses are arranged in order from an object side to an image side along an optical axis. The first lens is a meniscus lens with positive refractive power and includes a convex surface facing the object side and a concave surface facing the image side. The second, third, and fourth lenses are with refractive power. The fifth lens is with positive refractive power and includes a convex surface facing the image side. The sixth lens is with negative refractive power and includes a concave surface facing the image side. The lens assembly satisfies: $3 < D_1/T_6 < 9$; wherein $D_1$ is an effective optical diameter of the convex surface of the first lens and $T_6$ is a thickness of the sixth lens along the optical axis.

In another exemplary embodiment, the second lens is a meniscus lens and the third lens is with positive refractive power and includes a convex surface facing the object side.

In yet another exemplary embodiment, the second lens is with negative refractive power and includes a convex surface facing the object side and a concave surface facing the image side.

In another exemplary embodiment, the lens assembly further includes a seventh lens disposed between the fourth lens and the fifth lens, wherein the seventh lens is with negative refractive power, the fourth lens includes a convex surface facing the object side, the fifth lens further includes a concave surface facing the object side, and the sixth lens further includes a convex surface facing the object side.

In yet another exemplary embodiment, the lens assembly satisfies: $1.2 < f/D_1 < 2.5$; wherein $D_1$ is an effective optical diameter of the convex surface of the first lens and f is an effective focal length of the lens assembly.

In another exemplary embodiment, the lens assembly satisfies: $10 \text{ mm} < (R_{11}+R_{12}+R_{52}+R_{62}) \times ((T_5+T_6)/G_5) < 29 \text{ mm}$; wherein $T_5$ is a thickness of the fifth lens along the optical axis, $T_6$ is a thickness of the sixth lens along the optical axis, $R_{11}$ is a radius of curvature of the convex surface of the first lens, $R_{12}$ is a radius of curvature of the concave surface of the first lens, $R_{52}$ is a radius of curvature of the convex surface of the fifth lens, $R_{62}$ is a radius of curvature of the concave surface of the sixth lens, and $G_5$ is an air interval from the convex surface of the fifth lens to an object side surface of the sixth lens along the optical axis.

In yet another exemplary embodiment, the lens assembly satisfies: $-5 < (f_1-f_6)/(T_5+T_6-R_{62}+R_{52}) < -1$; $-20 \text{ mm} < f \times ((f_1-f_6)/(T_5+T_6-R_{62}+R_{52})) < -5 \text{ mm}$; wherein f is an effective focal length of the lens assembly, $f_1$ is an effective focal length of the first lens, $f_6$ is an effective focal length of the sixth lens, $T_5$ is a thickness of the fifth lens along the optical axis, $T_6$ is a thickness of the sixth lens along the optical axis, $R_{52}$ is a radius of curvature of the convex surface of the fifth lens, and $R_{62}$ is a radius of curvature of the concave surface of the sixth lens.

In another exemplary embodiment, the lens assembly satisfies: $-3.5 < (f_1+f_5+f_6)/(T_5+T_6-R_{62}+R_{52}) < -1.5$; wherein $f_1$ is an effective focal length of the first lens, $f_5$ is an effective focal length of the fifth lens, $f_6$ is an effective focal length of the sixth lens, $T_5$ is a thickness of the fifth lens along the optical axis, $T_6$ is a thickness of the sixth lens along the optical axis, $R_{52}$ is a radius of curvature of the convex surface of the fifth lens, and $R_{62}$ is a radius of curvature of the concave surface of the sixth lens.

In yet another exemplary embodiment, the lens assembly satisfies: $-10 < F \times ((f_1-f_6)/(T_5+T_6-R_{62}+R_{52})) < -3$; wherein F is a F-number of the lens assembly, $f_1$ is an effective focal length of the first lens, $f_6$ is an effective focal length of the sixth lens, $T_5$ is a thickness of the fifth lens along the optical axis, $T_6$ is a thickness of the sixth lens along the optical axis, $R_{52}$ is a radius of curvature of the convex surface of the fifth lens, and $R_{62}$ is a radius of curvature of the concave surface of the sixth lens.

In another exemplary embodiment, the lens assembly satisfies: $1.3 \text{ mm} < (f_1-f_6)/((T_5+T_6)/G_5) < 5 \text{ mm}$; wherein $f_1$ is an effective focal length of the first lens, $f_6$ is an effective focal length of the sixth lens, $T_5$ is a thickness of the fifth lens along the optical axis, $T_6$ is a thickness of the sixth lens along the optical axis, and $G_5$ is an air interval from the convex surface of the fifth lens to an object side surface of the sixth lens along the optical axis.

In yet another exemplary embodiment, the lens assembly satisfies: $10 \text{ mm} < |AAG \times (R_{21}+R_{22})/(R_{21}-R_{22})| < 20 \text{ mm}$; wherein AAG is a total air interval from the concave surface of the first lens to an object side surface of a lens which is closest to the image side along the optical axis, $R_{21}$ is a radius of curvature of an object side surface of the second lens, and $R_{22}$ is a radius of curvature of an image side surface of the second lens.

In another exemplary embodiment, the lens assembly satisfies: $-1.8 \text{ mm} < (R_{52}+R_{62}) \times (R_{31}/f_1) < 0 \text{ mm}$; wherein $f_1$ is an effective focal length of the first lens, $R_{31}$ is a radius of curvature of the convex surface of the third lens, $R_{52}$ is a radius of curvature of the convex surface of the fifth lens, and $R_{62}$ is a radius of curvature of the concave surface of the sixth lens.

In yet another exemplary embodiment, the lens assembly satisfies: $37 \text{ mm} < |f \times (R_{21}+R_{22})/(R_{21}-R_{22})| < 55 \text{ mm}$; $16 < |F \times (R_{21}+R_{22})/(R_{21}-R_{22})| < 25$; wherein f is an effective focal length of the lens assembly, F is a F-number of the lens assembly, $R_{21}$ is a radius of curvature of an object side surface of the second lens, and $R_{22}$ is a radius of curvature of an image side surface of the second lens.

In another exemplary embodiment, the lens assembly satisfies: $0 \text{ mm} < |f_{234}| < 50 \text{ mm}$; $-35 \text{ mm} < (f_1 \times f_6)/(T_1+T_2+T_6) < -6 \text{ mm}$; $-3.5 < (R_{11}+R_{12})/(R_{52}-R_{62}) < -1$; $0.5 < TTL/(R_{62}-R_{52}) < 1.9$; wherein $f_{234}$ is an effective focal length of a combination of the second lens, the third lens, and the fourth lens, $f_1$ is an effective focal length of the first lens, $f_6$ is an effective focal length of the sixth lens, $T_1$ is a thickness of the first lens along the optical axis, $T_2$ is a thickness of the second lens along the optical axis, $T_6$ is a thickness of the sixth lens along the optical axis, $R_{11}$ is a radius of curvature of the convex surface of the first lens, $R_{12}$ is a radius of curvature of the concave surface of the first lens, $R_{52}$ is a radius of curvature of the convex surface of the fifth lens, $R_{62}$ is a radius of curvature of the concave surface of the sixth lens, and TTL is an interval from the convex surface of the first lens to an image plane along the optical axis.

In yet another exemplary embodiment, the second lens is a meniscus lens with negative refractive power and includes a convex surface facing the object side and a concave surface facing the image side, the third lens is a meniscus lens with positive refractive power and includes a convex surface facing the object side and a concave surface facing the image side, the lens assembly further includes a seventh lens disposed between the sixth lens and the image side, wherein the seventh lens is a meniscus lens with negative refractive power and includes a convex surface facing the object side and a concave surface facing the image side.

In another exemplary embodiment, the fourth lens is a meniscus lens with negative refractive power and includes a convex surface facing the object side and a concave surface facing the image side, the fifth lens further includes a concave surface facing the object side, and the sixth lens further includes a concave surface facing the object side.

In yet another exemplary embodiment, the fourth lens is a meniscus lens with positive refractive power and includes a concave surface facing the object side and a convex surface facing the image side, the fifth lens further includes a concave surface facing the object side, and the sixth lens further includes a convex surface facing the object side.

In another exemplary embodiment, the lens assembly satisfies: 4.5 mm<TTL/F<6 mm; 0<$D_1$/TTL<1; wherein TTL is an interval from the convex surface of the first lens to an image plane along the optical axis, F is a F-number of the lens assembly, and $D_1$ is an effective optical diameter of the convex surface of the first lens.

In yet another exemplary embodiment, the lens assembly satisfies: 2<($R_{71}$−$R_{12}$)/$T_7$<6; 8<$f_1$/$T_7$<13; 2<$f_3$/f<3.5; wherein f is an effective focal length of the lens assembly, $f_1$ is an effective focal length of the first lens, $f_3$ is an effective focal length of the third lens, $T_7$ is a thickness of the seventh lens along the optical axis, $R_{12}$ is a radius of curvature of the concave surface of the first lens, and $R_{71}$ is a radius of curvature of the convex surface of the seventh lens.

In another exemplary embodiment, the lens assembly satisfies: −20 mm<f×(($f_1$−$f_6$)/($T_5$+$T_6$−$R_{62}$+$R_{52}$))<−5 mm; 10 mm<|AAG×($R_{21}$+$R_{22}$)/($R_{21}$−$R_{22}$)|<20 mm; 1.3 mm< ($f_1$−$f_6$)/(($T_5$+$T_6$)/$G_5$)<5 mm; −5<($f_1$−$f_6$)/($T_5$+$T_6$−$R_{62}$+$R_{52}$) <−1; wherein f is an effective focal length of the lens assembly, $f_1$ is an effective focal length of the first lens, $f_6$ is an effective focal length of the sixth lens, $T_5$ is a thickness of the fifth lens along the optical axis, $T_6$ is a thickness of the sixth lens along the optical axis, AAG is a total air interval from the concave surface of the first lens to an object side surface of a lens which is closest to the image side along the optical axis, $G_5$ is an air interval from the convex surface of the fifth lens to an object side surface of the sixth lens along the optical axis, $R_{21}$ is a radius of curvature of the convex surface of the second lens, $R_{22}$ is a radius of curvature of the concave surface of the second lens, $R_{52}$ is a radius of curvature of the convex surface of the fifth lens, and $R_{62}$ is a radius of curvature of the concave surface of the sixth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 1 is a lens layout diagram of a lens assembly in accordance with a first embodiment of the invention;

FIG. 11 is a lens layout diagram of a lens assembly in accordance with a sixth embodiment of the invention;

FIG. 14C is a modulation transfer function diagram of the lens assembly in accordance with the ninth embodiment of the invention;

DETAILED DESCRIPTION OF THE INVENTION

Figure 2A:
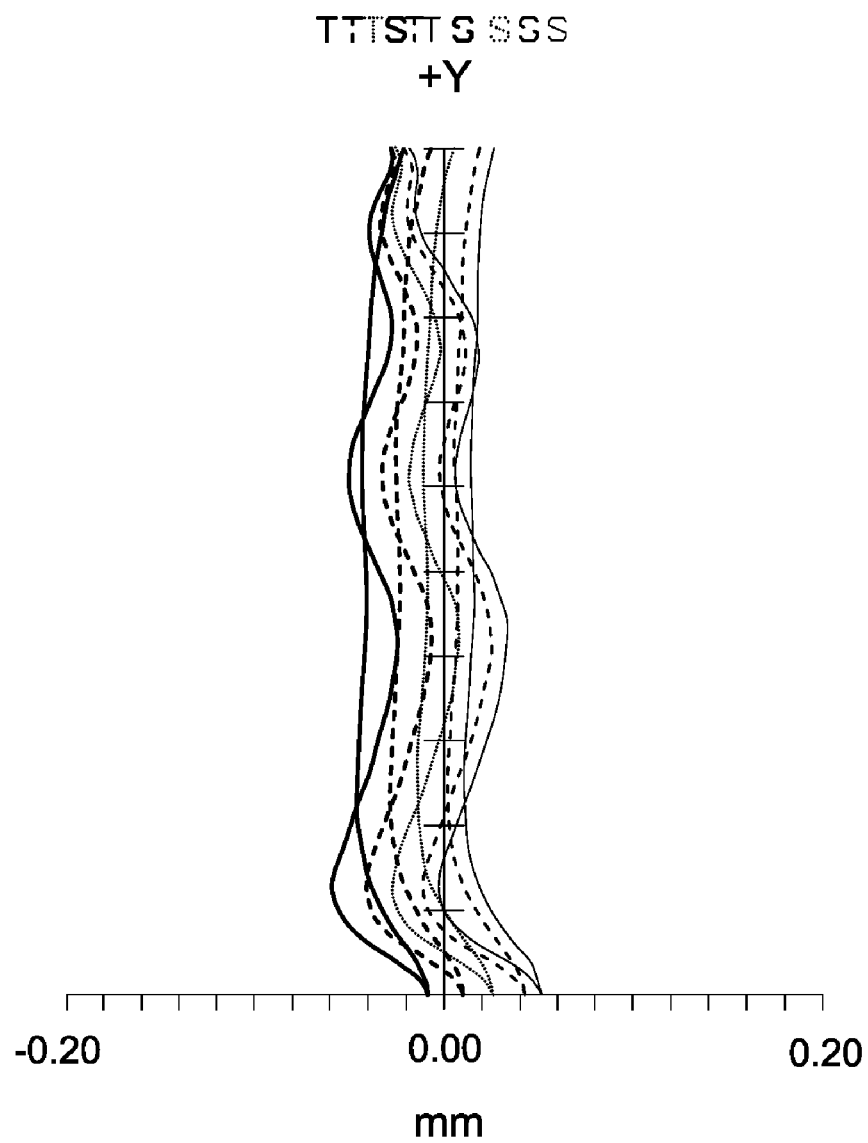
FIG. 2A depicts a field curvature diagram of the lens assembly in accordance with the first embodiment of the invention.

The following description is made for the purpose of illustrating the general principles of the invention and should not be taken in a limiting sense. The scope of the invention is best determined by reference to the appended claims.

Referring to FIG. 1, FIG. 1 is a lens layout diagram of a lens assembly in accordance with a first embodiment of the invention. The lens assembly 1 includes a stop ST1, a first lens L11, a second lens L12, a third lens L13, a fourth lens L14, a fifth lens L15, a sixth lens L16, and an optical filter OF1, all of which are arranged in order from an object side to an image side along an optical axis OA1. In operation, an image of light rays from the object side is formed at an image plane IMA1.

The first lens L11 is a meniscus lens with positive refractive power, wherein the object side surface S12 is a convex surface, the image side surface S13 is a concave surface, and both of the object side surface S12 and image side surface S13 are aspheric surfaces.

The second lens L12 is a meniscus lens with negative refractive power, wherein the object side surface S14 is a convex surface, the image side surface S15 is a concave surface, and both of the object side surface S14 and image side surface S15 are aspheric surfaces.

The third lens L13 is a meniscus lens with positive refractive power, wherein the object side surface S16 is a convex surface, the image side surface S17 is a concave surface, and both of the object side surface S16 and image side surface S17 are aspheric surfaces.

The fourth lens L14 is a meniscus lens with positive refractive power, wherein the object side surface S18 is a convex surface, the image side surface S19 is a concave surface, and both of the object side surface S18 and image side surface S19 are aspheric surfaces.

The fifth lens L15 is a meniscus lens with positive refractive power, wherein the object side surface S110 is a concave surface, the image side surface S111 is a convex surface, and both of the object side surface S110 and image side surface S111 are aspheric surfaces.

The sixth lens L16 is a meniscus lens with negative refractive power, wherein the object side surface S112 is a convex surface, the image side surface S113 is a concave surface, and both of the object side surface S112 and image side surface S113 are aspheric surfaces.

Both of the object side surface S114 and image side surface S115 of the optical filter OF1 are plane surfaces.

In order to maintain excellent optical performance of the lens assembly in accordance with the first embodiment of the invention, the lens assembly 1 satisfies any of the following conditions:

$$3 < D1_1/T1_6 < 9 \tag{1}$$

$$-20 \text{ mm} < f1 \times ((f1_1 - f1_6)/(T1_5 + T1_6 - R1_{62} + R1_{52})) < -5 \text{ mm} \tag{2}$$

$$37 \text{ mm} < |f1 \times (R1_{21} + R1_{22})/(R1_{21} - R1_{22})| < 55 \text{ mm} \tag{3}$$

$$10 \text{ mm} < |AAG1 \times (R1_{21} + R1_{22})/(R1_{21} - R1_{22})| < 20 \text{ mm} \tag{4}$$

$$16 < |F1 \times (R1_{21} + R1_{22})/(R1_{21} - R1_{22})| < 25 \tag{5}$$

$$-1.8 \text{ mm} < (R1_{52} + R1_{62}) \times (R1_{31}/f1_1) < 0 \text{ mm} \tag{6}$$

$$0 \text{ mm} < |f1_{234}| < 50 \text{ mm} \tag{7}$$

$$1.2 < f1/D1_1 < 2.5 \tag{8}$$

$$-35 \text{ mm} < (f1_1 \times f1_6)/(T1_1 + T1_2 + T1_6) < -6 \text{ mm} \tag{9}$$

$$1.3 \text{ mm} < (f1_1 - f1_6)/((T1_5 + T1_6)/G1_5) < 5 \text{ mm} \tag{10}$$

$$10 \text{ mm} < (R1_{11} + R1_{12} + R1_{52} + R1_{62}) \times ((T1_5 + T1_6)/G1_5) < 29 \text{ mm} \tag{11}$$

$$-3.5 < (R1_{11} + R1_{12})/(R1_{52} - R1_{62}) < -1 \tag{12}$$

$$0.5 < TTL1/(R1_{62} - R1_{52}) < 1.9 \tag{13}$$

$$-3.5 < (f1_1 + f1_5 + f1_6)/(T1_5 + T1_6 - R1_{62} + R1_{52}) < -1.5 \tag{14}$$

$$-5 < (f1_1 - f_6)/(T1_5 + T1_6 - R1_{62} + R1_{52}) < -1 \tag{15}$$

$$-10 < F1 \times ((f1_1 - f1_6)/(T1_5 + T1_6 - R1_{62} + R1_{52})) < -3 \tag{16}$$

wherein $f1_1$ is an effective focal length of the first lens L11, $f1_5$ is an effective focal length of the fifth lens L15, $f1_6$ is an effective focal length of the sixth lens L16, $f1_{234}$ is an effective focal length of an combination of the second lens L12, the third lens L13, and the fourth lens L14, f1 is an effective focal length of the lens assembly 1, $R1_{11}$ is a radius of curvature of the object side surface S12 of the first lens L11, $R1_{12}$ is a radius of curvature of the image side surface S13 of the first lens L11, $R1_{21}$ is a radius of curvature of the object side surface S14 of the second lens L12, $R1_{22}$ is a radius of curvature of the image side surface S15 of the second lens L12, $R1_{31}$ is a radius of curvature of the object side surface S16 of the third lens L13, $R1_{52}$ is a radius of curvature of the image side surface S111 of the fifth lens L15, $R1_{62}$ is a radius of curvature of the image side surface S113 of the sixth lens L16, $D1_1$ is an effective optical diameter of the object side surface S12 of the first lens L11, AAG1 is a total air interval from the image side surface S13 of the first lens L11 to the object side surface S112 of the lens which is closest to the image side along the optical axis OA1, F1 is a F-number of the lens assembly 1, $T1_1$ is a thickness of the first lens L11 along the optical axis OA1, $T1_2$ is a thickness of the second lens L12 along the optical axis OA1, $T1_5$ is a thickness of the fifth lens L15 along the optical axis OA1, $T1_6$ is a thickness of the sixth lens L16 along the optical axis OA1, $G1_5$ is an air interval from the image side surface S111 of the fifth lens L15 to the object side surface S112 of the sixth lens L16 along the optical axis OA1, and TTL is an interval from the object side surface S12 of the first lens L11 to the image plane IMA1 along the optical axis OA1.

By the above design of the lenses, stop ST1, and satisfies any one of the conditions (1)-(16), the lens assembly 1 is provided with an effective shortened total lens length, an effective decreased F-number, an effective decreased weight, an effective increased resolution, an effective corrected chromatic aberration, and an effective corrected aberration.

In order to achieve the above purposes and effectively enhance the optical performance, the lens assembly 1 in accordance with the first embodiment of the invention is provided with the optical specifications shown in Table 1, which include the effective focal length, F-number, total lens length, field of view, radius of curvature of each lens surface, thickness between adjacent surface, refractive index of each lens, and Abbe number of each lens.

TABLE 1

Effective Focal Length = 4.2 mm F-number = 1.75
Total Lens Length = 4.67 mm Field of View = 74.55 Degrees

| Surface Number | Radius of Curvature (mm) | Thickness (mm) | Nd | Vd | Remark |
|---|---|---|---|---|---|
| S11 | ∞ | −0.52294 | | | Stop ST1 |
| S12 | 1.563816 | 0.675953 | 1.543915 | 55.9512 | The First Lens L11 |
| S13 | 3.365206 | 0.046823 | | | |
| S14 | 3.142057 | 0.23263 | 2.00178 | 19.31 | The Second Lens L12 |
| S15 | 2.623577 | 0.256374 | | | |
| S16 | 5.850165 | 0.379348 | 1.543915 | 55.9512 | The Third Lens L13 |
| S17 | 186.9579 | 0.442625 | | | |
| S18 | 198.5873 | 0.335275 | 1.66059 | 20.40123 | The Fourth Lens L14 |
| S19 | 200.2454 | 0.323511 | | | |
| S110 | −10.8852 | 0.406006 | 1.543915 | 55.9512 | The Fifth Lens L15 |
| S111 | −2.09262 | 0.186813 | | | |
| S112 | 21.30867 | 0.483992 | 1.543915 | 55.9512 | The Sixth Lens L16 |
| S113 | 1.247064 | 0.65 | | | |
| S114 | ∞ | 0.11 | 1.5168 | 64.16734 | Optical Filter OF1 |
| S115 | ∞ | 0.14592 | | | |

The aspheric surface sag z of each lens in table 1 can be calculated by the following formula:

$$z = ch^2 / \{1 + [1 - (k+1)c^2 h^2]^{1/2}\} + Ah^4 + Bh^6 + Ch^8 + Dh^{10} + Eh^{12} + Fh^{14} + Gh^{16} + Hh^{18} + Ih^{20} + Jh^3 + Kh^5 + Lh^7 + Mh^9 \qquad (25)$$

where c is curvature, h is the vertical distance from the lens surface to the optical axis, k is conic constant and A, B, C, D, E, F, G, H, I, J, K, L and M are aspheric coefficients.

In the first embodiment, the conic constant k, the aspheric coefficients A, B, C, D, E, F, G of each surface are shown in Table 2, and the other aspheric coefficients H, I, J, K, L, M are equal to 0.

TABLE 2

| Surface Number | k | A / E | B / F | C / G | D |
|---|---|---|---|---|---|
| S12 | −4.97001 | 0.15369838 | −0.074385811 | 0.043195945 | −0.016805873 |
| | | 0.004995695 | −0.000757271 | −0.000858983 | |
| S13 | −31.6477 | −0.10064785 | 0.23399098 | −0.27208014 | 0.16123458 |
| | | −0.045325381 | 0.002793569 | 0.000272295 | |
| S14 | −13.2031 | −0.11719647 | 0.30118067 | −0.34364279 | 0.20561232 |
| | | −0.05228702 | 0.006672719 | −0.002839692 | |
| S15 | 0.557025 | −0.063224648 | 0.20285807 | −0.24185234 | 0.17078357 |
| | | −0.054655375 | 0.016179998 | 0.001416727 | |
| S16 | 3.170478 | −0.03096829 | 0.056174132 | −0.11939153 | 0.16881894 |
| | | −0.14900069 | 0.053540513 | 0.018751924 | |
| S17 | 7987.518 | −0.038768648 | −0.005844849 | 0.030193654 | −0.092493516 |
| | | 0.10769043 | −0.089656968 | 0.043850952 | |
| S18 | 27744.22 | 0.15004574 | −0.030394027 | −0.011577591 | −0.10923485 |
| | | −0.002640372 | 0.088060362 | −0.20534379 | |
| S19 | 16413.82 | −0.091107797 | −0.026295122 | 0.045421882 | −0.035705859 |
| | | 0.01381037 | −0.000676153 | −0.000545724 | |
| S110 | −4270.48 | 0.12629012 | −0.22372003 | 0.16762013 | −0.10573508 |
| | | 0.39369773 | −7.42E−03 | 0.000593527 | |
| S111 | −26.194 | 0.075790498 | −0.061728191 | 0.007926949 | −0.000814489 |
| | | 8.12E−04 | −2.08E−04 | 1.69628E−05 | |
| S112 | −664.314 | −0.26336188 | 0.12416449 | −0.03317444 | 0.006441507 |
| | | −0.000924982 | 8.74E−05 | −4.15E−06 | |
| S113 | −8.70199 | −0.12006548 | 0.057510197 | −0.020212968 | 0.004389072 |
| | | −5.64E−04 | 3.77E−05 | −9.65E−07 | |

Table 3 shows the parameters and condition values for conditions (1)-(16) in accordance with the first embodiment of the invention. As can be seen from Table 3, the lens assembly 1 of the first embodiment satisfies the conditions (1)-(16).

TABLE 3

| | | | | | |
|---|---|---|---|---|---|
| $fl_1$ | 4.7245 mm | $fl_5$ | 4.6687 mm | $fl_6$ | −2.4469 mm |
| $fl_{234}$ | 25.672 mm | $fl$ | 4.2 mm | $R1_{11}$ | 1.563816 mm |
| $R1_{12}$ | 3.3652 mm | $R1_{21}$ | 3.1421 mm | $R1_{22}$ | 2.623577 mm |
| $R1_{31}$ | 5.8502 mm | $R1_{52}$ | −2.0925 mm | $R1_{62}$ | 1.247064 mm |
| $D1_1$ | 2.4 mm | AAG1 | 1.2561 mm | F1 | 1.75 |
| $T1_1$ | 0.676 mm | $T1_2$ | 0.2326 mm | $T1_5$ | 0.406006 mm |
| $T1_6$ | 0.484 mm | $G1_5$ | 0.1868 mm | TTL1 | 4.67 mm |
| $D1_1/T1_6$ | 4.96 | $fl/D1_1$ | 1.75 | | |
| $fl \times ((fl_1 - fl_6)/(T1_5 + T1_6 - R1_{62} + R1_{52}))$ | | | | | −12.30 mm |
| $\|fl \times (R1_{21} + R1_{22})/(R1_{21} - R1_{22})\|$ | | | | | 46.71 mm |
| $\|AAG1 \times (R1_{21} + R1_{22})/(R1_{21} - R1_{22})\|$ | | | | | 13.97 mm |
| $\|F1 \times (R1_{21} + R1_{22})/(R1_{21} - R1_{22})\|$ | | | | | 19.46 |
| $(R1_{52} + R1_{62}) \times (R1_{31}/fl_1)$ | | | | | −1.05 mm |
| $(fl_1 \times fl_6)/(T1_1 + T1_2 + T1_6)$ | | | | | −8.30 mm |
| $(fl_1 - fl_6)/((T1_5 + T1_6)/G1_5)$ | | | | | 1.51 mm |
| $(R1_{11} + R1_{12} + R1_{52} + R1_{62}) \times ((T1_5 + T1_6)/G1_5)$ | | | | | 19.45 mm |
| $(R1_{11} + R1_{12})/(R1_{52} - R1_{62})$ | | | | | −1.48 |
| $TTL1/(R1_{62} - R1_{52})$ | | | | | 1.40 |
| $(fl_1 + fl_5 + fl_6)/(T1_5 + T1_6 - R1_{62} + R1_{52})$ | | | | | −2.84 |
| $(fl_1 - fl_6)/(T1_5 + T1_6 - R1_{62} + R1_{52})$ | | | | | −2.93 |
| $F1 \times ((fl_1 - fl_6)/(T1_5 + T1_6 - R1_{62} + R1_{52}))$ | | | | | −5.12 |

Figure 2B:
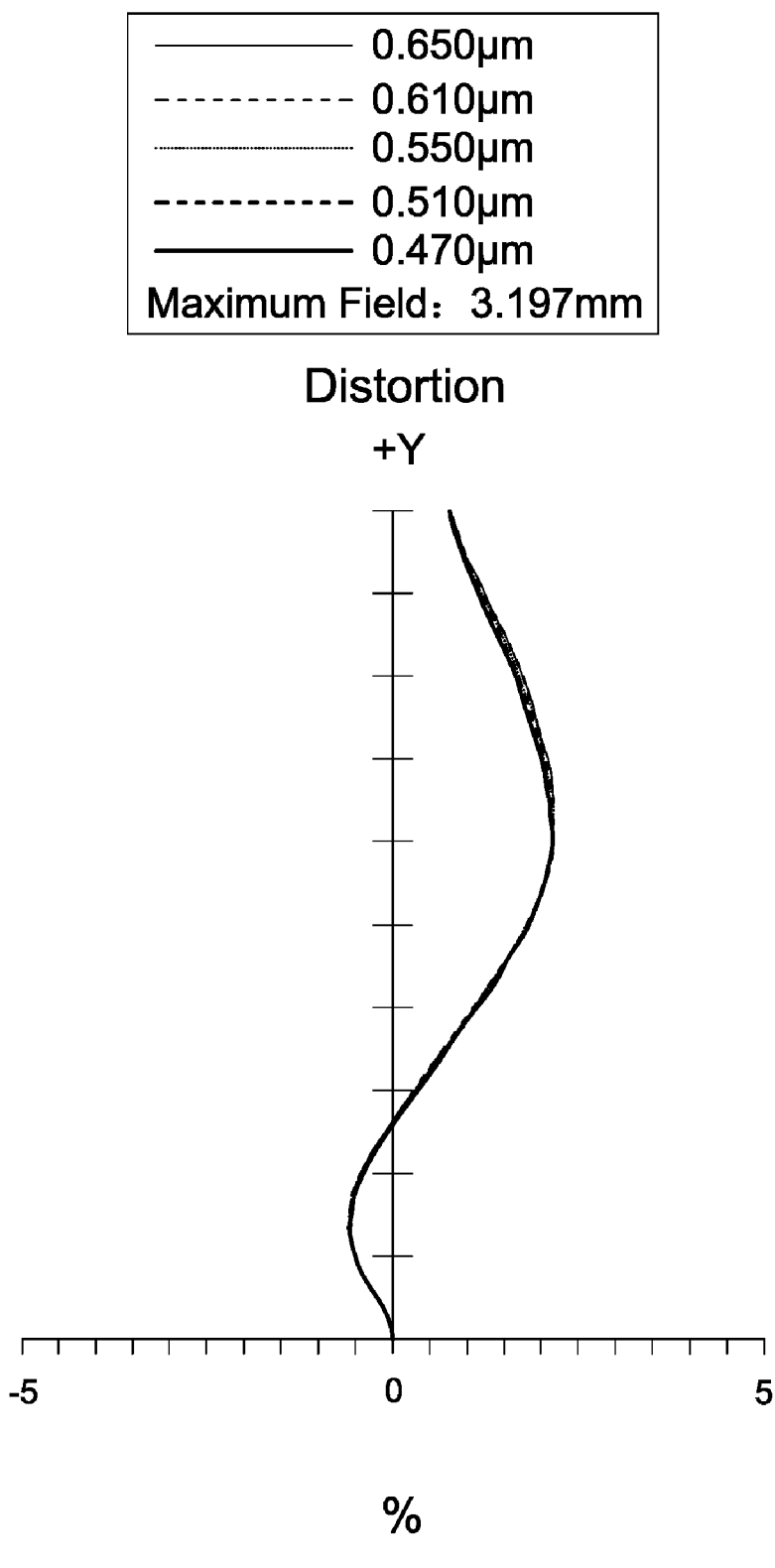
FIG. 2B is a distortion diagram of the lens assembly in accordance with the first embodiment of the invention.
Figure 2C:
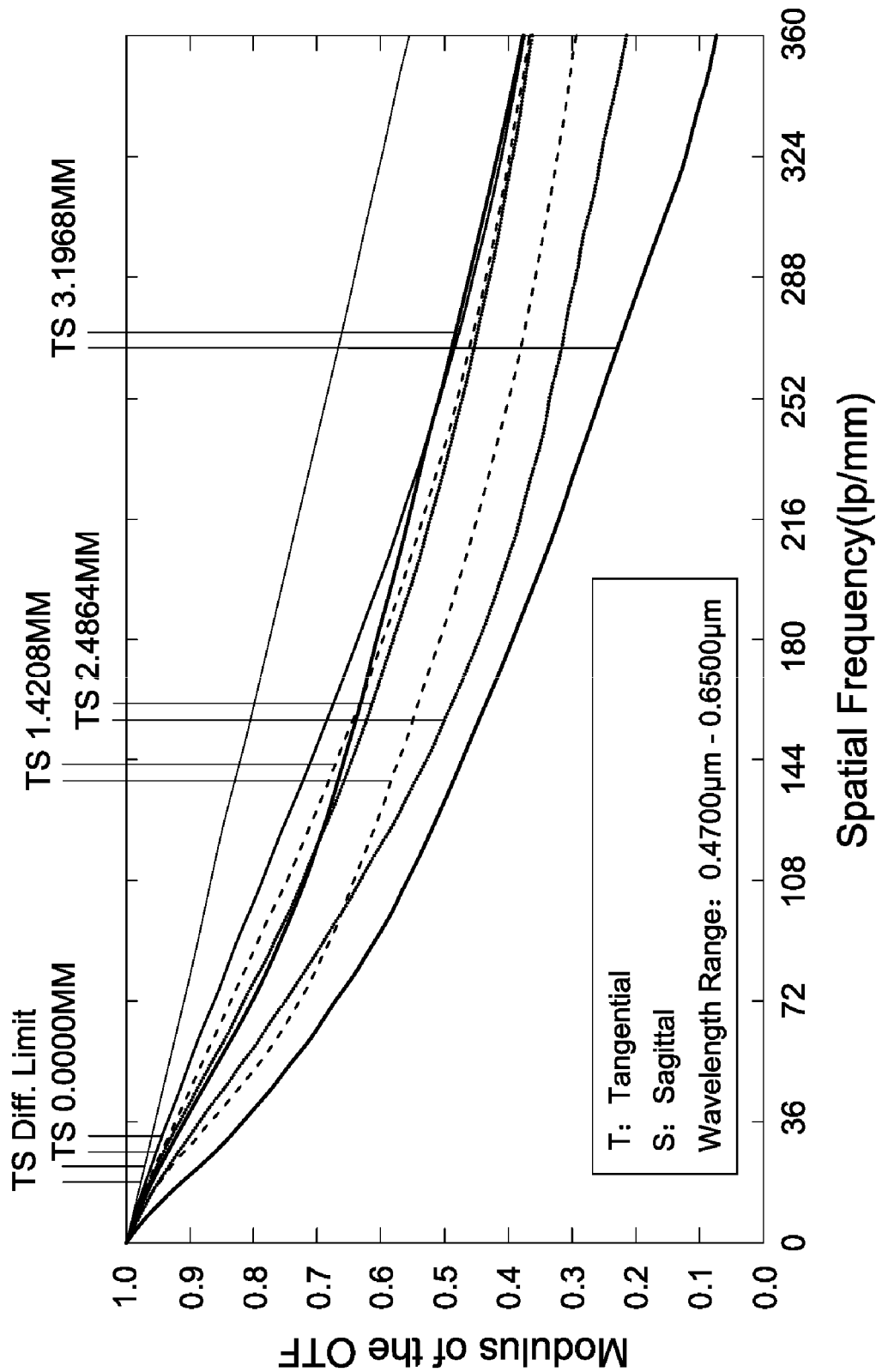
FIG. 2C is a modulation transfer function diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a field curvature diagram of the lens assembly 1 in accordance with the first embodiment of the invention, FIG. 2B shows a distortion diagram of the lens assembly 1 in accordance with the first embodiment of the invention, and FIG. 2C shows a modulation transfer function diagram of the lens assembly 1 in accordance with the first embodiment of the invention.

It can be seen from FIG. 2A that the field curvature of tangential direction and sagittal direction in the lens assembly 1 of the first embodiment ranges from −0.06 mm to 0.06 mm for the wavelength of 0.470 μm, 0.510 μm, 0.550 μm, 0.610 μm, and 0.650 μm.

It can be seen from FIG. 2B (the five lines in the figure almost coincide to appear as if a signal line) that the distortion in the lens assembly 1 of the first embodiment ranges from −1.0% to 2.5% for the wavelength of 0.470 μm, 0.510 μm, 0.550 μm, 0.610 μm, and 0.650 μm.

It can be seen from FIG. 2C that the modulation transfer function of tangential direction and sagittal direction in the lens assembly 1 of the first embodiment ranges from 0.07 to 1.0 wherein the wavelength ranges from 0.4700 μm to 0.6500 μm, the fields respectively are 0.0000 mm, 1.4208 mm, 2.4864 mm, and 3.1968 mm, and the spatial frequency ranges from 0 lp/mm to 360 lp/mm.

It is obvious that the field curvature and the distortion of the lens assembly 1 of the first embodiment can be corrected effectively, and the resolution of the lens assembly 1 of the first embodiment can meet the requirement. Therefore, the lens assembly 1 of the first embodiment is capable of good optical performance.

Figure 3:
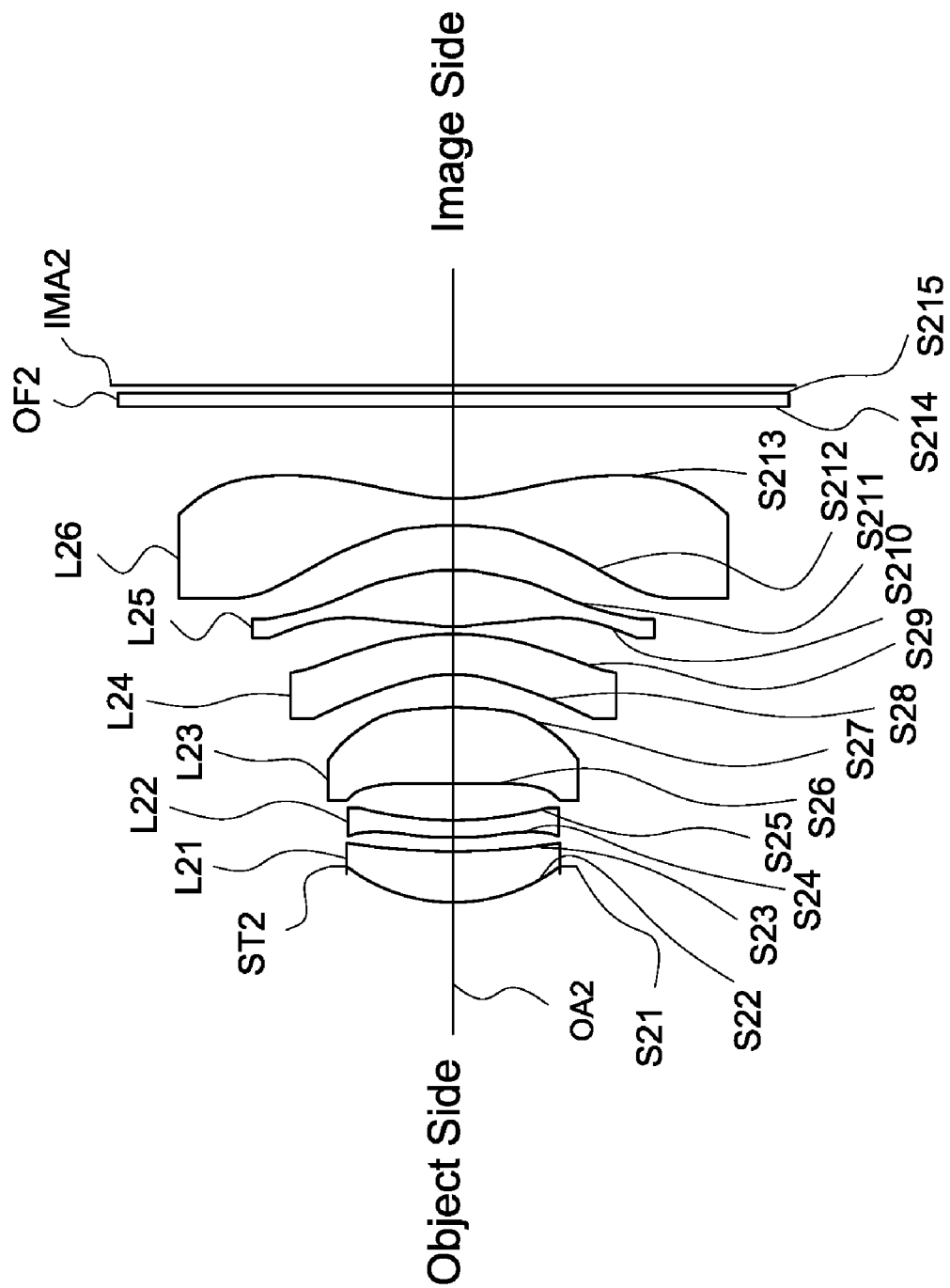
FIG. 3 is a lens layout diagram of a lens assembly in accordance with a second embodiment of the invention.

Referring to FIG. 3, FIG. 3 is a lens layout diagram of a lens assembly in accordance with a second embodiment of the invention. The lens assembly 2 includes a stop ST2, a first lens L21, a second lens L22, a third lens L23, a fourth lens L24, a fifth lens L25, a sixth lens L26, and an optical filter OF2, all of which are arranged in order from an object side to an image side along an optical axis OA2. In operation, an image of light rays from the object side is formed at an image plane IMA2.

The first lens L21 is a meniscus lens with positive refractive power, wherein the object side surface S22 is a convex surface, the image side surface S23 is a concave surface, and both of the object side surface S22 and image side surface S23 are aspheric surfaces.

The second lens L22 is a meniscus lens with negative refractive power, wherein the object side surface S24 is a convex surface, the image side surface S25 is a concave surface, and both of the object side surface S24 and image side surface S25 are aspheric surfaces.

The third lens L23 is a biconvex lens with positive refractive power, wherein the object side surface S26 is a convex surface, the image side surface S27 is a convex surface, and both of the object side surface S26 and image side surface S27 are aspheric surfaces.

The fourth lens L24 is a meniscus lens with negative refractive power, wherein the object side surface S28 is a concave surface, the image side surface S29 is a convex surface, and both of the object side surface S28 and image side surface S29 are aspheric surfaces.

The fifth lens L25 is a biconvex lens with positive refractive power, wherein the object side surface S210 is a convex surface, the image side surface S211 is a convex surface, and both of the object side surface S210 and image side surface S211 are aspheric surfaces.

The sixth lens L26 is a biconcave lens with negative refractive power, wherein the object side surface S212 is a concave surface, the image side surface S213 is a concave surface, and both of the object side surface S212 and image side surface S213 are aspheric surfaces.

Both of the object side surface S214 and image side surface S215 of the optical filter OF2 are plane surfaces.

In order to maintain excellent optical performance of the lens assembly in accordance with the second embodiment of the invention, the lens assembly 2 satisfies any one of the conditions (1)-(16), wherein the definition for all of the parameters in the second embodiment is the same as that of in the first embodiment, and is not described here again.

By the above design of the lenses, stop ST2, and satisfies any one of the conditions (1)-(16), the lens assembly 2 is provided with an effective shortened total lens length, an effective decreased F-number, an effective decreased weight, an effective increased resolution, an effective corrected chromatic aberration, and an effective corrected aberration.

In order to achieve the above purposes and effectively enhance the optical performance, the lens assembly 2 in accordance with the second embodiment of the invention is provided with the optical specifications shown in Table 4, which include the effective focal length, F-number, total lens length, field of view, radius of curvature of each lens surface, thickness between adjacent surface, refractive index of each lens, and Abbe number of each lens.

TABLE 4

Effective Focal Length = 3.62 mm F-number = 1.75
Total Lens Length = 4.98 mm Field of View = 83.98 Degrees

| Surface Number | Radius of Curvature (mm) | Thickness (mm) | Nd | Vd | Remark |
|---|---|---|---|---|---|
| S21 | ∞ | −0.3359 | | | Stop ST2 |
| S22 | 1.920542 | 0.488408 | 1.543915 | 55.9512 | The First Lens L21 |
| S23 | 4.274104 | 0.132819 | | | |
| S24 | 2.07469 | 0.159749 | 1.66059 | 20.40123 | The Second Lens L22 |
| S25 | 1.792898 | 0.356171 | | | |
| S26 | 20.68135 | 0.74306 | 1.543915 | 55.9512 | The Third Lens L23 |
| S27 | −2.83887 | 0.315431 | | | |
| S28 | −1.45191 | 0.398051 | 2.00178 | 19.32 | The Fourth Lens L24 |
| S29 | −2.38764 | 0.073708 | | | |
| S210 | 2.176731 | 0.539143 | 1.543915 | 55.9512 | The Fifth Lens L25 |
| S211 | −2.31732 | 0.445523 | | | |
| S212 | −2.65301 | 0.255841 | 1.543915 | 55.9512 | The Sixth Lens L26 |
| S213 | 1.986388 | 0.9 | | | |
| S214 | ∞ | 0.11 | 1.5168 | 64.16734 | Optical Filter OF2 |
| S215 | ∞ | 0.071032 | | | |

The definition of aspheric surface sag z of each lens in table 4 is the same as that of in Table 1.

In the second embodiment, the conic constant k and the aspheric coefficients A, B, C, D, E, F, G of each surface are shown in Table 5, and the other aspheric coefficients H, I, J, K, L, M are equal to 0.

TABLE 5

| Surface Number | k | A<br>E | B<br>F | C<br>G | D |
|---|---|---|---|---|---|
| S22 | 0 | 0.003580146<br>−0.16330368 | 0.034970556<br>0.085618736 | −0.085002583<br>−0.018718433 | 0.16927152 |
| S23 | 0 | −0.19873322<br>−0.35787177 | 0.46910847<br>0.00788197 | −0.75692886<br>0.014640282 | 0.76811177 |
| S24 | 0 | −0.51882584<br>−0.34977511 | 0.70118687<br>0.040310318 | −0.78144789<br>0.002792297 | 0.65653672 |
| S25 | −10.4304 | −0.19020316<br>−0.049610226 | 0.2340826<br>−0.027817133 | −0.13911807<br>0.030272205 | 0.069376414 |
| S26 | 0 | −0.074796467<br>−0.084169925 | −0.079908635<br>0.077005883 | 0.025760841<br>−0.036097769 | 0.01962782 |
| S27 | 0 | 0.042479211<br>0.046799286 | −0.31654219<br>−0.013602644 | 0.28532777<br>0.001317115 | −0.14223394 |
| S28 | 0 | 0.38858205<br>0.086918083 | −0.65680929<br>−0.014599115 | 0.65281795<br>0.001951501 | −0.32147688 |
| S29 | −0.09465 | 0.10362476<br>0.013318731 | −0.17747735<br>−0.001416595 | 0.15153189<br>4.54397E−05 | −0.061921546 |
| S210 | −17.0307 | −0.097901977<br>0.00067359 | 0.032492457<br>2.25E−04 | −0.000401072<br>−4.44267E−05 | −0.004394774 |
| S211 | 0 | 0.008633402<br>−3.09E−05 | 0.008207492<br>−1.38E−06 | 0.001085566<br>1.1745E−06 | −0.000166415 |
| S212 | 0 | −0.03955554<br>−6.09639E−06 | 0.015582281<br>7.89E−08 | 0.000139515<br>2.73E−07 | −0.000180389 |
| S213 | −7.854 | −0.048402329<br>−2.59E−06 | 0.013831356<br>−1.24E−06 | −0.002546696<br>8.33E−08 | 0.000219393 |

Table 6 shows the parameters and condition values for conditions (1)-(16) in accordance with the second embodiment of the invention. As can be seen from Table 6, the lens assembly 2 of the second embodiment satisfies the conditions (1)-(16).

TABLE 6

| | | | | | |
|---|---|---|---|---|---|
| $f2_1$ | 5.9531 mm | $f2_5$ | 2.1478 mm | $f2_6$ | −2.0418 mm |
| $f22_{34}$ | −26.2793 mm | f2 | 3.62 mm | $R2_{11}$ | 1.920542 mm |
| $R2_{12}$ | 4.274104 mm | $R2_{21}$ | 2.07469 mm | $R2_{22}$ | 1.792898 mm |
| $R2_{31}$ | 20.68135 mm | $R2_{52}$ | −2.31732 mm | $R2_{62}$ | 1.986388 mm |
| $D2_1$ | 2.068 mm | AAG2 | 1.323652 mm | F2 | 1.75 |

TABLE 6-continued

| | | | | | |
|---|---|---|---|---|---|
| $T2_1$ | 0.488408 mm | $T2_2$ | 0.159749 mm | $T2_5$ | 0.539143 mm |
| $T2_6$ | 0.255841 mm | $G2_5$ | 0.445523 mm | TTL2 | 4.98 mm |
| $D2_1/T2_6$ | 8.08 | $f2/D2_1$ | 1.75 | | |
| $f2 \times ((f2_1 - f2_6)/(T2_5 + T2_6 - R2_{62} + R2_{52}))$ | | | | | −8.25 mm |
| $|f2 \times (R2_{21} + R2_{22})/(R2_{21} - R2_{22})|$ | | | | | 49.68 mm |
| $|AAG2 \times (R2_{21} + R2_{22})/(R2_{21} - R2_{22})|$ | | | | | 18.17 mm |
| $|F2 \times (R2_{21} + R2_{22})/(R2_{21} - R2_{22})|$ | | | | | 24.02 |
| $(R2_{52} + R2_{62}) \times (R2_{31}/f2_1)$ | | | | | −1.15 mm |
| $(f2_1 \times f2_6)/(T2_1 + T2_2 + T2_6)$ | | | | | −13.45 mm |
| $(f2_1 - f2_6)/((T2_5 + T2_6)/G2_5)$ | | | | | 4.48 mm |
| $(R2_{11} + R2_{12} + R2_{52} + R2_{62}) \times ((T2_5 + T2_6)/G2_5)$ | | | | | 10.46 mm |
| $(R2_{11} + R2_{12})/(R2_{52} - R2_{62})$ | | | | | −1.44 |
| $TTL2/(R2_{62} - R2_{52})$ | | | | | 1.16 |
| $(f2_1 + f2_5 + f2_6)/(T2_5 + T2_6 - R2_{62} + R2_{52})$ | | | | | −1.73 |
| $(f2_1 - f2_6)/(T2_5 + T2_6 - R2_{62} + R2_{52})$ | | | | | −2.28 |
| $F2 \times ((f2_1 - f2_6)/(T2_5 + T2_6 - R2_{62} + R2_{52}))$ | | | | | −3.99 |

Figure 4A:
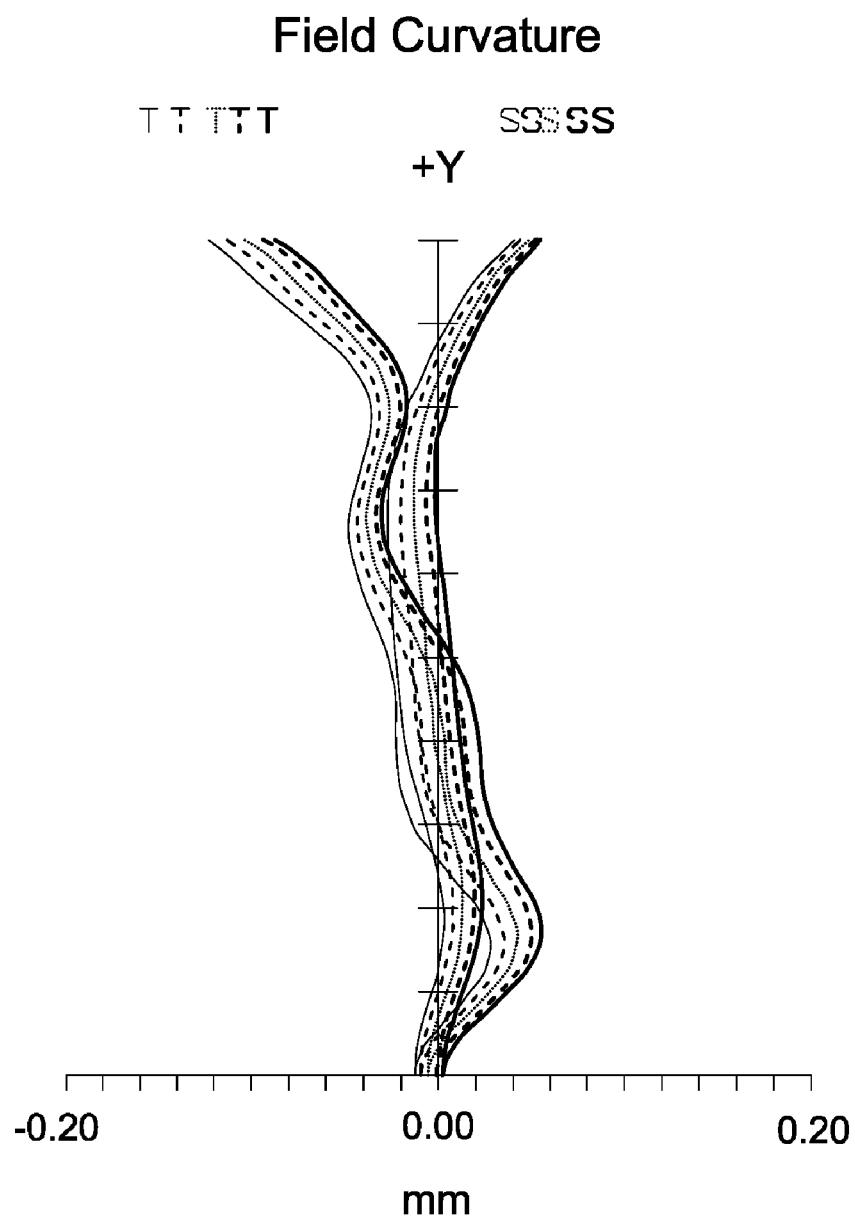
FIG. 4A depicts a field curvature diagram of the lens assembly in accordance with the second embodiment of the invention.
Figure 4B:
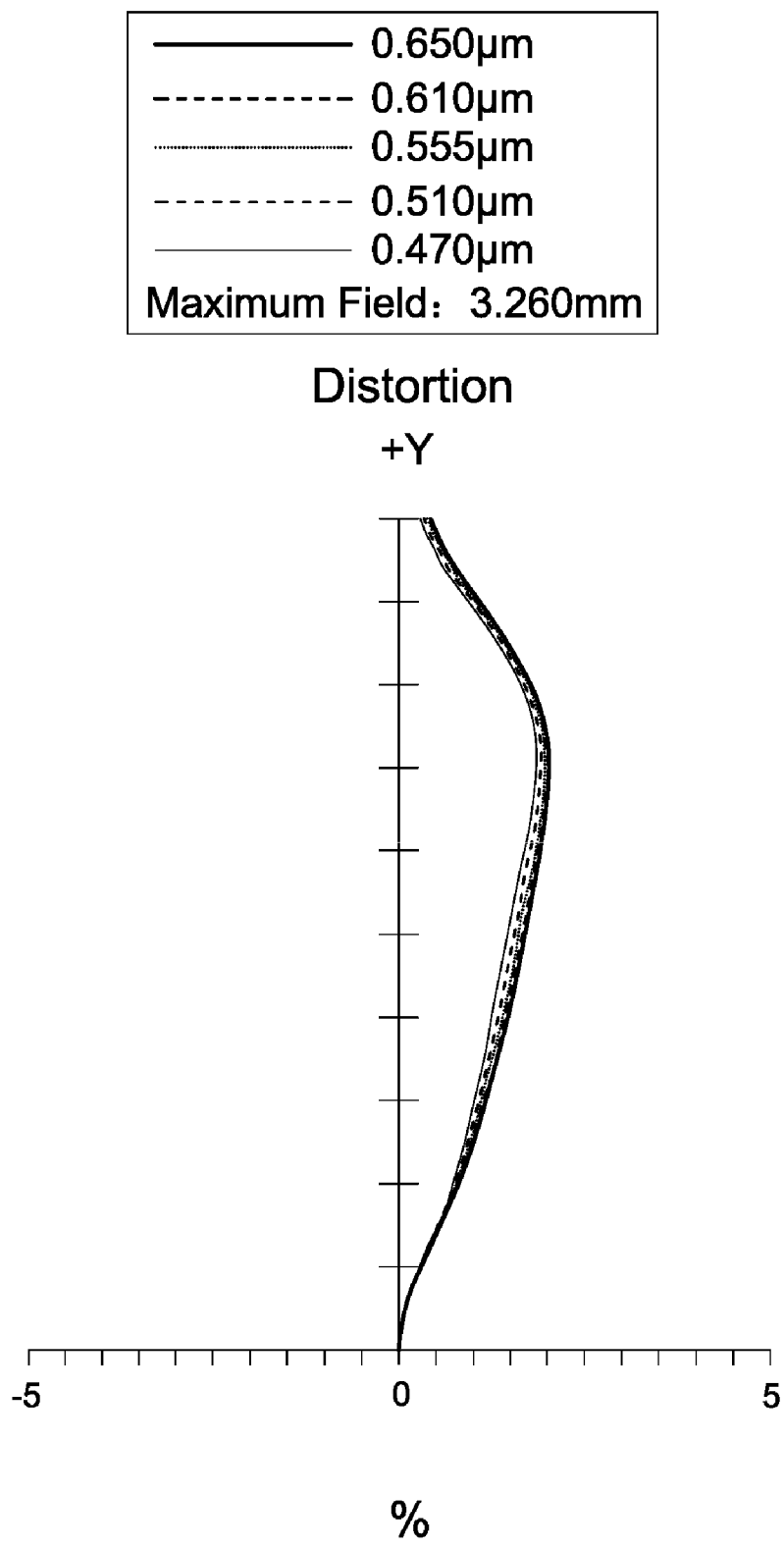
FIG. 4B is a distortion diagram of the lens assembly in accordance with the second embodiment of the invention.
Figure 4C:
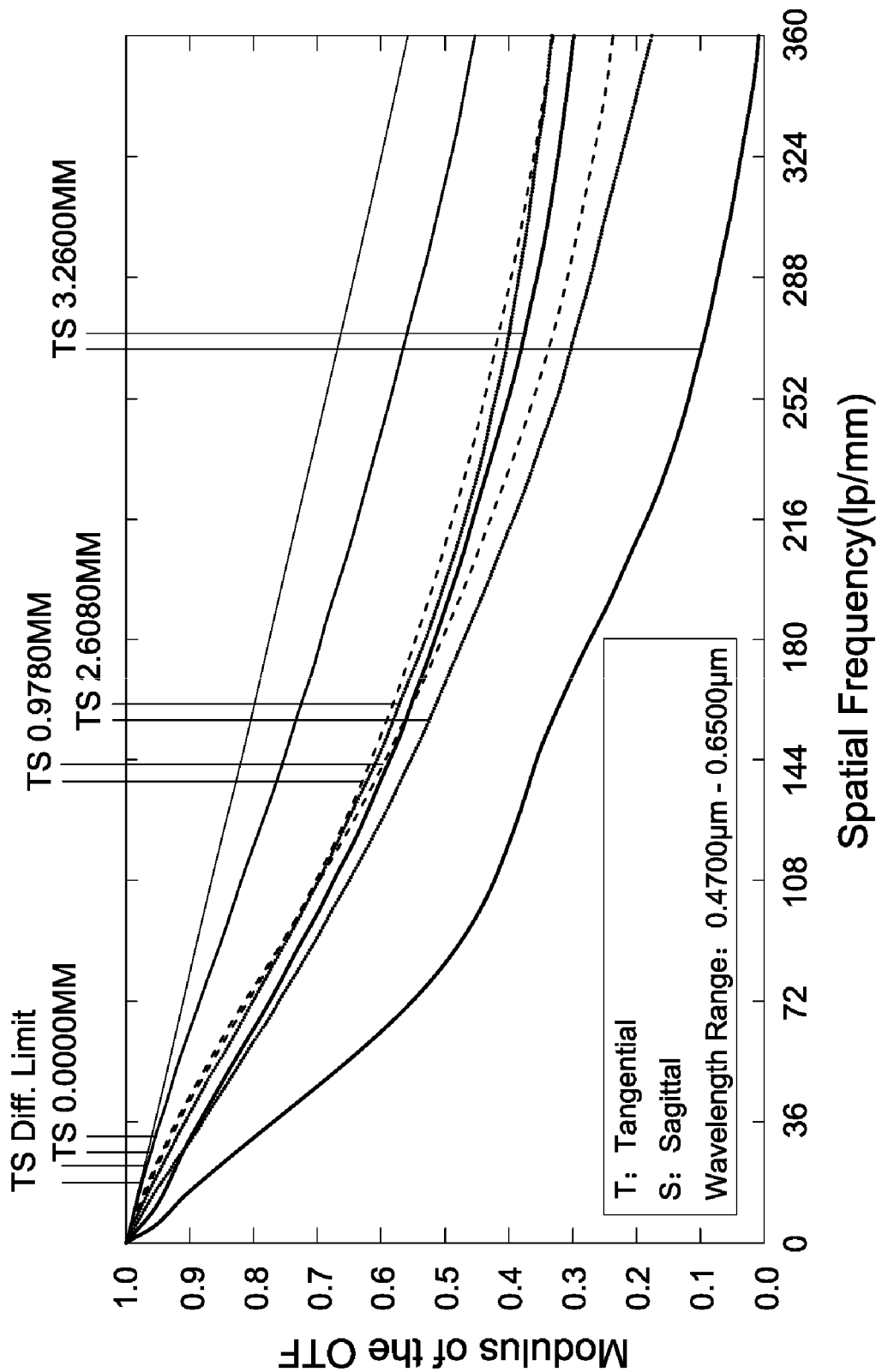
FIG. 4C is a modulation transfer function diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a field curvature diagram of the lens assembly 2 in accordance with the second embodiment of the invention, FIG. 4B shows a distortion diagram of the lens assembly 2 in accordance with the second embodiment of the invention, and FIG. 4C shows a modulation transfer function diagram of the lens assembly 2 in accordance with the second embodiment of the invention.

It can be seen from FIG. 4A that the field curvature of tangential direction and sagittal direction in the lens assembly 2 of the second embodiment ranges from −0.13 mm to 0.06 mm for the wavelength of 0.470 μm, 0.510 μm, 0.555 μm, 0.610 μm, and 0.650 μm.

It can be seen from FIG. 4B that the distortion in the lens assembly 2 of the second embodiment ranges from 0.0% to 2.1% for the wavelength of 0.470 μm, 0.510 μm, 0.555 μm, 0.610 μm, and 0.650 μm.

It can be seen from FIG. 4C that the modulation transfer function of tangential direction and sagittal direction in the lens assembly 2 of the second embodiment ranges from 0.01 to 1.0 wherein the wavelength ranges from 0.4700 μm to 0.6500 μm, the fields respectively are 0.0000 mm, 0.9780 mm, 2.6080 mm, and 3.2600 mm, and the spatial frequency ranges from 0 lp/mm to 360 lp/mm.

Figure 5:
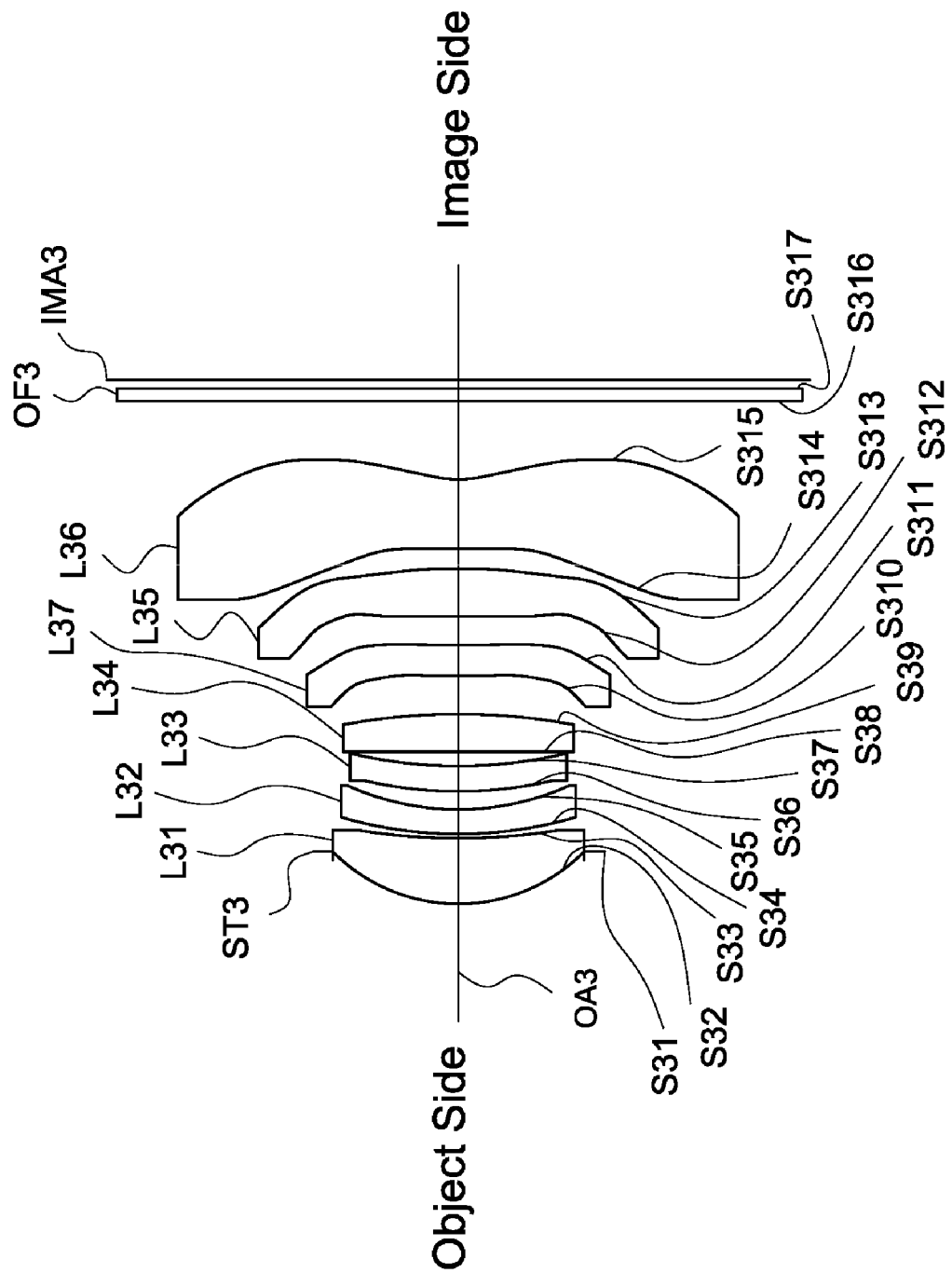
FIG. 5 is a lens layout diagram of a lens assembly in accordance with a third embodiment of the invention.

It is obvious that the field curvature and the distortion of the lens assembly 2 of the second embodiment can be corrected effectively, and the resolution of the lens assembly 2 of the second embodiment can meet the requirement. Therefore, the lens assembly 2 of the second embodiment is capable of good optical performance Referring to FIG. 5, FIG. 5 is a lens layout diagram of a lens assembly in accordance with a third embodiment of the invention. The lens assembly 3 includes a stop ST3, a first lens L31, a second lens L32, a third lens L33, a fourth lens L34, a seventh lens L37, a fifth lens L35, a sixth lens L36, and an optical filter OF3, all of which are arranged in order from an object side to an image side along an optical axis OA3. In operation, an image of light rays from the object side is formed at an image plane IMA3.

The first lens L31 is a meniscus lens with positive refractive power, wherein the object side surface S32 is a convex surface, the image side surface S33 is a concave surface, and both of the object side surface S32 and image side surface S33 are aspheric surfaces.

The second lens L32 is a meniscus lens with negative refractive power, wherein the object side surface S34 is a convex surface, the image side surface S35 is a concave surface, and both of the object side surface S34 and image side surface S35 are aspheric surfaces.

The third lens L33 is a meniscus lens with positive refractive power, wherein the object side surface S36 is a convex surface, the image side surface S37 is a concave surface, and both of the object side surface S36 and image side surface S37 are aspheric surfaces.

The fourth lens L34 is a biconvex lens with positive refractive power, wherein the object side surface S38 is a convex surface, the image side surface S39 is a convex surface, and both of the object side surface S38 and image side surface S39 are aspheric surfaces.

The seventh lens L37 is a meniscus lens with negative refractive power, wherein the object side surface S310 is a convex surface, the image side surface S311 is a concave surface, and both of the object side surface S310 and image side surface S311 are aspheric surfaces.

The fifth lens L35 is a meniscus lens with positive refractive power, wherein the object side surface S312 is a concave surface, the image side surface S313 is a convex surface, and both of the object side surface S312 and image side surface S313 are aspheric surfaces.

The sixth lens L36 is a meniscus lens with negative refractive power, wherein the object side surface S314 is a convex surface, the image side surface S315 is a concave surface, and both of the object side surface S314 and image side surface S315 are aspheric surfaces.

Both of the object side surface S316 and image side surface S317 of the optical filter OF3 are plane surfaces.

In order to maintain excellent optical performance of the lens assembly in accordance with the third embodiment of the invention, the lens assembly 3 satisfies any one of the conditions (1)-(16), wherein the definition for all of the parameters in the third embodiment is the same as that of in the first embodiment, and is not described here again.

By the above design of the lenses, stop ST3, and satisfies any one of the conditions (1)-(16), the lens assembly 3 is provided with an effective shortened total lens length, an effective decreased F-number, an effective decreased weight, an effective increased resolution, an effective corrected chromatic aberration, and an effective corrected aberration.

In order to achieve the above purposes and effectively enhance the optical performance, the lens assembly 3 in accordance with the third embodiment of the invention is provided with the optical specifications shown in Table 7, which include the effective focal length, F-number, total lens length, field of view, radius of curvature of each lens surface, thickness between adjacent surface, refractive index of each lens, and Abbe number of each lens.

TABLE 7

Effective Focal Length = 4.607 mm F-number = 1.75
Total Lens Length = 5.32 mm Field of View = 79.07 Degrees

| Surface Number | Radius of Curvature (mm) | Thickness (mm) | Nd | Vd | Remark |
|---|---|---|---|---|---|
| S31 | ∞ | −0.52373 | | | Stop ST3 |
| S32 | 1.745424 | 0.660154 | 1.543915 | 55.9512 | The First Lens L31 |
| S33 | 3.505787 | 0.047158 | | | |
| S34 | 3.231158 | 0.244762 | 2.00178 | 19.32 | The Second Lens L32 |
| S35 | 2.712958 | 0.180239 | | | |
| S36 | 2.669923 | 0.264321 | 1.543915 | 55.9512 | The Third Lens L33 |
| S37 | 2.937868 | 0.146977 | | | |
| S38 | 20.60798 | 0.372803 | 1.543915 | 55.9512 | The Fourth Lens L34 |
| S39 | −14.1978 | 0.38439 | | | |
| S310 | 15.69618 | 0.315331 | 1.66059 | 20.40123 | The Seventh Lens L37 |
| S311 | 9.932442 | 0.27571 | | | |
| S312 | −145.129 | 0.511896 | 1.543915 | 55.9512 | The Fifth Lens L35 |
| S313 | −2.72256 | 0.191005 | | | |
| S314 | 15.57393 | 0.70513 | 1.543915 | 55.9512 | The Sixth Lens L36 |
| S315 | 1.505153 | 0.8 | | | |
| S316 | ∞ | 0.11 | 1.5168 | 64.16734 | Optical Filter OF3 |
| S317 | ∞ | 0.109341 | | | |

The definition of aspheric surface sag z of each lens in table 7 is the same as that of in Table 1.

In the third embodiment, the conic constant k and the aspheric coefficients A, B, C, D, E, F, G of each surface are shown in Table 8, and the other aspheric coefficients H, I, J, K, L, M are equal to 0.

TABLE 8

| Surface Number | k | A E | B F | C G | D |
|---|---|---|---|---|---|
| S32 | 0 | 0.116448 | −0.0475452 | 0.02295312 | −0.007564445 |
| | | 0.001869846 | −0.000287356 | −0.000331834 | |
| S33 | 0 | −0.08271992 | 0.14862196 | −0.14466178 | 0.07258406 |
| | | −0.016663758 | 0.000863346 | −0.000109297 | |
| S34 | 0 | −0.089681301 | 0.19255293 | −0.18326385 | 0.092285067 |
| | | −0.019039327 | 0.002159805 | −0.000578909 | |
| S35 | −10.4304 | −0.05572392 | 0.12689755 | −0.12736977 | 0.076035082 |
| | | −0.022863814 | 0.003101442 | 0.002288972 | |
| S36 | 0 | −0.042508157 | 0.027905424 | −0.079446469 | 0.067552115 |
| | | −0.055236199 | 0.018417326 | −0.000197732 | |
| S37 | 0 | −0.037918671 | 0.017967542 | −0.070224987 | 0.070902693 |
| | | −0.059389388 | 0.014275321 | 0.003568861 | |
| S38 | 0 | −0.032219182 | 0.029237603 | −0.064008467 | 0.07741453 |
| | | −0.055090837 | 0.015810888 | 0.003827928 | |
| S39 | −0.09465 | −0.045933585 | −0.003777886 | 0.009368141 | −0.038438945 |
| | | 0.04524895 | −0.026213969 | 0.009776153 | |
| S310 | −17.0307 | −0.094448688 | −0.00712757 | 0.055128543 | −0.093329176 |
| | | 0.053213222 | −1.04E−02 | −0.001352676 | |
| S311 | 0 | −0.073230224 | −0.024815555 | 0.027063341 | −0.015815785 |
| | | 4.78E−03 | −3.36E−04 | −6.5366E−05 | |
| S312 | 0 | 0.1323955 | −0.16738347 | 0.098936868 | −0.047966252 |
| | | 0.014380444 | −2.29E−03 | 1.64E−04 | |
| S313 | −7.854 | 0.10108584 | −0.054597884 | 0.007329516 | −0.000326662 |
| | | 2.37E−04 | −7.54E−05 | 6.73E−06 | |
| S314 | 0 | −0.17994384 | 0.07887635 | −0.018478415 | 0.002875373 |
| | | −0.000336196 | 2.81E−05 | −1.18E−06 | |
| S315 | 0 | −0.085149342 | 0.035711454 | −0.010573808 | 0.001935381 |
| | | −2.09E−04 | 1.23E−05 | −2.98E−07 | |

Table 9 shows the parameters and condition values for conditions (1)-(16) in accordance with the third embodiment of the invention. As can be seen from Table 9, the lens assembly 3 of the third embodiment satisfies the conditions (1)-(16).

TABLE 9

| | | | | | |
|---|---|---|---|---|---|
| $f3_1$ | 5.6219 mm | $f3_5$ | 5.0754 mm | $f3_6$ | −3.1067 mm |
| $f3_{234}$ | 25.7632 mm | $f3$ | 4.607 mm | $R3_{11}$ | 1.745424 mm |
| $R3_{12}$ | 3.505787 mm | $R3_{21}$ | 3.231158 mm | $R3_{22}$ | 2.712958 mm |
| $R3_{31}$ | 2.669923 mm | $R3_{52}$ | −2.72256 mm | $R3_{62}$ | 1.505153 mm |
| $D3_1$ | 2.559 mm | AAG3 | 1.225479 mm | F3 | 1.75 |
| $T3_1$ | 0.660154 mm | $T3_2$ | 0.244762 mm | $T3_5$ | 0.511896 mm |
| $T3_6$ | 0.70513 mm | $G3_5$ | 0.191005 mm | TTL3 | 5.32 mm |
| $D3_1/T3_6$ | 3.63 | $f3/D3_1$ | 1.80 | | |
| $f3 \times ((f3_1 - f3_6)/(T3_5 + T3_6 - R3_{62} + R3_{52}))$ | | | | | −13.36 mm |
| $\|f3 \times (R3_{21} + R3_{22})/(R3_{21} - R3_{22})\|$ | | | | | 52.85 mm |
| $\|AAG3 \times (R3_{21} + R3_{22})/(R3_{21} - R3_{22})\|$ | | | | | 14.06 mm |
| $\|F3 \times (R3_{21} + R3_{22})/(R3_{21} - R3_{22})\|$ | | | | | 20.07 |
| $(R3_{52} + R3_{62}) \times (R3_{31}/f3_1)$ | | | | | −0.58 mm |
| $(f3_1 \times f3_6)/(T3_1 + T3_2 + T3_6)$ | | | | | −10.85 mm |
| $(f3_1 - f3_6)/((T3_5 + T3_6)/G3_5)$ | | | | | 1.37 mm |
| $(R3_{11} + R3_{12} + R3_{52} + R3_{62}) \times ((T3_5 + T3_6)/G3_5)$ | | | | | 25.70 mm |
| $(R3_{11} + R3_{12})/(R3_{52} - R3_{62})$ | | | | | −1.24 |
| $TTL3/(R3_{62} - R3_{52})$ | | | | | 1.26 |
| $(f3_1 + f3_5 + f3_6)/(T3_5 + T3_6 - R3_{62} + R3_{52})$ | | | | | −2.52 |
| $(f3_1 - f3_6)/(T3_5 + T3_6 - R3_{62} + R3_{52})$ | | | | | −2.90 |
| $F3 \times ((f3_1 - f3_6)/(T3_5 + T3_6 - R3_{62} + R3_{52}))$ | | | | | −5.07 |

Figure 6A:
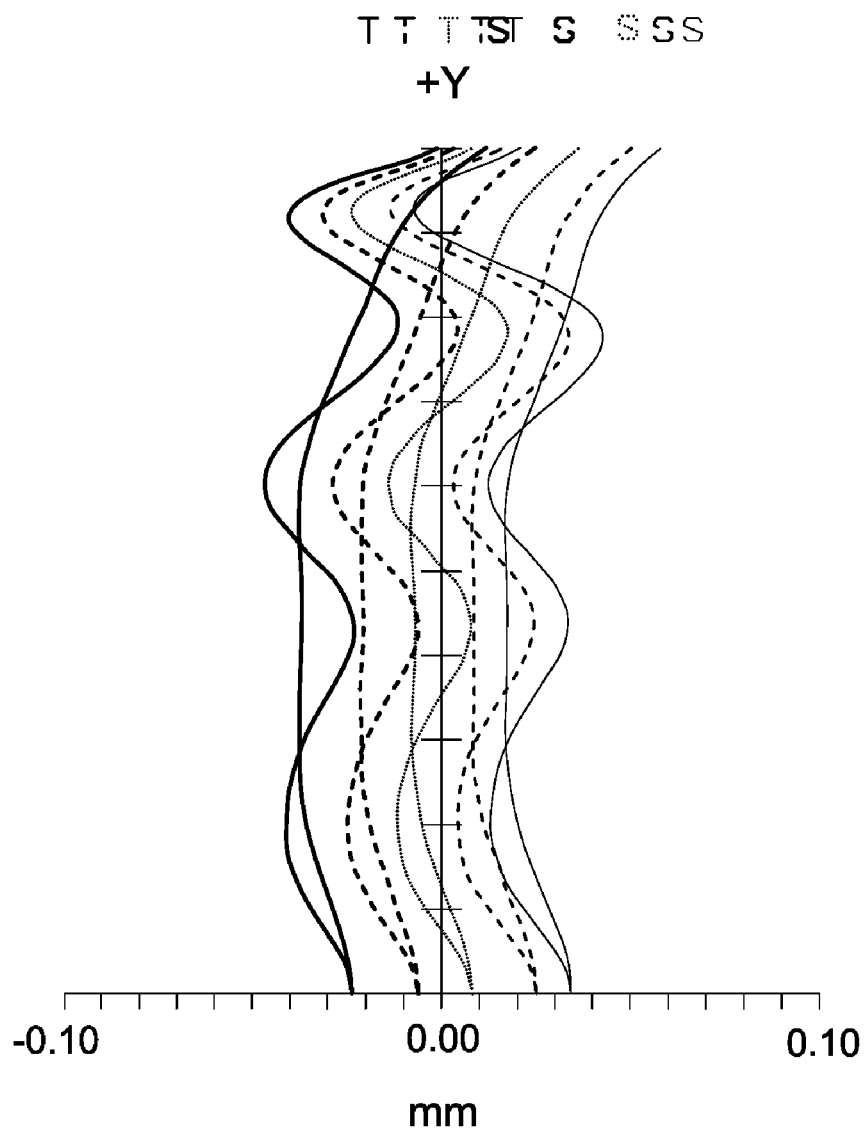
FIG. 6A depicts a field curvature diagram of the lens assembly in accordance with the third embodiment of the invention.
Figure 6B:
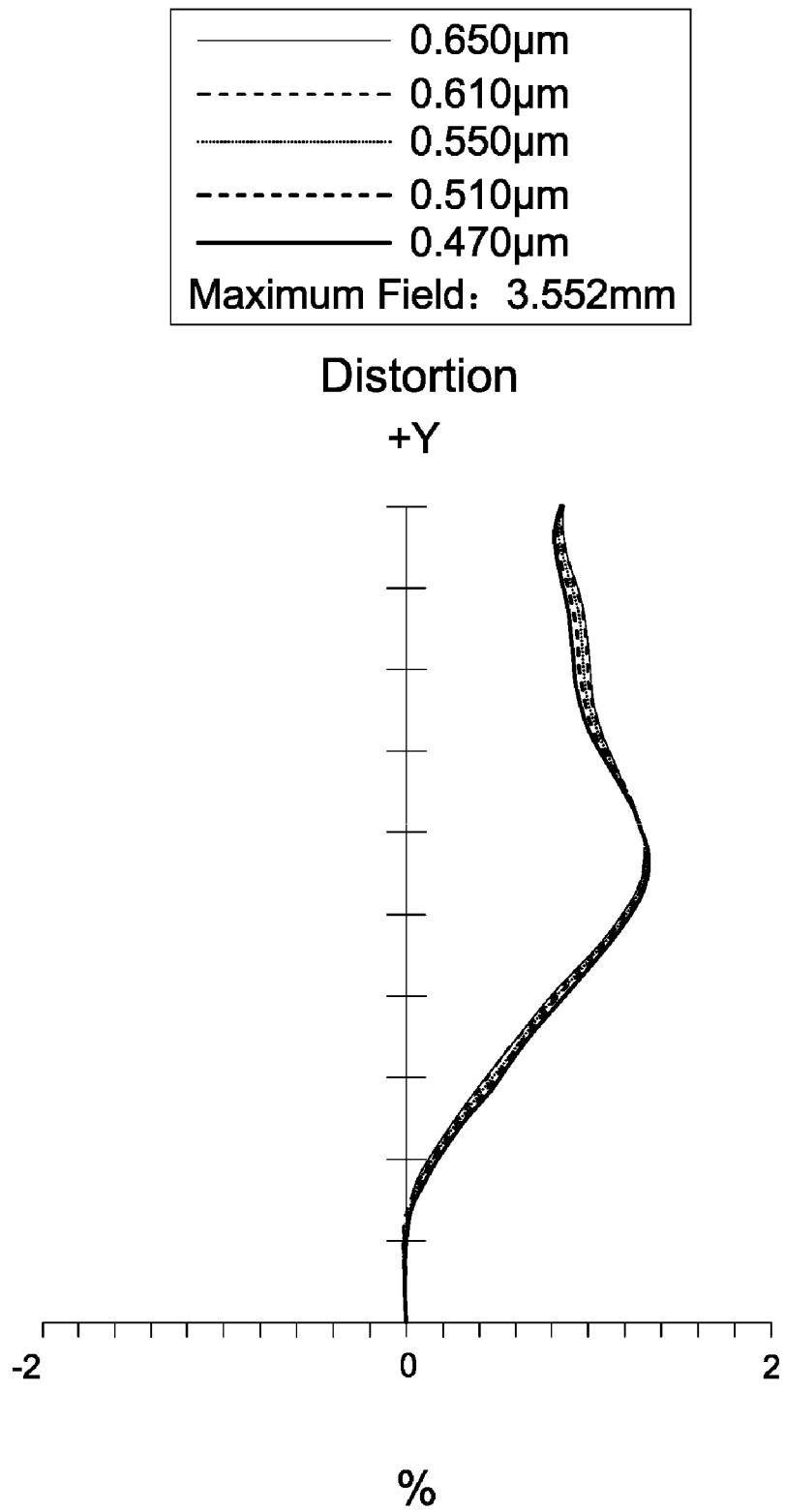
FIG. 6B is a distortion diagram of the lens assembly in accordance with the third embodiment of the invention.
Figure 6C:
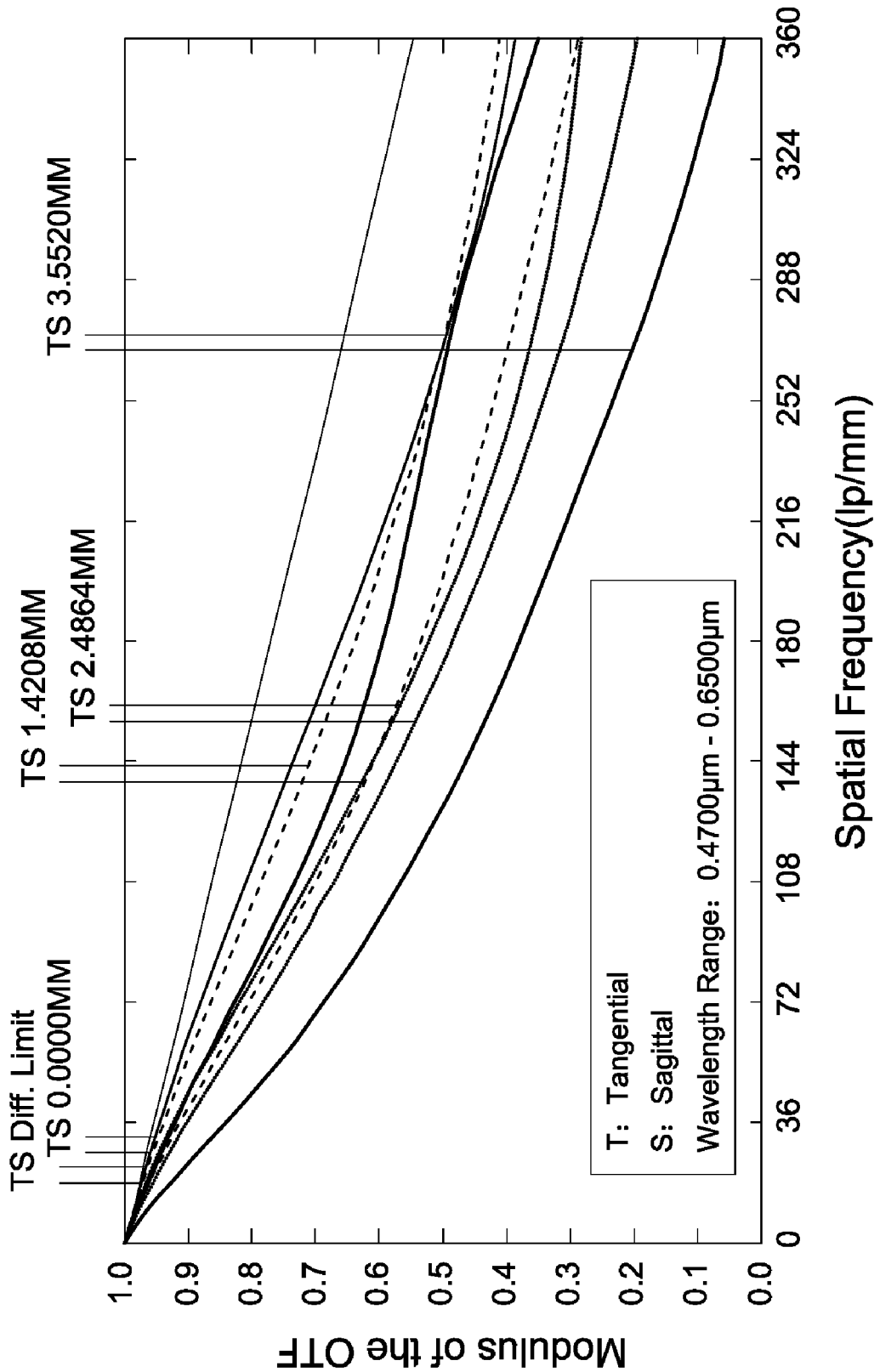
FIG. 6C is a modulation transfer function diagram of the lens assembly in accordance with the third embodiment of the invention.

By the above arrangements of the lenses and stop ST3, the lens assembly 3 of the third embodiment can meet the requirements of optical performance as seen in FIGS. 6A-6C, wherein FIG. 6A shows a field curvature diagram of the lens assembly 3 in accordance with the third embodiment of the invention, FIG. 6B shows a distortion diagram of the lens assembly 3 in accordance with the third embodiment of the invention, and FIG. 6C shows a modulation transfer function diagram of the lens assembly 3 in accordance with the third embodiment of the invention.

It can be seen from FIG. 6A that the field curvature of tangential direction and sagittal direction in the lens assembly 3 of the third embodiment ranges from −0.05 mm to 0.06 mm for the wavelength of 0.470 μm, 0.510 μm, 0.550 μm, 0.610 μm, and 0.650 μm.

It can be seen from FIG. 6B that the distortion in the lens assembly 3 of the third embodiment ranges from −0.1% to 1.4% for the wavelength of 0.470 μm, 0.510 μm, 0.550 μm, 0.610 μm, and 0.650 μm.

It can be seen from FIG. 6C that the modulation transfer function of tangential direction and sagittal direction in the lens assembly 3 of the third embodiment ranges from 0.05 to 1.0 wherein the wavelength ranges from 0.4700 μm to 0.6500 μm, the fields respectively are 0.0000 mm, 1.4208 mm, 2.4864 mm, and 3.5520 mm, and the spatial frequency ranges from 0 lp/mm to 360 lp/mm.

It is obvious that the field curvature and the distortion of the lens assembly 3 of the third embodiment can be corrected effectively, and the resolution of the lens assembly 3 of the third embodiment can meet the requirement. Therefore, the lens assembly 3 of the third embodiment is capable of good optical performance.

Figure 7:
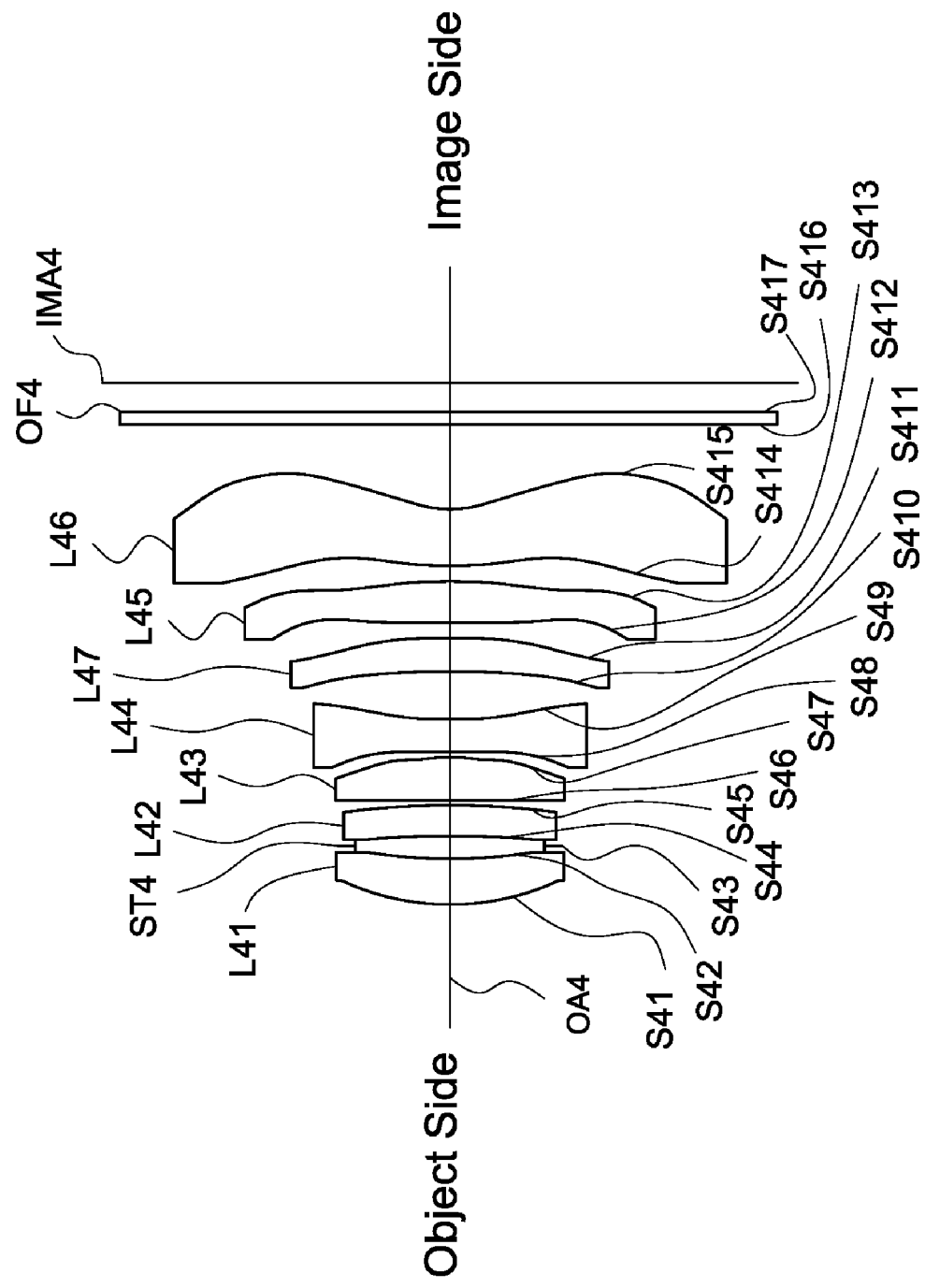
FIG. 7 is a lens layout diagram of a lens assembly in accordance with a fourth embodiment of the invention.

Referring to FIG. 7, FIG. 7 is a lens layout diagram of a lens assembly in accordance with a fourth embodiment of the invention. The lens assembly 4 includes a first lens L41, a stop ST4, a second lens L42, a third lens L43, a fourth lens L44, a seventh lens L47, a fifth lens L45, a sixth lens L46, and an optical filter OF4, all of which are arranged in order from an object side to an image side along an optical axis OA4. In operation, an image of light rays from the object side is formed at an image plane IMA4.

The first lens L41 is a meniscus lens with positive refractive power, wherein the object side surface S41 is a convex surface, the image side surface S42 is a concave surface, and both of the object side surface S41 and image side surface S42 are aspheric surfaces.

The second lens L42 is a meniscus lens with positive refractive power, wherein the object side surface S44 is a convex surface, the image side surface S45 is a concave surface, and both of the object side surface S44 and image side surface S45 are aspheric surfaces.

The third lens L43 is a biconvex lens with positive refractive power, wherein the object side surface S46 is a convex surface, the image side surface S47 is a convex surface, and both of the object side surface S46 and image side surface S47 are aspheric surfaces.

The fourth lens L44 is a meniscus lens with negative refractive power, wherein the object side surface S48 is a convex surface, the image side surface S49 is a concave surface, and both of the object side surface S48 and image side surface S49 are aspheric surfaces.

The seventh lens L47 is a meniscus lens with negative refractive power, wherein the object side surface S410 is a concave surface, the image side surface S411 is a convex surface, and both of the object side surface S410 and image side surface S411 are aspheric surfaces.

The fifth lens L45 is a meniscus lens with positive refractive power, wherein the object side surface S412 is a concave surface, the image side surface S413 is a convex surface, and both of the object side surface S412 and image side surface S413 are aspheric surfaces.

The sixth lens L46 is a meniscus lens with negative refractive power, wherein the object side surface S414 is a convex surface, the image side surface S415 is a concave surface, and both of the object side surface S414 and image side surface S415 are aspheric surfaces.

Both of the object side surface S416 and image side surface S417 of the optical filter OF4 are plane surfaces.

In order to maintain excellent optical performance of the lens assembly in accordance with the fourth embodiment of the invention, the lens assembly 4 satisfies any one of the conditions (1)-(16), wherein the definition for all of the parameters in the fourth embodiment is the same as that of in the first embodiment, and is not described here again.

By the above design of the lenses, stop ST4, and satisfies any one of the conditions (1)-(16), the lens assembly 4 is provided with an effective shortened total lens length, an effective decreased F-number, an effective decreased weight, an effective increased resolution, an effective corrected chromatic aberration, and an effective corrected aberration.

In order to achieve the above purposes and effectively enhance the optical performance, the lens assembly 4 in accordance with the fourth embodiment of the invention is provided with the optical specifications shown in Table 10, which include the effective focal length, F-number, total lens length, field of view, radius of curvature of each lens surface, thickness between adjacent surface, refractive index of each lens, and Abbe number of each lens.

TABLE 10

Effective Focal Length = 3.732 mm F-number = 1.9
Total Lens Length = 5.0 mm Field of View = 82.87 Degrees

| Surface Number | Radius of Curvature (mm) | Thickness (mm) | Nd | Vd | Remark |
|---|---|---|---|---|---|
| S41 | 1.828298 | 0.429146 | 1.543915 | 55.9512 | The First Lens L41 |
| S42 | 2.862541 | 0.132939 | | | |
| S43 | ∞ | 0.08176 | | | Stop ST4 |
| S44 | 82.93174 | 0.290062 | 1.66059 | 20.40123 | The Second Lens L42 |
| S45 | 100.0057 | 0.051148 | | | |
| S46 | 9.245604 | 0.415985 | 1.864 | 40.58 | The Third Lens L43 |
| S47 | −4.37481 | 0.049784 | | | |
| S48 | 20.99349 | 0.325851 | 1.66059 | 20.40123 | The Fourth Lens L44 |
| S49 | 2.850964 | 0.459781 | | | |
| S410 | −4.34185 | 0.316623 | 1.66059 | 20.40123 | The Seventh Lens L47 |
| S411 | −5.18461 | 0.144665 | | | |
| S412 | −61.8552 | 0.395644 | 1.543915 | 55.9512 | The Fifth Lens L45 |
| S413 | −2.59318 | 0.148724 | | | |
| S414 | 2.45241 | 0.562959 | 1.543915 | 55.9512 | The Sixth Lens L46 |
| S415 | 1.192595 | 0.8 | | | |
| S416 | ∞ | 0.11 | 1.5168 | 64.16734 | Optical Filter OF4 |
| S417 | ∞ | 0.287396 | | | |

The definition of aspheric surface sag z of each lens in table 10 is the same as that of in Table 1.

In the fourth embodiment, the conic constant k and the aspheric coefficients A, B, C, D, E, F, G of each surface are shown in Table 11, and the other aspheric coefficients H, I, J, K, L, M are equal to 0.

TABLE 11

| Surface Number | k | A<br>E | B<br>F | C<br>G | D |
|---|---|---|---|---|---|
| S41 | 0 | −0.036124422<br>−0.00152576 | 0.012481307<br>−0.031294542 | −0.082596275<br>0.010931793 | 0.049378221 |
| S42 | 0 | −0.027829859<br>0.067139152 | −0.078947051<br>−0.03150198 | 0.045755646<br>0.024248931 | −0.11688576 |
| S44 | 0 | −0.024314118<br>−0.079907848 | −0.042671431<br>0.085817312 | 0.027690975<br>−0.02312828 | −0.006251157 |
| S45 | −10.4304 | −0.013759313<br>−0.069887839 | −0.036730692<br>0.089738933 | 0.026927291<br>−0.041250398 | −0.000243194 |
| S46 | 0 | −0.005554983<br>−0.064586294 | −0.052178344<br>0.097423313 | 0.019538705<br>−0.036638057 | −0.00100331 |
| S47 | 0 | −0.11570724<br>0.009216342 | 0.076607421<br>0.005642058 | −0.035328191<br>−0.001976596 | −0.001716418 |
| S48 | 0 | −0.22502099<br>−0.020900953 | 0.12637609<br>0.034586066 | 0.029755882<br>−0.01574619 | −0.042521426 |
| S49 | −0.09465 | −0.095030683<br>0.026431248 | 0.03168583<br>−0.011950914 | 0.02592588<br>0.002514189 | −0.041753785 |
| S410 | −17.0307 | 0.05766283<br>0.001444966 | −0.039762523<br>−9.24E−04 | 0.010101785<br>−0.000102293 | 0.000872927 |
| S411 | 0 | −0.007254032<br>1.61E−03 | −0.015455188<br>−1.15E−03 | 0.003040548<br>0.000130511 | 0.003051536 |
| S412 | 0 | 0.084006889<br>−0.000643663 | −0.055305303<br>4.95E−05 | 0.004150345<br>4.55E−06 | 0.002290572 |
| S413 | −7.854 | 0.17312044<br>−7.49E−04 | −0.051444905<br>−3.79E−05 | −0.003801731<br>1.15E−05 | 0.005067177 |
| S414 | 0 | −0.15254392<br>−3.70621E−06 | 0.043111521<br>3.58E−06 | −0.00463619<br>−2.06E−07 | 7.8769E−05 |
| S415 | 0 | −0.071749208<br>2.05E−06 | 0.020513147<br>−2.44E−06 | −0.003944948<br>1.12E−07 | 0.000346365 |

Table 12 shows the parameters and condition values for conditions (1)-(16) in accordance with the fourth embodiment of the invention. As can be seen from Table 12, the lens assembly 4 of the fourth embodiment satisfies the conditions (1)-(16).

TABLE 12

| | | | | | |
|---|---|---|---|---|---|
| $f4_1$ | 8.0883 mm | $f4_5$ | 4.9484 mm | $f4_6$ | −5.5012 mm |
| $f4_{234}$ | 9.168 mm | $f4$ | 3.732 mm | $R4_{11}$ | 1.828298 mm |
| $R4_{12}$ | 2.862541 mm | $R4_{21}$ | 82.93174 mm | $R4_{22}$ | 100.0057 mm |
| $R4_{31}$ | 9.245604 mm | $R4_{52}$ | −2.59318 mm | $R4_{62}$ | 1.192595 mm |
| $D4_1$ | 1.964 mm | AAG4 | 1.068801 mm | F4 | 1.9 |
| $T4_1$ | 0.429146 mm | $T4_2$ | 0.290062 mm | $T4_5$ | 0.395644 mm |
| $T4_6$ | 0.562959 mm | $G4_5$ | 0.148724 mm | TTL4 | 5 mm |
| $D4_1/T4_6$ | 3.49 | $f4/D4_1$ | 1.90 | | |
| $f4 \times ((f4_1 − f4_6)/(T4_5 + T4_6 − R4_{62} + R4_{52}))$ | | | | | −17.94 mm |
| $\|f4 \times (R4_{21} + R4_{22})/(R4_{21} − R4_{22})\|$ | | | | | 39.99 mm |
| $\|AAG4 \times (R4_{21} + R4_{22})/(R4_{21} − R4_{22})\|$ | | | | | 11.45 mm |
| $\|F4 \times (R4_{21} + R4_{22})/(R4_{21} − R4_{22})\|$ | | | | | 20.36 |
| $(R4_{52} + R4_{62}) \times (R4_{31}/f4_1)$ | | | | | −1.60 mm |
| $(f4_1 \times f4_6)/(T4_1 + T4_2 + T4_6)$ | | | | | −34.70 mm |
| $(f4_1 − f4_6)/((T4_5 + T4_6)/G4_5)$ | | | | | 2.11 mm |
| $(R4_{11} + R4_{12} + R4_{52} + R4_{62}) \times ((T4_5 + T4_6)/G4_5)$ | | | | | 21.21 mm |
| $(R4_{11} + R4_{12})/(R4_{52} − R4_{62})$ | | | | | −1.24 |
| $TTL4/(R4_{62} − R4_{52})$ | | | | | 1.32 |
| $(f4_1 + f4_5 + f4_6)/(T4_5 + T4_6 − R4_{62} + R4_{52})$ | | | | | −2.67 |
| $(f4_1 − f4_6)/(T4_5 + T4_6 − R4_{62} + R4_{52})$ | | | | | −4.81 |
| $F4 \times ((f4_1 − f4_6)/(T4_5 + T4_6 − R4_{62} + R4_{52}))$ | | | | | −9.13 |

Figure 8A:
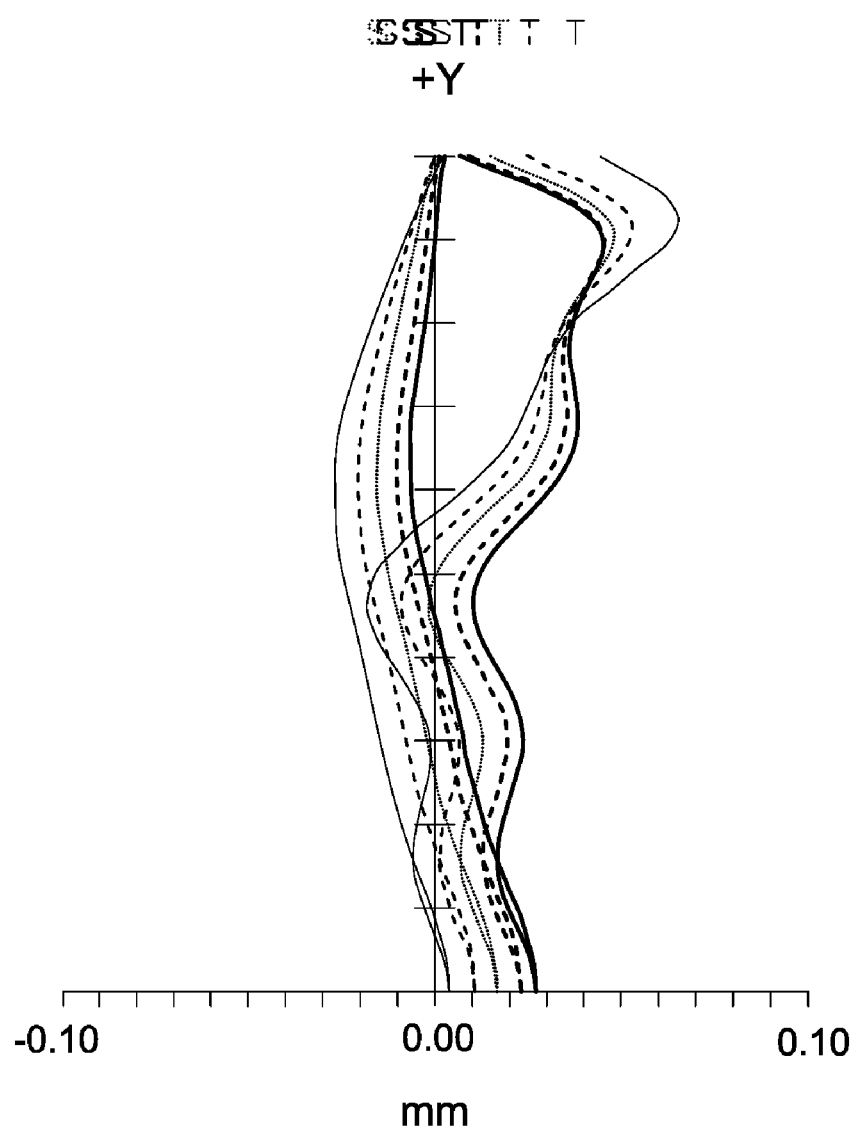
FIG. 8A depicts a field curvature diagram of the lens assembly in accordance with the fourth embodiment of the invention.
Figure 8B:
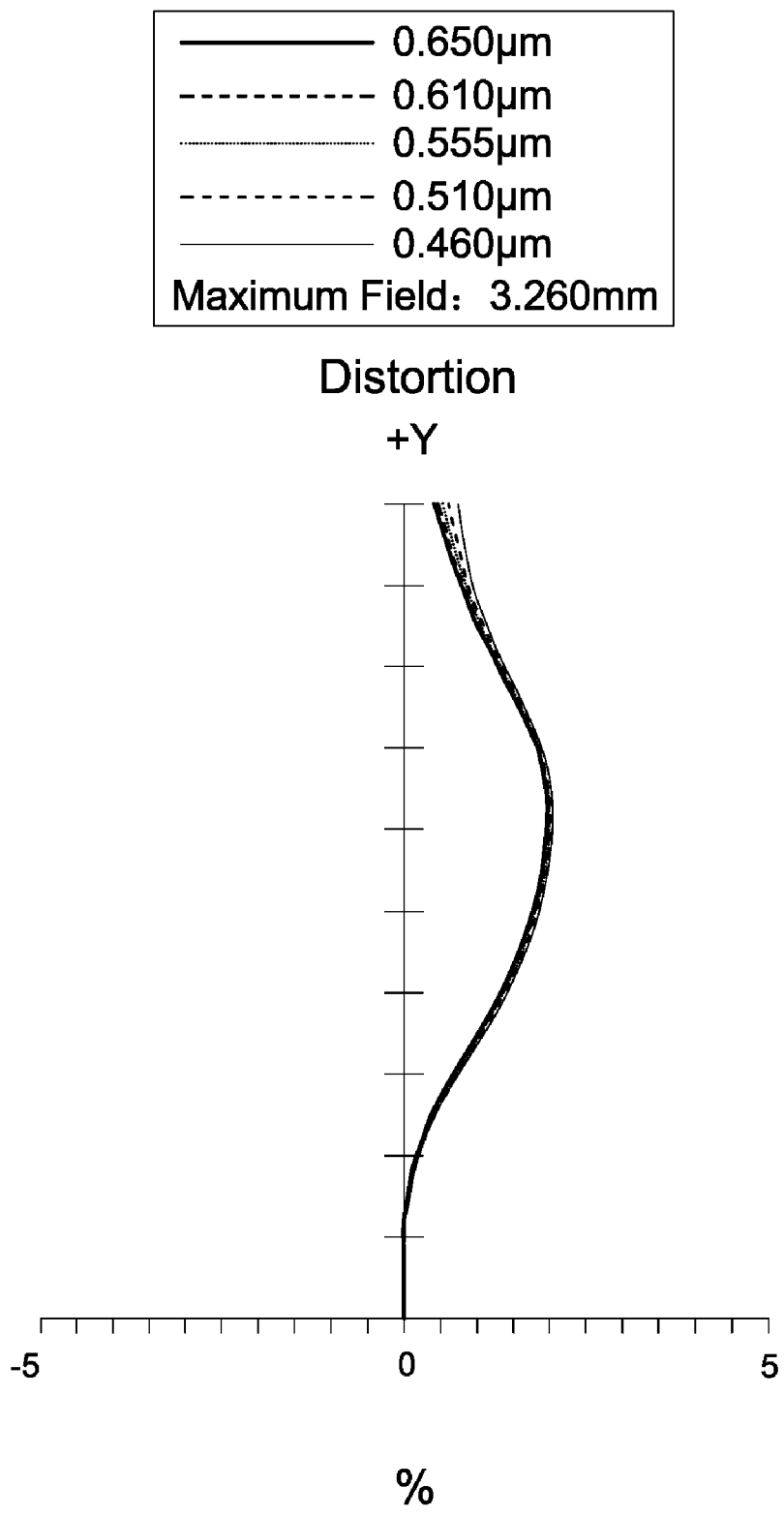
FIG. 8B is a distortion diagram of the lens assembly in accordance with the fourth embodiment of the invention.
Figure 8C:
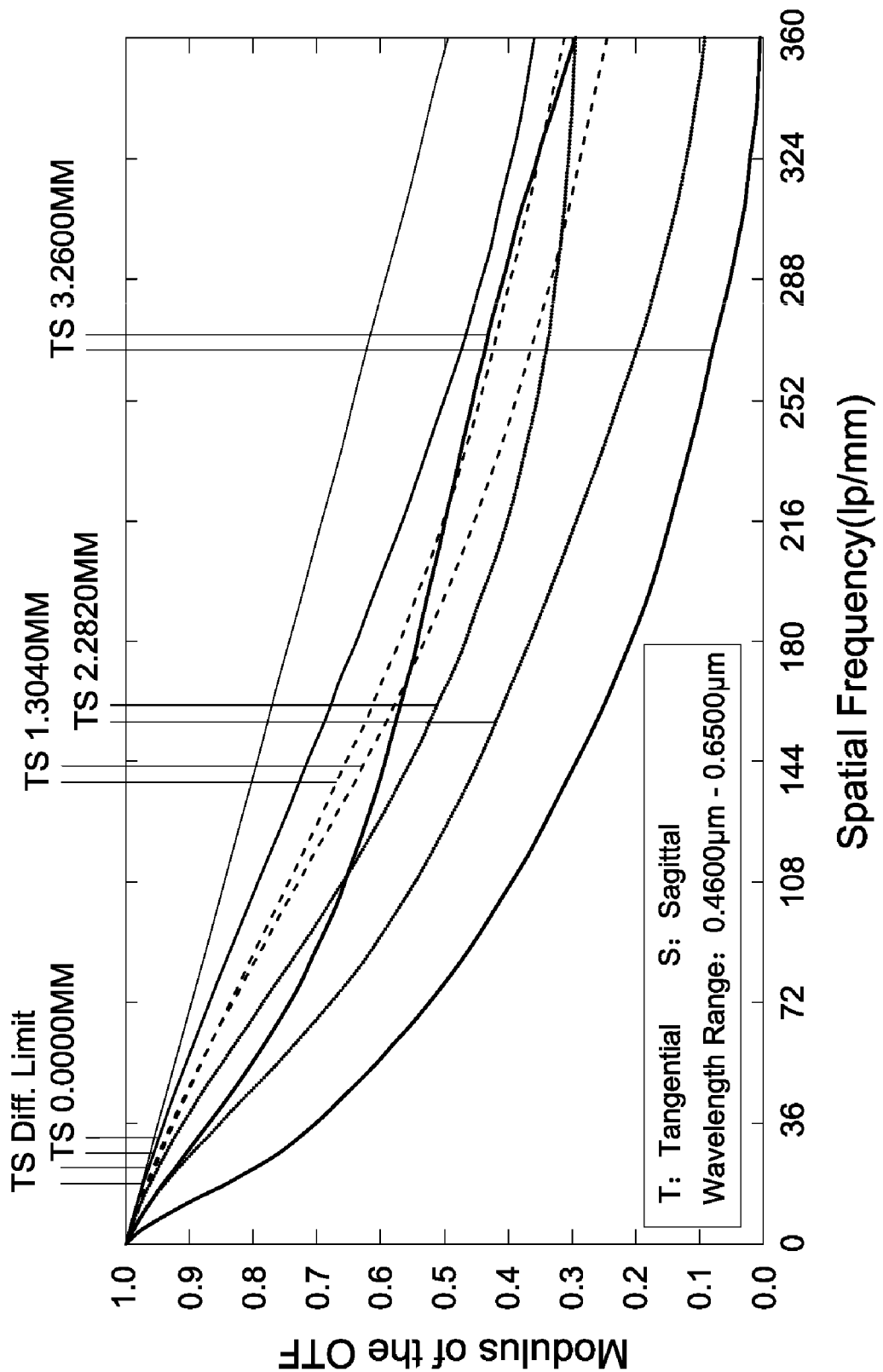
FIG. 8C is a modulation transfer function diagram of the lens assembly in accordance with the fourth embodiment of the invention.

By the above arrangements of the lenses and stop ST4, the lens assembly 4 of the fourth embodiment can meet the requirements of optical performance as seen in FIGS. 8A-8C, wherein FIG. 8A shows a field curvature diagram of the lens assembly 4 in accordance with the fourth embodiment of the invention, FIG. 8B shows a distortion diagram of the lens assembly 4 in accordance with the fourth embodiment of the invention, and FIG. 8C shows a modulation transfer function diagram of the lens assembly 4 in accordance with the fourth embodiment of the invention.

It can be seen from FIG. 8A that the field curvature of tangential direction and sagittal direction in the lens assembly 4 of the fourth embodiment ranges from −0.03 mm to 0.07 mm for the wavelength of 0.460 μm, 0.510 μm, 0.555 μm, 0.610 μm, and 0.650 μm.

It can be seen from FIG. 8B that the distortion in the lens assembly 4 of the fourth embodiment ranges from 0.0% to 2.1% for the wavelength of 0.460 μm, 0.510 μm, 0.555 μm, 0.610 μm, and 0.650 μm.

It can be seen from FIG. 8C that the modulation transfer function of tangential direction and sagittal direction in the lens assembly 4 of the fourth embodiment ranges from 0.01 to 1.0 wherein the wavelength ranges from 0.4600 μm to 0.6500 μm, the fields respectively are 0.0000 mm, 1.3040 mm, 2.2820 mm, and 3.2600 mm, and the spatial frequency ranges from 0 lp/mm to 360 lp/mm.

It is obvious that the field curvature and the distortion of the lens assembly 4 of the fourth embodiment can be corrected effectively, and the resolution of the lens assembly 4 of the fourth embodiment can meet the requirement. Therefore, the lens assembly 4 of the fourth embodiment is capable of good optical performance.

Figure 9:
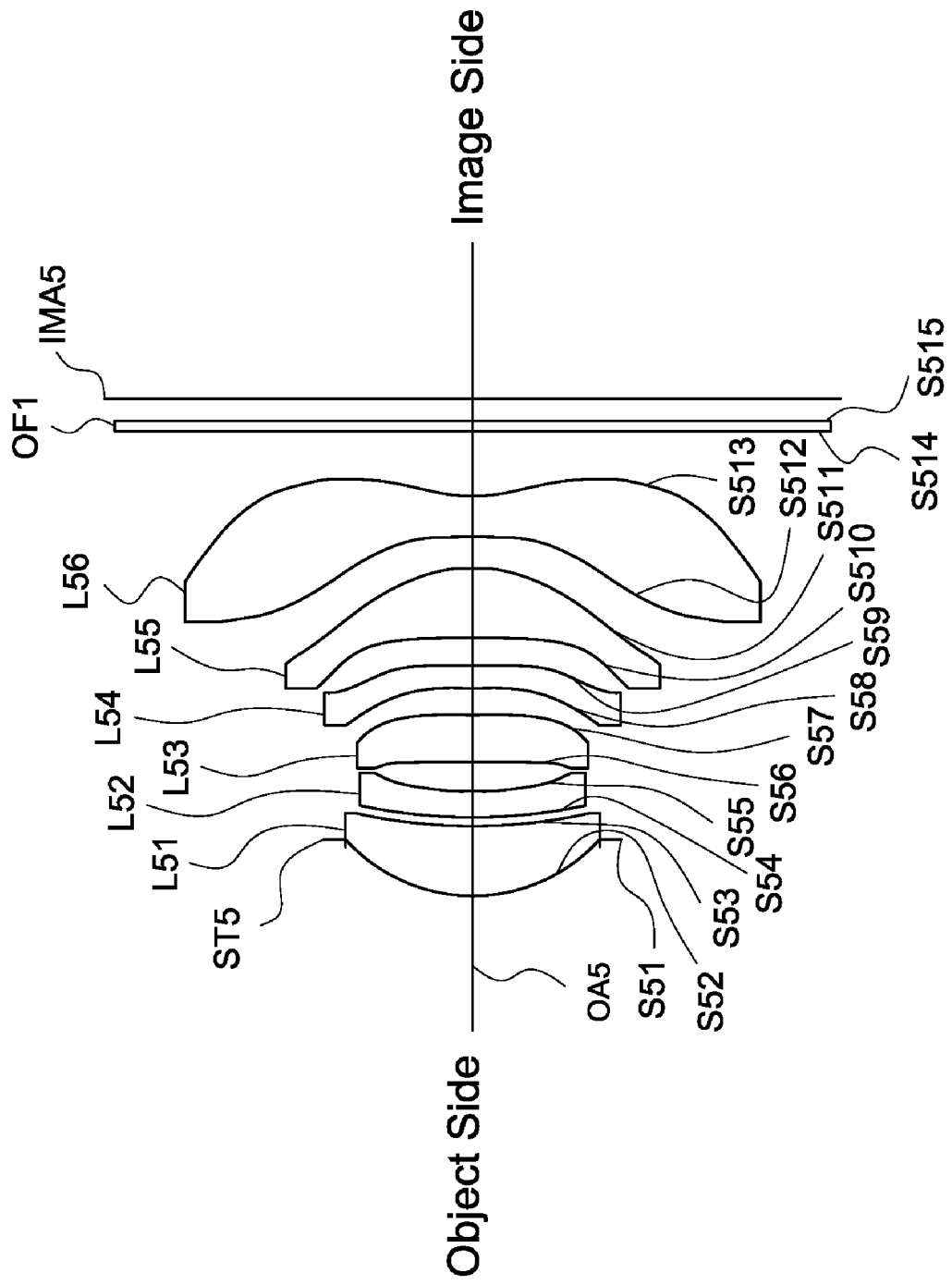
FIG. 9 is a lens layout diagram of a lens assembly in accordance with a fifth embodiment of the invention.

Referring to FIG. 9, FIG. 9 is a lens layout diagram of a lens assembly in accordance with a fifth embodiment of the invention. The lens assembly 5 includes a stop ST5, a first lens L51, a second lens L52, a third lens L53, a fourth lens L54, a fifth lens L55, a sixth lens L56, and an optical filter OF5, all of which are arranged in order from an object side to an image side along an optical axis OA5. In operation, an image of light rays from the object side is formed at an image plane IMA5.

The first lens L51 is a meniscus lens with positive refractive power, wherein the object side surface S52 is a convex surface, the image side surface S53 is a concave surface, and both of the object side surface S52 and image side surface S53 are aspheric surfaces.

The second lens L52 is a meniscus lens with negative refractive power, wherein the object side surface S54 is a convex surface, the image side surface S55 is a concave surface, and both of the object side surface S54 and image side surface S55 are aspheric surfaces.

The third lens L53 is a biconvex lens with positive refractive power, wherein the object side surface S56 is a convex surface, the image side surface S57 is a convex surface, and both of the object side surface S56 and image side surface S57 are aspheric surfaces.

The fourth lens L54 is a biconcave lens with negative refractive power, wherein the object side surface S58 is a concave surface, the image side surface S59 is a concave surface, and both of the object side surface S58 and image side surface S59 are aspheric surfaces.

The fifth lens L55 is a meniscus lens with positive refractive power, wherein the object side surface S510 is a concave surface, the image side surface S511 is a convex surface, and both of the object side surface S510 and image side surface S511 are aspheric surfaces.

The sixth lens L56 is a biconcave lens with negative refractive power, wherein the object side surface S512 is a concave surface, the image side surface S513 is a concave surface, and both of the object side surface S512 and image side surface S513 are aspheric surfaces.

Both of the object side surface S514 and image side surface S515 of the optical filter OF5 are plane surfaces.

In order to maintain excellent optical performance of the lens assembly in accordance with the fifth embodiment of the invention, the lens assembly 5 satisfies any one of the conditions (1)-(5) and (7)-(16), wherein the definition for all of the parameters in the fifth embodiment is the same as that of in the first embodiment, and is not described here again.

By the above design of the lenses, stop ST5, and satisfies any one of the conditions (1)-(5) and (7)-(16), the lens assembly 5 is provided with an effective shortened total lens length, an effective decreased F-number, an effective decreased weight, an effective increased resolution, an effective corrected chromatic aberration, and an effective corrected aberration.

In order to achieve the above purposes and effectively enhance the optical performance, the lens assembly 5 in accordance with the fifth embodiment of the invention is provided with the optical specifications shown in Table 13, which include the effective focal length, F-number, total lens length, field of view, radius of curvature of each lens surface, thickness between adjacent surface, refractive index of each lens, and Abbe number of each lens.

TABLE 13

Effective Focal Length = 4.23 mm F-number = 1.65
Total Lens Length = 4.99 mm Field of View = 82.8 Degrees

| Surface Number | Radius of Curvature (mm) | Thickness (mm) | Nd | Vd | Remark |
|---|---|---|---|---|---|
| S51 | ∞ | −0.57181 | | | Stop STS |
| S52 | 1.750584 | 0.697334 | 1.58999 | 67.81 | The First Lens L51 |
| S53 | 3.672437 | 0.099595 | | | |
| S54 | 3.170552 | 0.25218 | 1.66059 | 20.40123 | The Second Lens L52 |
| S55 | 2.681956 | 0.292644 | | | |
| S56 | 37.442 | 0.483343 | 1.543915 | 55.9512 | The Third Lens L53 |
| S57 | −9.90774 | 0.258498 | | | |
| S58 | −12.1396 | 0.234066 | 1.66059 | 20.40123 | The Fourth Lens L54 |
| S59 | 64.56854 | 0.277409 | | | |
| S510 | −16.4861 | 0.702394 | 1.543915 | 55.9512 | The Fifth Lens L55 |
| S511 | −1.3491 | 0.314822 | | | |
| S512 | −9.90673 | 0.408698 | 1.543915 | 55.9512 | The Sixth Lens L56 |
| S513 | 1.353292 | 0.65 | | | |
| S514 | ∞ | 0.11 | 1.5168 | 64.16734 | Optical Filter OF5 |
| S515 | ∞ | 0.216634 | | | |

The definition of aspheric surface sag z of each lens in table 13 is the same as that of in Table 1.

In the fifth embodiment, the conic constant k and the aspheric coefficients A, B, C, D, E, F, G, J, K, L of each surface are shown in Table 14, and the other aspheric coefficients H, I, M are equal to 0.

TABLE 14

| Surface Number | k | A / E / J | B / F / K | C / G / L | D |
|---|---|---|---|---|---|
| S52 | −0.00138 | 0.000547397 | 6.41E−03 | −3.55E−03 | 4.92E−03 |
| | | −4.54E−03 | 2.64E−03 | −0.000510926 | |
| | | 0 | 0 | 0 | |
| S53 | −9.52848 | −0.046487266 | 0.021649752 | 0.02353237 | −0.029161732 |
| | | 0.007656058 | 0.003714658 | −0.001656847 | |
| | | 0 | 0 | 0 | |
| S54 | −22.3466 | −0.048874504 | 0.02460491 | 0.04515919 | −0.038395071 |
| | | 0.009454114 | −0.000180934 | 0.000910342 | |
| | | 0.002340264 | −0.017387152 | 0.003101524 | |
| S55 | −0.62953 | −0.04926931 | −0.052808055 | 0.10701683 | −0.028077459 |
| | | −0.073357332 | 0.072281918 | −0.016145958 | |
| | | −0.011340252 | 0.051126173 | −0.001097347 | |
| S56 | −13937.8 | −0.064604326 | −0.13076309 | 0.12330523 | −0.14101957 |
| | | 0.03402293 | 0.042728722 | −0.02951469 | |
| | | 0.014707298 | 0.070815302 | −0.001610433 | |
| S57 | 69.22626 | 0.088085257 | 7.72E−01 | −0.7152203 | 4.98E−01 |
| | | −0.17288526 | 4.25E−04 | 1.38E−02 | |
| | | −1.55E−02 | −5.70E−01 | 9.99E−03 | |
| S58 | 85.33349 | 0.32008127 | 1.85E+00 | −1.1001417 | 5.21E−01 |
| | | −0.10800028 | 1.77E−02 | −7.59E−03 | |
| | | −3.91E−02 | −1.61E+00 | 1.22E−02 | |
| S59 | −10 | 0.22967482 | 1.0771341 | −0.47745012 | 0.18097404 |
| | | −0.024535034 | −0.002712774 | 0.000485695 | |
| | | −0.038854174 | −1.0804303 | 0.003278037 | |
| S510 | 111.1392 | 0.35194806 | 0.72187496 | −0.36180154 | 0.20223762 |
| | | −0.070224737 | 1.10E−02 | −0.000201741 | |
| | | −0.043286483 | −0.85927677 | −0.002467159 | |
| S511 | −0.53404 | 0.33855424 | 0.14219959 | 0.009195001 | −0.026731123 |
| | | 1.77E−02 | −4.79E−03 | 0.000465429 | |
| | | −0.037244636 | −0.36744085 | −0.000578835 | |
| S512 | −679.587 | −0.51369736 | −0.14906951 | 0.022876746 | −0.005535932 |
| | | 0.000823181 | −6.45E−05 | 2.09E−06 | |
| | | 0.038235912 | 0.44191222 | −9.68253E−05 | |
| S513 | −8.76502 | −0.38789623 | −0.11523462 | 0.007668864 | −0.000456164 |
| | | −2.88E−06 | 2.42E−06 | −9.74E−08 | |
| | | 0.089388226 | 0.33818595 | −0.000135247 | |

Table 15 shows the parameters and condition values for conditions (1)-(5) and (7)-(16) in accordance with the fifth embodiment of the invention. As can be seen from Table 15, the lens assembly 5 of the fifth embodiment satisfies the conditions (1)-(5) and (7)-(16).

TABLE 15

| | | | | | |
|---|---|---|---|---|---|
| $f5_1$ | 4.9826 mm | f55 | 2.64923 mm | $f5_6$ | −2.1543 mm |
| $f5_{234}$ | 39.2478 mm | f5 | 4.23 mm | $R5_{11}$ | 1.75058 mm |
| $R5_{12}$ | 3.67244 mm | $R5_{21}$ | 3.17055 mm | $R5_{22}$ | 2.68196 mm |
| | | $R5_{52}$ | −1.3491 mm | $R5_{62}$ | 1.35329 mm |
| $D5_1$ | 2.534 mm | AAG5 | 1.242967 mm | F5 | 1.65 |
| $T5_1$ | 0.69733 mm | $T5_2$ | 0.25218 mm | $T5_5$ | 0.70239 mm |
| $T5_6$ | 0.4087 mm | $G5_5$ | 0.31482 mm | $TTL_5$ | 4.99 mm |
| $D5_1/T5_6$ | 6.20 | $f5/D5_1$ | 1.67 | | |
| $f5 \times ((f5_1 − f5_6)/(T5_5 + T5_6 − R5_{62} + R5_{52}))$ | | | | | −18.97 mm |
| $\|f5 \times (R5_{21} + R5_{22})/(R5_{21} − R5_{22})\|$ | | | | | 50.67 mm |
| $\|AAG5 \times (R5_{21} + R5_{22})/(R5_{21} − R5_{22})\|$ | | | | | 14.89 mm |
| $\|F5 \times (R5_{21} + R5_{22})/(R5_{21} − R5_{22})\|$ | | | | | 19.76 |
| $(f5_1 \times f5_6)/(T5_1 + T5_2 + T5_6)$ | | | | | −7.90 mm |
| $(f5_1 − f5_6)/((T5_5 + T5_6)/G5_5)$ | | | | | 2.02 mm |
| $(R5_{11} + R5_{12} + R5_{52} + R5_{62}) \times ((T5_5 + T5_6)/G5_5)$ | | | | | 19.15 mm |
| $(R5_{11} + R5_{12})/(R5_{52} − R5_{62})$ | | | | | −2.01 |
| $TTL5/(R5_{62} − R5_{52})$ | | | | | 1.85 |
| $(f5_1 + f5_5 + f5_6)/(T5_5 + T5_6 − R5_{62} + R5_{52})$ | | | | | −3.44 |
| $(f5_1 − f5_6)/(T5_5 + T5_6 − R5_{62} + R5_{52})$ | | | | | −4.48 |
| $F5 \times ((f5_1 − f5_6)/(T5_5 + T5_6 − R5_{62} + R5_{52}))$ | | | | | −7.40 |

Figure 10A:
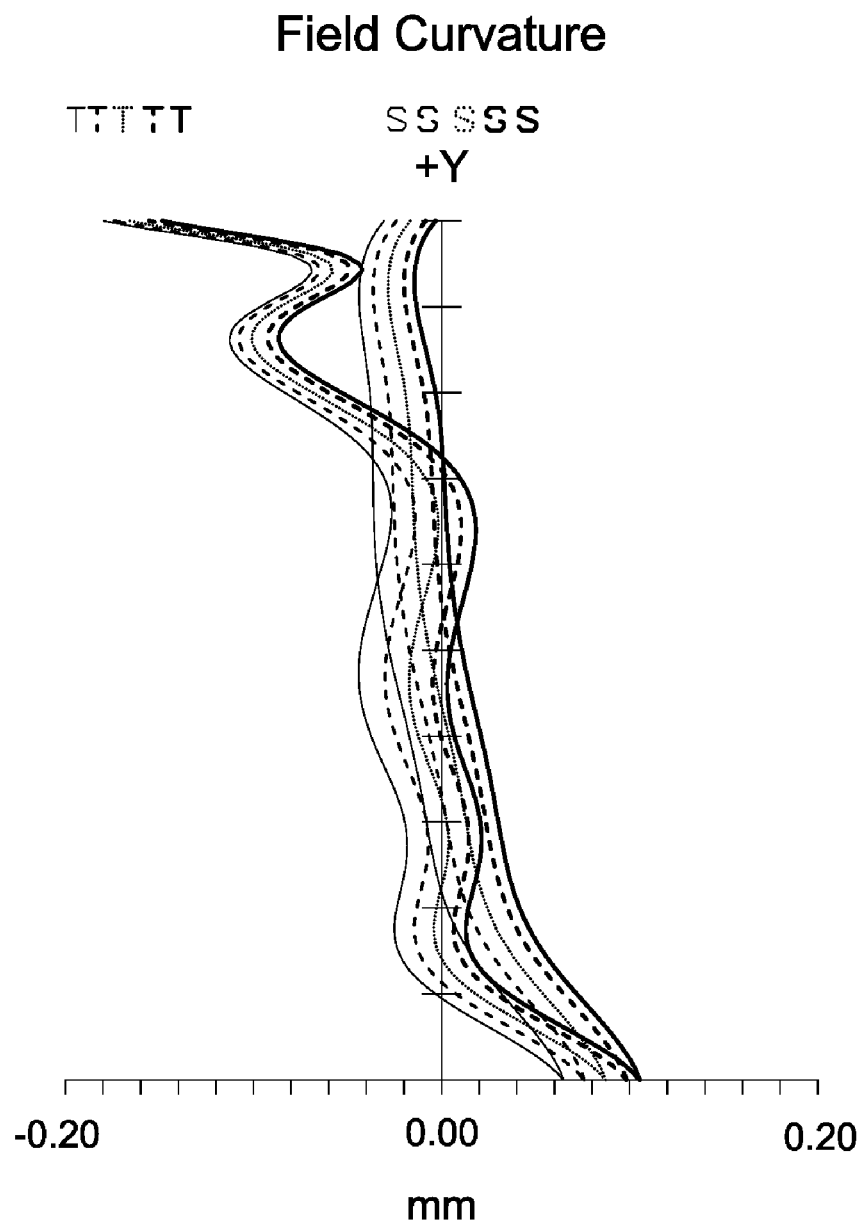
FIG. 10A depicts a field curvature diagram of the lens assembly in accordance with the fifth embodiment of the invention.
Figure 10B:
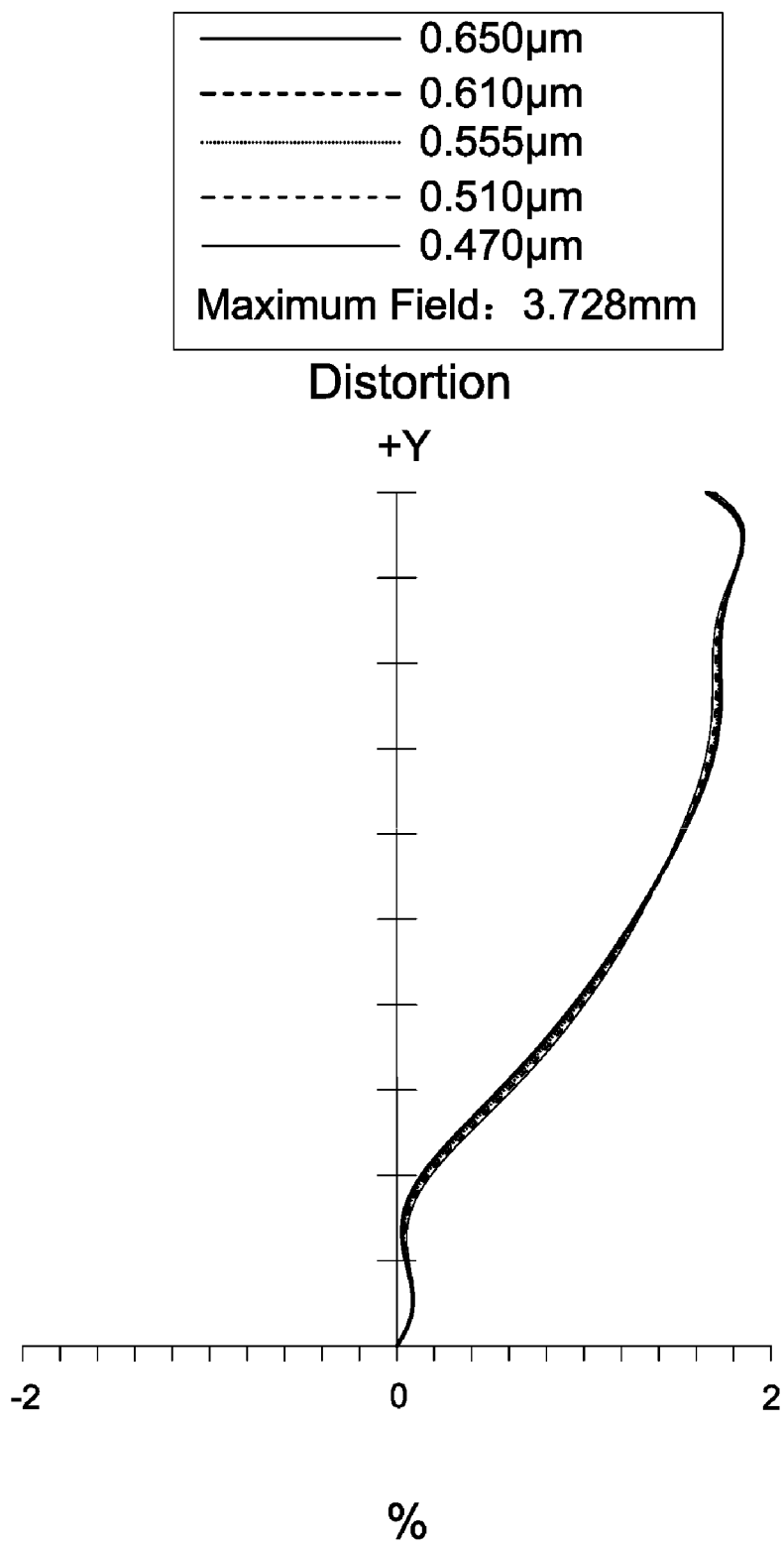
FIG. 10B is a distortion diagram of the lens assembly in accordance with the fifth embodiment of the invention.
Figure 10C:
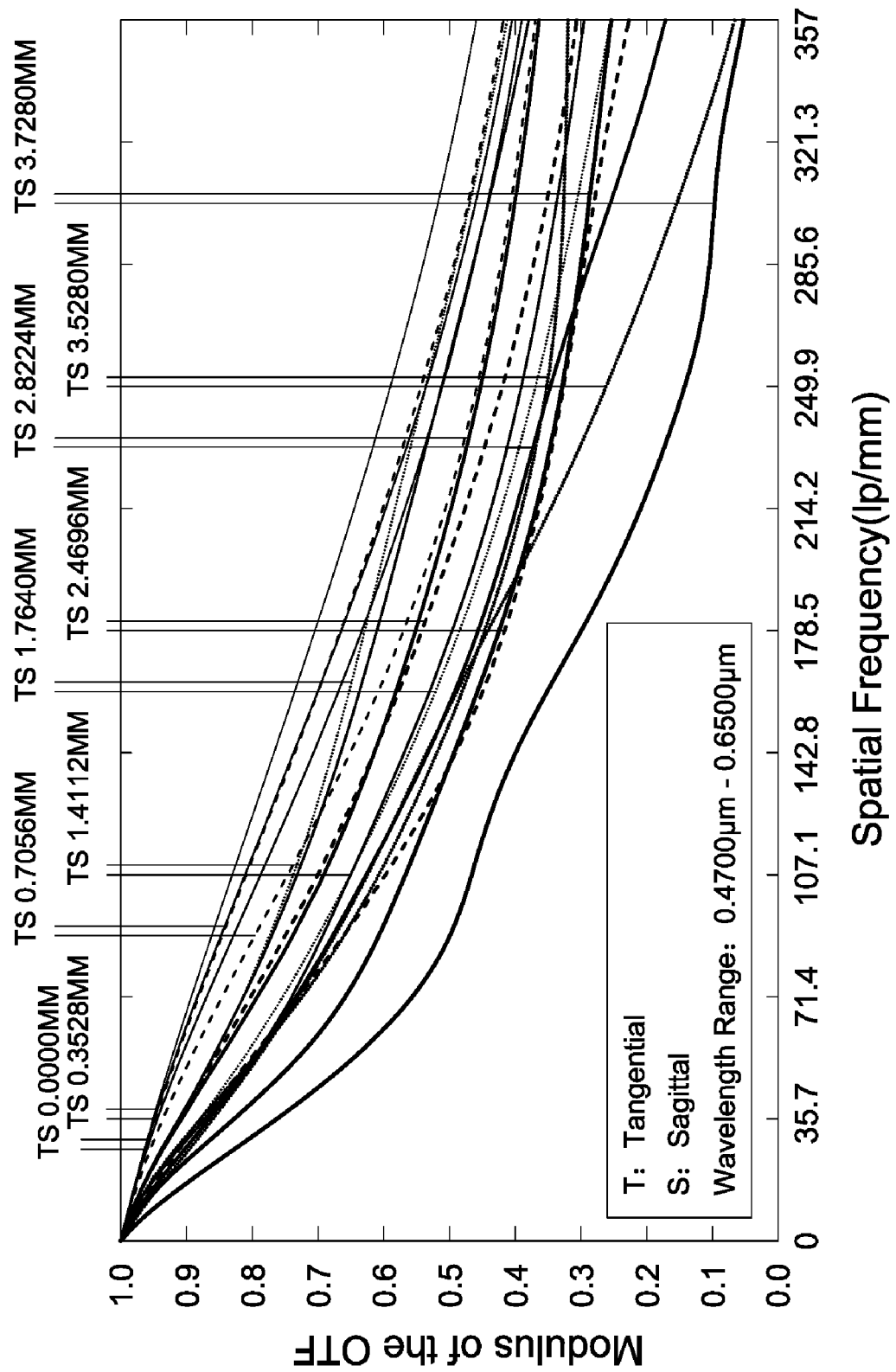
FIG. 10C is a modulation transfer function diagram of the lens assembly in accordance with the fifth embodiment of the invention.

By the above arrangements of the lenses and stop ST5, the lens assembly 5 of the fifth embodiment can meet the requirements of optical performance as seen in FIGS. 10A-10C, wherein FIG. 10A shows a field curvature diagram of the lens assembly 5 in accordance with the fifth embodiment of the invention, FIG. 10B shows a distortion diagram of the lens assembly 5 in accordance with the fifth embodiment of the invention, and FIG. 10C shows a modulation transfer function diagram of the lens assembly 5 in accordance with the fifth embodiment of the invention.

It can be seen from FIG. 10A that the field curvature of tangential direction and sagittal direction in the lens assembly 5 of the fifth embodiment ranges from −0.2 mm to 0.2 mm for the wavelength of 0.470 μm, 0.510 μm, 0.555 μm, 0.610 μm, and 0.650 μm.

It can be seen from FIG. 10B (the five lines in the figure almost coincide to appear as if a signal line) that the distortion in the lens assembly 5 of the fifth embodiment ranges from 0.0% to 2.0% for the wavelength of 0.470 μm, 0.510 μm, 0.555 μm, 0.610 μm, and 0.650 μm.

It can be seen from FIG. 10C that the modulation transfer function of tangential direction and sagittal direction in the lens assembly 5 of the fifth embodiment ranges from 0.05 to 1.0 wherein the wavelength ranges from 0.4700 μm to 0.6500 μm, the fields respectively are 0.0000 mm, 0.3528 mm, 0.7056 mm, 1.4112 mm, 1.7640 mm, 2.4696 mm, 2.8224 mm, 3.5280 mm, and 3.7280 mm, and the spatial frequency ranges from 0 lp/mm to 357 lp/mm.

It is obvious that the field curvature and the distortion of the lens assembly 5 of the fifth embodiment can be corrected effectively, and the resolution of the lens assembly 5 of the fifth embodiment can meet the requirement. Therefore, the lens assembly 5 of the fifth embodiment is capable of good optical performance.

Referring to FIG. 11, FIG. 11 is a lens layout diagram of a lens assembly in accordance with a sixth embodiment of the invention. The lens assembly 6 includes a stop ST6, a first lens L61, a second lens L62, a third lens L63, a fourth lens L64, a fifth lens L65, a sixth lens L66, and an optical filter OF6, all of which are arranged in order from an object side to an image side along an optical axis OA6. In operation, an image of light rays from the object side is formed at an image plane IMA6.

The first lens L61 is a meniscus lens with positive refractive power, wherein the object side surface S62 is a convex surface, the image side surface S63 is a concave surface, and both of the object side surface S62 and image side surface S63 are aspheric surfaces.

The second lens L62 is a meniscus lens with positive refractive power, wherein the object side surface S64 is a concave surface, the image side surface S65 is a convex surface, and both of the object side surface S64 and image side surface S65 are aspheric surfaces.

The third lens L63 is a meniscus lens with negative refractive power, wherein the object side surface S66 is a concave surface, the image side surface S67 is a convex surface, and both of the object side surface S66 and image side surface S67 are aspheric surfaces.

The fourth lens L64 is a meniscus lens with positive refractive power, wherein the object side surface S68 is a concave surface, the image side surface S69 is a convex surface, and both of the object side surface S68 and image side surface S69 are aspheric surfaces.

The fifth lens L65 is a meniscus lens with positive refractive power, wherein the object side surface S610 is a concave surface, the image side surface S611 is a convex surface, and both of the object side surface S610 and image side surface S611 are aspheric surfaces.

The sixth lens L66 is a meniscus lens with negative refractive power, wherein the object side surface S612 is a convex surface, the image side surface S613 is a concave surface, and both of the object side surface S612 and image side surface S613 are aspheric surfaces.

Both of the object side surface S614 and image side surface S615 of the optical filter OF6 are plane surfaces.

In order to maintain excellent optical performance of the lens assembly in accordance with the sixth embodiment of the invention, the lens assembly 6 satisfies any one of the conditions (1)-(2) and (7)-(16), wherein the definition for all of the parameters in the sixth embodiment is the same as that of in the first embodiment, and is not described here again.

By the above design of the lenses, stop ST6, and satisfies any one of the conditions (1)-(2) and (7)-(16), the lens assembly 6 is provided with an effective shortened total lens length, an effective decreased F-number, an effective decreased weight, an effective increased resolution, an effective corrected chromatic aberration, and an effective corrected aberration.

In order to achieve the above purposes and effectively enhance the optical performance, the lens assembly 6 in accordance with the sixth embodiment of the invention is provided with the optical specifications shown in Table 16, which include the effective focal length, F-number, total lens length, field of view, radius of curvature of each lens surface, thickness between adjacent surface, refractive index of each lens, and Abbe number of each lens.

TABLE 16

Effective Focal Length = 4.17 mm F-number = 2.0
Total Lens Length = 4.98 mm Field of View = 83.6 Degrees

| Surface Number | Radius of Curvature (mm) | Thickness (mm) | Nd | Vd | Remark |
|---|---|---|---|---|---|
| S61 | ∞ | −0.30797 | | | Stop ST6 |
| S62 | 1.807819 | 0.606708 | 1.610351 | 57.92815 | The First Lens L61 |
| S63 | 5.957258 | 0.312381 | | | |
| S64 | −9.09745 | 0.394916 | 1.544100 | 56.0936 | The Second Lens L62 |
| S65 | −2.39484 | 0.076994 | | | |
| S66 | −2.59999 | 0.383669 | 1.642830 | 22.43732 | The Third Lens L63 |
| S67 | −12.9391 | 0.357447 | | | |
| S68 | −8.02933 | 0.530706 | 1.544100 | 56.0936 | The Fourth Lens L64 |
| S69 | −3.44785 | 0.104478 | | | |
| S610 | −10.1302 | 0.50696 | 1.642830 | 22.43732 | The Fifth Lens L65 |
| S611 | −5.14542 | 0.170237 | | | |
| S612 | 2.810076 | 0.49415 | 1.544100 | 56.0936 | The Sixth Lens L66 |
| S613 | 1.139288 | 0.92 | | | |
| S614 | ∞ | 0.11 | 1.516800 | 64.16734 | Optical Filter OF6 |
| S615 | ∞ | 0.015334 | | | |

The definition of aspheric surface sag z of each lens in table 16 is the same as that of in Table 1.

In the sixth embodiment, the conic constant k and the aspheric coefficients A, B, C, D, E, F, G of each surface are shown in Table 17, and the other aspheric coefficients H, I, J, K, L, M are equal to 0.

TABLE 17

| Surface Number | k | A<br>E | B<br>F | C<br>G | D |
|---|---|---|---|---|---|
| S62 | 0.30657 | −0.00513074<br>−0.001588744 | −0.015803818<br>−0.000115824 | 0.007198297<br>−0.002172294 | −0.007591283 |
| S63 | 0 | −0.01381087<br>−0.0049889 | −0.0126376<br>−0.002298279 | −0.009364532<br>0.005959455 | −0.009106053 |
| S64 | 0 | −0.015015139<br>0.004600697 | −0.010867672<br>0.001623895 | −0.032309626<br>−0.002559166 | 0.001894107 |
| S65 | 0 | 0.03009948<br>−0.001042755 | −0.097592115<br>0.000328439 | 0.056449743<br>−0.001196807 | −0.024233896 |
| S66 | 0 | −0.04038323<br>−0.014231278 | −0.079606036<br>−0.000525263 | 0.10082029<br>0.001649621 | −0.022806028 |
| S67 | 0 | −0.057621011<br>0.001218668 | −0.017195312<br>−0.003207762 | 0.049807788<br>0.003173573 | −0.011423448<br>0.001218668 |
| S68 | −54.6299 | 0.01569255<br>−0.004407208 | −0.063632683<br>0.000160786 | 0.000895301<br>−0.000807658 | 0.011770605 |
| S69 | −22.1618 | 0.022110213<br>−0.00590646 | −0.042752003<br>0.001441162 | 0.004983064<br>−0.000105878 | 0.007943534 |
| S610 | −3142.47 | 0.025417812<br>−0.005848673 | −0.046544844<br>0.001282659 | 0.006546563<br>−6.05981E−05 | 0.007745812 |
| S611 | −56.1747 | 0.027601957<br>−0.0003743 | −0.02610412<br>5.48761E−05 | 0.003446583<br>3.70804E−07 | 0.000460477 |
| S612 | −94.9083 | −0.11416688<br>0.000155697 | 0.030570992<br>1.43475E−05 | −0.004324753<br>−3.43852E−06 | −0.000468362 |
| S613 | −7.68256 | −0.052905843<br>1.86915E−05 | 0.010927835<br>−2.50491E−06 | −0.001524103<br>9.79937E−08 | 3.03716E−05 |

Table 18 shows the parameters and condition values for conditions (1)-(2) and (7)-(16) in accordance with the sixth embodiment of the invention. As can be seen from Table 18, the lens assembly 6 of the sixth embodiment satisfies the conditions (1)-(2) and (7)-(16).

TABLE 18

| | | | | | |
|---|---|---|---|---|---|
| $f6_1$ | 4.012 mm | $f6_5$ | 15.479 mm | $f6_6$ | −3.9154 mm |
| $f6_{234}$ | 14.086 mm | $f6$ | 4.17 mm | $R6_{11}$ | 1.80782 mm |
| $R6_{12}$ | 5.95726 mm | | | | |
| | | $R6_{52}$ | −5.14542 mm | $R6_{62}$ | 1.13929 mm |
| $D6_1$ | 2.083 mm | | | F6 | 2 |
| $T6_1$ | 0.60671 mm | $T6_2$ | 0.39492 mm | $T6_5$ | 0.50696 mm |
| $T6_6$ | 0.49415 mm | $G6_5$ | 0.17024 mm | TTL6 | 4.98 mm |
| $D6_1/T6_6$ | 4.22 | $f6/D6_1$ | 2.0019203 | | |
| $f6 \times ((f6_1 - f6_6)/(T6_5 + T6_6 - R6_{62} + R6_{52}))$ | | | | | −6.26 mm |
| $(f6_1 \times f6_6)/(T6_1 + T6_2 + T6_6)$ | | | | | −10.50 mm |
| $(f6_1 - f6_6)/((T6_5 + T6_6)/G6_5)$ | | | | | 1.35 mm |
| $(R6_{11} + R6_{12} + R6_{52} + R6_{62}) \times ((T6_5 + T6_6)/G6_5)$ | | | | | 22.10 mm |
| $(R6_{11} + R6_{12})/(R6_{52} - R6_{62})$ | | | | | −1.24 |
| $TTL6/(R6_{62} - R6_{52})$ | | | | | 0.79 |
| $(f6_1 + f6_5 + f6_6)/(T6_5 + T6_6 - R6_{62} + R6_{52})$ | | | | | −2.95 |
| $(f6_1 - f6_6)/(T6_5 + T6_6 - R6_{62} + R6_{52})$ | | | | | −1.50 |
| $F6 \times ((f6_1 - f6_6)/(T6_5 + T6_6 - R6_{62} + R6_{52}))$ | | | | | −3.0008 |

Figure 12A:
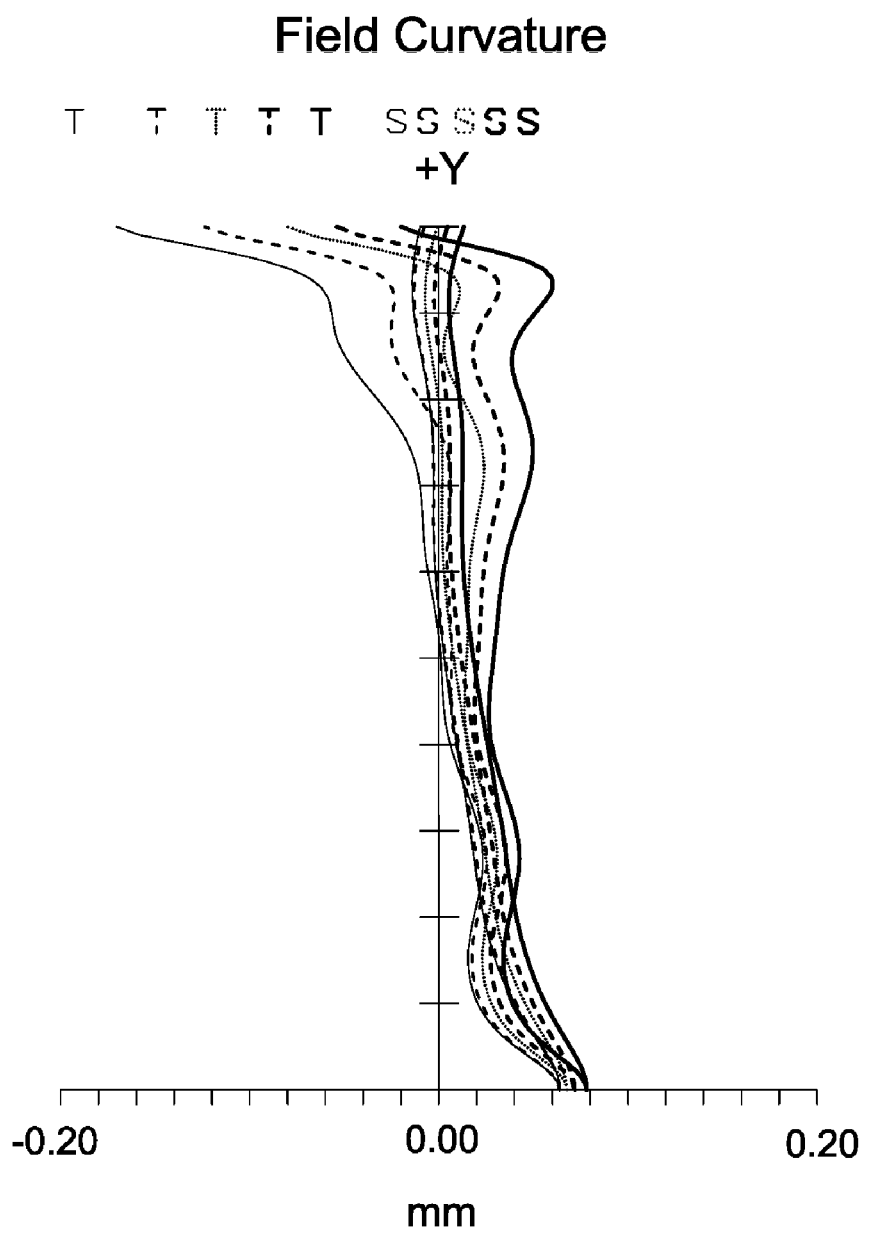
FIG. 12A depicts a field curvature diagram of the lens assembly in accordance with the sixth embodiment of the invention.
Figure 12B:
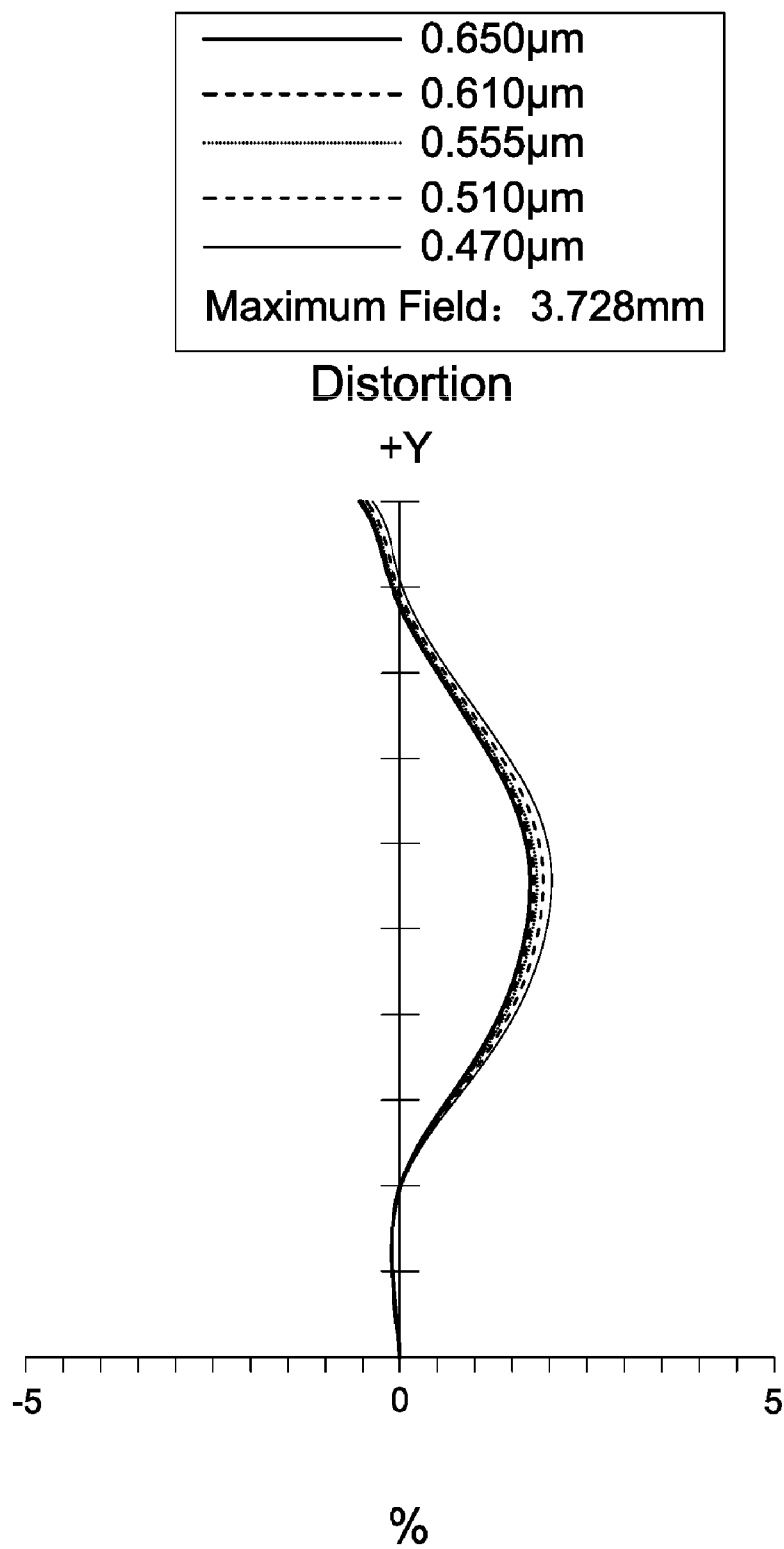
FIG. 12B is a distortion diagram of the lens assembly in accordance with the sixth embodiment of the invention.
Figure 12C:
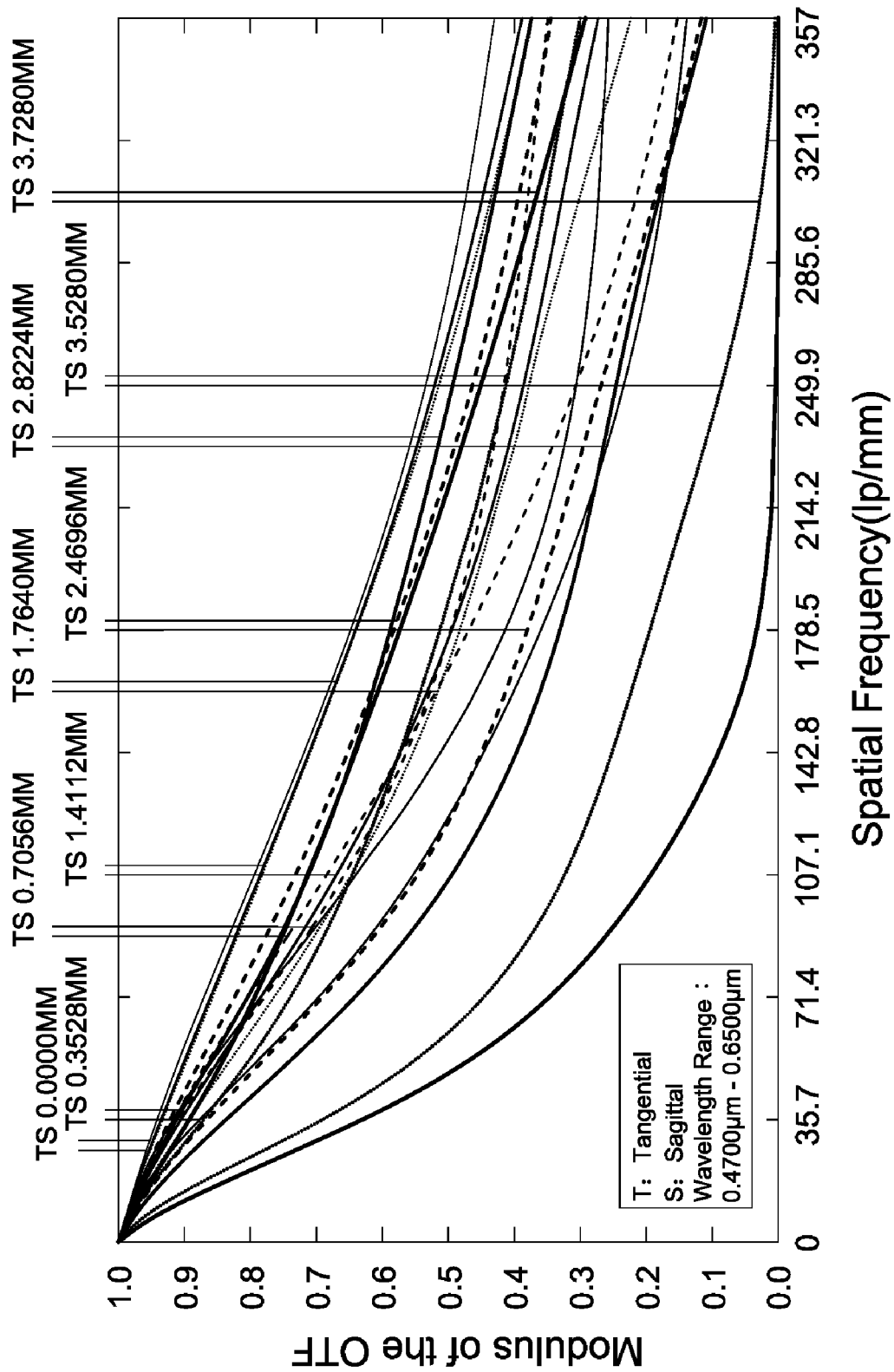
FIG. 12C is a modulation transfer function diagram of the lens assembly in accordance with the sixth embodiment of the invention.

By the above arrangements of the lenses and stop ST6, the lens assembly 6 of the sixth embodiment can meet the requirements of optical performance as seen in FIGS. 12A-12C, wherein FIG. 12A shows a field curvature diagram of the lens assembly 6 in accordance with the sixth embodiment of the invention, FIG. 12B shows a distortion diagram of the lens assembly 6 in accordance with the sixth embodiment of the invention, and FIG. 12C shows a modulation transfer function diagram of the lens assembly 6 in accordance with the sixth embodiment of the invention.

It can be seen from FIG. 12A that the field curvature of tangential direction and sagittal direction in the lens assembly 6 of the sixth embodiment ranges from −0.2 mm to 0.2 mm for the wavelength of 0.436 μm, 0.486 μm, 0.546 μm, 0.588 μm, and 0.656 μm.

It can be seen from FIG. 12B that the distortion in the lens assembly 6 of the sixth embodiment ranges from −0.5% to 2.0% for the wavelength of 0.470 μm, 0.510 μm, 0.555 μm, 0.610 μm, and 0.650 μm.

It can be seen from FIG. 12C that the modulation transfer function of tangential direction and sagittal direction in the lens assembly 6 of the sixth embodiment ranges from 0.0 to 1.0 wherein the wavelength ranges from 0.470 μm to 0.650 μm, the fields respectively are 0.0000 mm, 0.3528 mm, 0.7056 mm, 1.4112 mm, 1.7640 mm, 2.4696 mm, 2.8224 mm, 3.5280 mm, and 3.7280 mm, and the spatial frequency ranges from 0 lp/mm to 357 lp/mm.

It is obvious that the field curvature and the distortion of the lens assembly 6 of the sixth embodiment can be corrected effectively, and the resolution of the lens assembly 6 of the sixth embodiment can meet the requirement. Therefore, the lens assembly 6 of the sixth embodiment is capable of good optical performance.

Referring to Table 19 and Table 20, Table 19 provides optical specifications in accordance with a seventh embodiment of the invention and Table 20 provides aspheric coefficients of each surface in Table 19.

The figure which depicts the lens layout diagram of the lens assembly in accordance with the seventh embodiment of the invention approximates to the figure which depicts the lens layout diagram of the lens assembly in accordance with the fifth embodiment of the invention, thus the figure which depicts the lens layout diagram of the lens assembly in accordance with the seventh embodiment of the invention is omitted.

TABLE 19

| Effective Focal Length = 4.236 mm F-number = 1.65 | | | | | |
|---|---|---|---|---|---|
| Total Lens Length = 4.99 mm Field of View = 78.3 Degrees | | | | | |

| Surface Number | Radius of Curvature (mm) | Thickness (mm) | Nd | Vd | Remark |
|---|---|---|---|---|---|
| S71 | ∞ | −0.62774 | | | Stop ST7 |
| S72 | 1.627722 | 0.756657 | 1.535218 | 56.11525 | The First Lens L71 |
| S73 | 4.080465 | 0.079865 | | | |
| S74 | 2.84657 | 0.278 | 2.001780 | 19.32 | The Second Lens L72 |
| S75 | 2.32436 | 0.262752 | | | |
| S76 | 12.66065 | 0.456 | 1.535218 | 56.11525 | The Third Lens L73 |
| S77 | −13.7164 | 0.271033 | | | |
| S78 | −16.9747 | 0.26 | 1.660590 | 20.40123 | The Fourth Lens L74 |
| S79 | 45.60124 | 0.253792 | | | |
| S710 | −15.716 | 0.746372 | 1.535218 | 56.11525 | The Fifth Lens L75 |
| S711 | −1.27719 | 0.243613 | | | |
| S712 | −4.04454 | 0.42 | 1.535218 | 56.11525 | The Sixth Lens L76 |
| S713 | 1.447312 | 0.66 | | | |
| S714 | ∞ | 0.11 | 1.516800 | 64.16734 | Optical Filter OF7 |
| S715 | ∞ | 0.2 | | | |

The definition of aspheric surface sag z of each lens in table 19 is the same as that of in Table 1.

In the seventh embodiment, the conic constant k and the aspheric coefficients A, B, C, D, E, F, G, J, K, L, M of each surface are shown in Table 20, and the other aspheric coefficients H, I are equal to 0.

TABLE 20

| Surface Number | k | A<br>E<br>J | B<br>F<br>K | C<br>G<br>L | D<br>M |
|---|---|---|---|---|---|
| S72 | 0.045146 | −0.001569882<br>−0.004431468<br>0 | 0.005059525<br>0.002447748<br>0 | −0.003807359<br>−0.000372474<br>0 | 0.004122281<br>0 |
| S73 | −34.1485 | −0.036791979<br>0.008643353<br>0 | 0.02809305<br>0.006433429<br>0 | 0.019252996<br>−0.003273164<br>0 | −0.031233713<br>0 |
| S74 | −14.6507 | −0.024625861<br>0.015463873<br>−0.002103206 | 0.016103755<br>0.001886283<br>−0.000349992 | 0.03079941<br>−0.002920977<br>−4.40757E−05 | −0.035532323<br>0.000211429 |
| S75 | −0.19035 | −0.050451903<br>−0.069401894<br>0.001376548 | −0.045852747<br>0.11136868<br>0.051366519 | 0.10211304<br>−0.040003986<br>0.00171169 | −0.047855933<br>0.00176841 |
| S76 | −403.065 | −0.005121224<br>0.024156877<br>−0.000978432 | −0.15622378<br>0.028524947<br>0.072361387 | 0.14446055<br>−0.016120786<br>−0.002929743 | −0.11913877<br>−0.001354302 |
| S77 | 126.0288 | 0.052475173<br>−0.1783558<br>0.016271979 | 0.76707276<br>−0.021199159<br>−0.52341481 | −0.72689625<br>0.023001029<br>−0.001905314 | 0.52789726<br>−0.00117235 |
| S78 | 185.7491 | 0.30766901<br>−0.11502471<br>−0.006793819 | 1.8521714<br>0.003387359<br>−1.5850335 | −1.1223837<br>0.001105185<br>0.001695278 | 0.53721312<br>−0.000156364 |
| S79 | −69415.9 | 0.20121037<br>−0.021759738<br>−0.005710663 | 1.1009653<br>−0.00071026<br>−1.0712677 | −0.49766536<br>−0.000320373<br>0.000150137 | 0.17708524<br>0.000401518 |
| S710 | 41.00672 | 0.29593521<br>−0.070891674<br>−0.03205605 | 0.74623072<br>0.011250418<br>−0.8706028 | −0.36665154<br>−0.000151578<br>−0.000588227 | 0.20164721<br>0.000452395 |
| S711 | −0.58978 | 0.32405263<br>0.017318853<br>−0.013334893 | 0.14924314<br>−0.004963155<br>−0.39343155 | 0.017127488<br>0.000511527<br>−0.000483399 | −0.026966213<br>−1.03817E−05 |
| S712 | −142.06 | −0.53466278<br>0.00083304<br>0.01945302 | −0.14520916<br>−5.6926E−05<br>0.45974015 | 0.022213654<br>1.40262E−06<br>−5.17069E−05 | −0.005777113<br>2.50547E−06 |
| S713 | −7.72616 | −0.32836017<br>−1.02677E−05<br>0.032162248 | −0.11800884<br>3.47615E−06<br>0.32168198 | 0.008505493<br>−1.19786E−07<br>3.24297E−05 | −0.00050586<br>−4.57375E−06 |

In order to maintain excellent optical performance of the lens assembly in accordance with the seventh embodiment of the invention, the lens assembly 7 satisfies any one of the conditions (1)-(5) and (7)-(16), wherein the definition for all of the parameters in the seventh embodiment is the same as that of in the first embodiment, and is not described here again.

By the above design of the lenses, stop ST7, and satisfies any one of the conditions (1)-(5) and (7)-(16), the lens assembly 7 is provided with an effective shortened total lens length, an effective decreased F-number, an effective decreased weight, an effective increased resolution, an effective corrected chromatic aberration, and an effective corrected aberration.

Table 21 shows the parameters and condition values for conditions (1)-(5) and (7)-(16) in accordance with the seventh embodiment of the invention. As can be seen from Table 21, the lens assembly 7 of the seventh embodiment satisfies the conditions (1)-(5) and (7)-(16).

TABLE 21

| | | | | | |
|---|---|---|---|---|---|
| $f7_1$ | 4.5525 mm | $f7_5$ | 2.54305 mm | $f7_6$ | −1.93341 mm |
| $f7_{234}$ | −31.7432 mm | $f7$ | 4.236 mm | $R7_{11}$ | 1.62772 mm |
| $R7_{12}$ | 4.08047 mm | $R7_{21}$ | 2.84657 mm | $R7_{22}$ | 2.32436 mm |
| | | $R7_{52}$ | −1.27719 mm | $R7_{62}$ | 1.44731 mm |
| $D7_1$ | 2.538 mm | $AAG7$ | 1.1110566 mm | $F7$ | 1.65 |
| $T7_1$ | 0.75666 mm | $T7_2$ | 0.278 mm | $T7_5$ | 0.74637 mm |
| $T7_6$ | 0.42 mm | $G7_5$ | 0.24361 mm | $TTL7$ | 4.99 mm |
| $D7_1/T7_6$ | 6.04 | $f7/D7_1$ | 1.67 | | |
| $f7 \times ((f7_1 - f7_6)/(T7_5 + T7_6 - R7_{62} + R7_{52}))$ | | | | | −17.633 mm |
| $|f7 \times (R7_{21} + R7_{22})/(R7_{21} - R7_{22})|$ | | | | | 41.94 mm |
| $|AAG7 \times (R7_{21} + R7_{22})/(R7_{21} - R7_{22})|$ | | | | | 11.00 mm |
| $|F7 \times (R7_{21} + R7_{22})/(R7_{21} - R7_{22})|$ | | | | | 16.34 |
| $(f7_1 \times f7_6)/(T7_1 + T7_2 + T7_6)$ | | | | | −6.05 mm |
| $(f7_1 - f7_6)/((T7_5 + T7_6)/G7_5)$ | | | | | 1.355 mm |

TABLE 21-continued

| | |
|---|---|
| $(R7_{11} + R7_{12} + R7_{52} + R7_{62}) \times ((T7_5 + T7_6)/G7_5)$ | 28.145 mm |
| $(R7_{11} + R7_{12})/(R7_{52} - R7_{62})$ | -2.095 |
| $TTL7/(R7_{62} - R7_{52})$ | 1.84 |
| $(f7_1 + f7_5 + f7_6)/(T7_5 + T7_6 - R7_{62} + R7_{52})$ | -3.313 |
| $(f7_1 - f7_6)/(T7_5 + T7_6 - R7_{62} + R7_{52})$ | -4.163 |
| $F7 \times ((f7_1 - f7_6)/(T7_5 + T7_6 - R7_{62} + R7_{52}))$ | -6.868 |

The above field curvature (figure is omitted) and distortion (figure is omitted) for the seventh embodiment of the lens assembly can be corrected effectively, and the resolution for the seventh embodiment of the lens assembly can meet the requirement. Therefore, the lens assembly of the seventh embodiment is capable of good optical performance.

Referring to Table 22 and Table 23, Table 22 provides optical specifications in accordance with an eighth embodiment of the invention and Table 23 provides aspheric coefficients of each surface in Table 22.

The refractive power of each lens for the lens assembly in accordance with the eighth embodiment of the invention is the same as the refractive power of each lens for the lens assembly in accordance with the first embodiment of the invention, thus the figure which depicts the lens layout diagram of the lens assembly in accordance with the eighth embodiment of the invention is omitted. The difference between the eighth embodiment of the lens assembly and the first embodiment of the lens assembly is that the image side surface of the third lens is a convex surface and the object side surface of the sixth lens is a concave surface for the eighth embodiment of the lens assembly, however, the image side surface of the third lens is a concave surface and the object side surface of the sixth lens is a convex surface for the first embodiment of the lens assembly.

TABLE 22

Effective Focal Length = 4.234 mm F-number = 1.65
Total Lens Length = 5.03 mm Field of View = 78.2 Degrees

| Surface Number | Radius of Curvature (mm) | Thickness (mm) | Nd | Vd | Remark |
|---|---|---|---|---|---|
| S81 | ∞ | -0.58603 | | | Stop ST8 |
| S82 | 1.716609 | 0.793083 | 1.535218 | 56.11525 | The First Lens L81 |
| S83 | 9.444403 | 0.015072 | | | |
| S84 | 3.58435 | 0.2278 | 2.001780 | 19.32 | The Second Lens L82 |
| S85 | 2.363694 | 0.370055 | | | |
| S86 | 71.7662 | 0.389261 | 1.535218 | 56.11525 | The Third Lens L83 |
| S87 | -30.1144 | 0.204263 | | | |
| S88 | 4.552548 | 0.222574 | 1.660590 | 20.40123 | The Fourth Lens L84 |
| S89 | 4.944316 | 0.39148 | | | |
| S810 | -35.4559 | 0.625013 | 1.535218 | 56.11525 | The Fifth Lens L85 |
| S811 | -1.58152 | 0.428692 | | | |
| S812 | -4.50528 | 0.393613 | 1.535218 | 56.11525 | The Sixth Lens L86 |
| S813 | 1.720188 | 0.56 | | | |
| S814 | ∞ | 0.11 | 1.516798 | 64.19826 | Optical Filter OF8 |
| S815 | ∞ | 0.3 | | | |

The definition of aspheric surface sag z of each lens in table 22 is the same as that of in Table 1.

In the eighth embodiment, the conic constant k and the aspheric coefficients A, B, C, D, E, F, G, J, K of each surface are shown in Table 23, and the other aspheric coefficients H, I, L, M are equal to 0.

TABLE 23

| Surface Number | k | A<br>E<br>J | B<br>F<br>K | C<br>G | D |
|---|---|---|---|---|---|
| S82 | 0.040265 | 0.002065124<br>-0.000549711<br>0 | 0.002023989<br>-0.000133617<br>0 | -7.49847E-05<br>0.00026632 | 0.000784326 |
| S83 | -6.70708 | 0.001221764<br>0.001563423<br>0 | -0.010551014<br>0.00307863<br>0 | 0.017970315<br>-0.001644655 | -0.009960723 |
| S84 | -2.80906 | -0.016948053<br>0.003280275<br>-1.25435E-06 | -0.002607381<br>-0.00031708<br>7.56484E-07 | 0.014187929<br>-0.000836915 | -0.004561274 |
| S85 | 0.088508 | -0.056508132<br>-0.00752146<br>0.009251782 | -0.088124235<br>0.000381412<br>0.10026269 | 0.054521758<br>0.004342868 | -0.003913967 |

TABLE 23-continued

| Surface Number | k | A E J | B F K | C G | D |
|---|---|---|---|---|---|
| S86 | −217.01 | −0.25097945<br>0.024649163<br>0.035572397 | −0.47889133<br>−0.002149693<br>0.48763936 | 0.207985<br>−0.005110856 | −0.11095735 |
| S87 | −74.2734 | 0.17580464<br>−0.15881392<br>−0.043663729 | 1.1748142<br>−0.000366384<br>−0.93001553 | −0.89567073<br>0.005644253 | 0.53973924 |
| S88 | 3.120861 | 0.38317809<br>−0.11198235<br>−0.10148793 | 2.0242467<br>−0.002149646<br>−1.7797541 | −1.1605626<br>0.001883351 | 0.5499743 |
| S89 | −136.438 | 0.37911375<br>−0.029188729<br>−0.060965579 | 1.2097693<br>0.001713331<br>−1.2859398 | −0.50087467<br>−0.000334046 | 0.17882263 |
| S810 | 34.81258 | 0.42519741<br>−0.071391364<br>−0.090325561 | 0.79699066<br>0.014466521<br>−0.96698499 | −0.3648293<br>−0.001122919 | 0.19306706 |
| S811 | −0.42132 | 0.29756349<br>0.018455753<br>−0.058711525 | 0.16768515<br>−0.005029961<br>−0.37027444 | 0.002595709<br>0.000481209 | −0.026979226 |
| S812 | 1.951797 | −0.54801936<br>0.000840773<br>0.085122837 | −0.15711312<br>−6.98552E−05<br>0.47026664 | 0.02396086<br>2.69762E−06 | −0.005677139 |
| S813 | −11.9529 | −0.38834641<br>−1.1217E−05<br>0.091392596 | −0.1232843<br>5.88554E−06<br>0.34619333 | 0.009361805<br>−2.76004E−07 | −0.000649345 |

In order to maintain excellent optical performance of the lens assembly in accordance with the eighth embodiment of the invention, the lens assembly 8 satisfies any one of the conditions (1)-(2) and (7)-(16), wherein the definition for all of the parameters in the eighth embodiment is the same as that of in the first embodiment, and is not described here again.

By the above design of the lenses, stop ST8, and satisfies any one of the conditions (1)-(2) and (7)-(16), the lens assembly 8 is provided with an effective shortened total lens length, an effective decreased F-number, an effective decreased weight, an effective increased resolution, an effective corrected chromatic aberration, and an effective corrected aberration.

Table 24 shows the parameters and condition values for conditions (1)-(2) and (7)-(16) in accordance with the eighth embodiment of the invention. As can be seen from Table 24, the lens assembly 8 of the eighth embodiment satisfies the conditions (1)-(2) and (7)-(16).

TABLE 24

| | | | | | |
|---|---|---|---|---|---|
| $f8_1$ | 3.7719 mm | $f8_5$ | 3.0631 mm | $f8_6$ | −2.2683 mm |
| $f8_{234}$ | −10.8248 mm | $f8$ | 4.234 mm | $R8_{11}$ | 1.71661 mm |
| $R8_{12}$ | 9.4444 mm | | | | |
| | | $R8_{52}$ | −1.58152 mm | $R8_{62}$ | 1.72019 mm |
| $D8_1$ | 2.537 mm | | | F8 | 1.65 |
| $T8_1$ | 0.79308 mm | $T8_2$ | 0.2278 mm | $T8_5$ | 0.62501 mm |
| $T8_6$ | 0.39361 mm | $G8_5$ | 0.42869 mm | TTL8 | 5.03 mm |
| $D8_1/T8_6$ | 6.45 | $f8/D8_1$ | 1.67 | | |
| $f8 \times ((f8_1 − f8_6)/(T8_5 + T8_6 − R8_{62} + R8_{52}))$ | | | | | −11.20 mm |
| $(f8_1 \times f8_6)/(T8_1 + T8_2 + T8_6)$ | | | | | −6.05 mm |
| $(f8_1 − f8_6)/((T8_5 + T8_6)/G8_5)$ | | | | | 2.54 mm |
| $(R8_{11} + R8_{12} + R8_{52} + R8_{62}) \times ((T8_5 + T8_6)/G8_5)$ | | | | | 26.85 mm |
| $(R8_{11} + R8_{12})/(R8_{52} − R8_{62})$ | | | | | −3.38 |
| $TTL8/R8_{62} − R8_{52})$ | | | | | 1.52 |
| $(f8_1 + f8_5 + f8_6)/(T8_5 + T8_6 − R8_{62} + R8_{52})$ | | | | | −2.00 |
| $(f8_1 − f8_6)/(T8_5 + T8_6 − R8_{62} + R8_{52})$ | | | | | −2.65 |
| $F8 \times ((f8_1 − f8_6)/(T8_5 + T8_6 − R8_{62} + R8_{52}))$ | | | | | −4.37 |

The above field curvature (figure is omitted) and distortion (figure is omitted) for the eighth embodiment of the lens assembly can be corrected effectively, and the resolution for the eighth embodiment of the lens assembly can meet the requirement. Therefore, the lens assembly of the eighth embodiment is capable of good optical performance.

Figure 13:
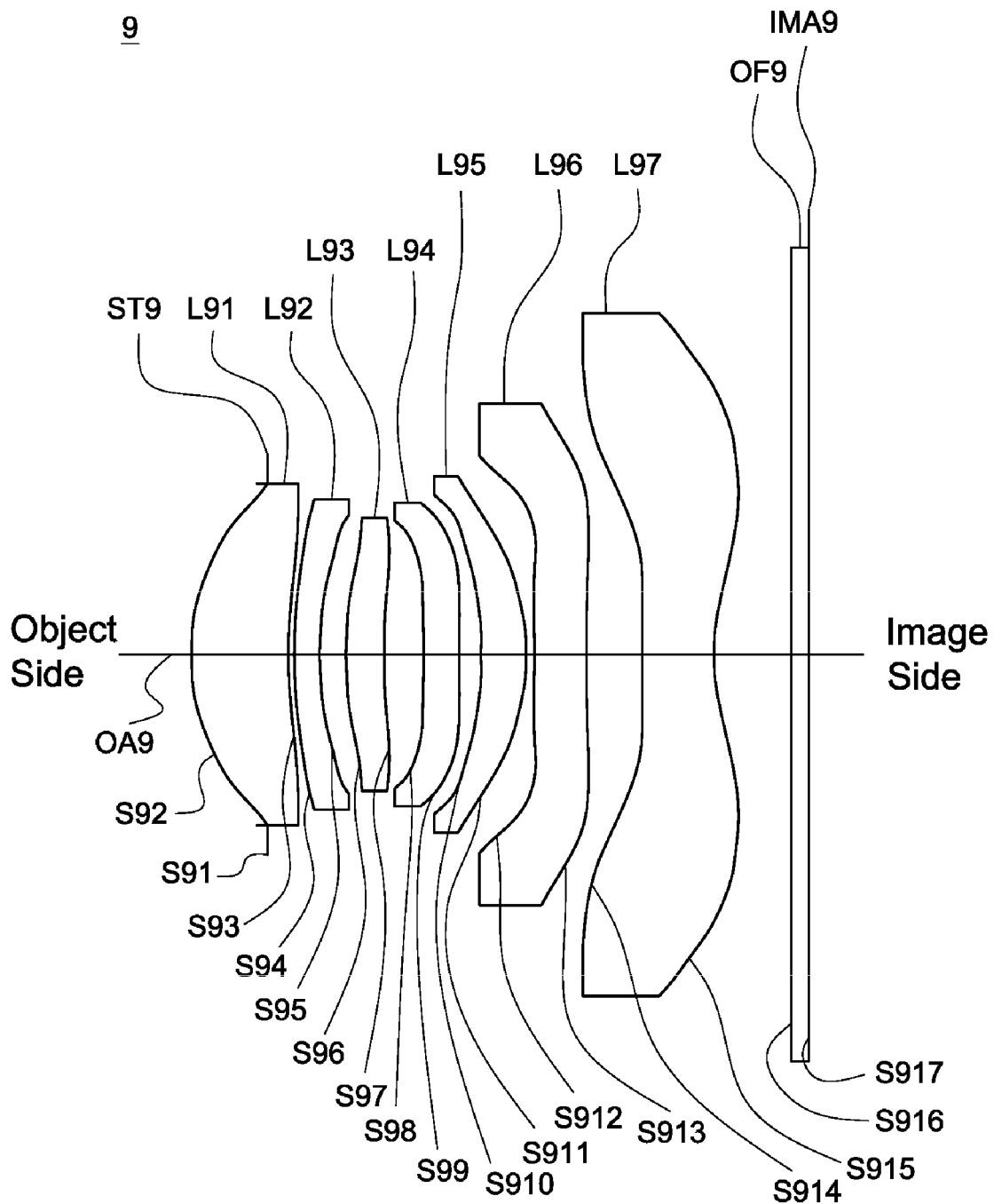
FIG. 13 is a lens layout diagram of a lens assembly in accordance with a ninth embodiment of the invention.

Referring to FIG. 13, FIG. 13 is a lens layout diagram of a lens assembly in accordance with a ninth embodiment of the invention. The lens assembly 9 includes a stop ST9, a first lens L91, a second lens L92, a third lens L93, a fourth lens L94, a fifth lens L95, a sixth lens L96, a seventh lens L97, and an optical filter OF7, all of which are arranged in order from an object side to an image side along an optical axis OA9. In operation, an image of light rays from the object side is formed at an image plane IMA9.

The first lens L91 is a meniscus lens with positive refractive power, wherein the object side surface S92 is a convex surface, the image side surface S93 is a concave surface, and both of the object side surface S92 and image side surface S93 are aspheric surfaces.

The second lens L92 is a meniscus lens with negative refractive power, wherein the object side surface S94 is a convex surface, the image side surface S95 is a concave surface, and both of the object side surface S94 and image side surface S95 are aspheric surfaces.

The third lens L93 is a meniscus lens with positive refractive power, wherein the object side surface S96 is a convex surface, the image side surface S97 is a concave surface, and both of the object side surface S96 and image side surface S97 are aspheric surfaces.

The fourth lens L94 is a meniscus lens with negative refractive power, wherein the object side surface S98 is a convex surface, the image side surface S99 is a concave surface, and both of the object side surface S98 and image side surface S99 are aspheric surfaces.

The fifth lens L95 is a meniscus lens with positive refractive power, wherein the object side surface S910 is a concave surface, the image side surface S911 is a convex surface, and both of the object side surface S910 and image side surface S911 are aspheric surfaces.

The sixth lens L96 is a biconcave lens with negative refractive power, wherein the object side surface S912 is a concave surface, the image side surface S913 is a concave surface, and both of the object side surface S912 and image side surface S913 are aspheric surfaces and at least one of which includes at least one inflection point. About two-thirds of the object side surface appearance within the effective optical diameter range is close to plane and the object side surface appearance is concave between two-thirds of the effective optical diameter of the object side surface and the periphery of the object side surface. About one-half of the image side surface appearance within the effective optical diameter range is close to plane and the image side surface appearance is convex between one-half of the effective optical diameter of the image side surface and the periphery of the image side surface. The object side surface away from the optical axis bends toward to the object side and that near the optical axis approximates to plane almost without bending. In terms of thickness, the thickness variation is very small near the optical axis and that is larger at the periphery of the lens, resulting in a thinner thickness near the optical axis and a thicker thickness away from the optical axis. In this way, it is beneficial to shorten total lens length of the lens assembly, achieve miniaturization of the lens assembly, and reduce chromatic aberration and aberration.

The seventh lens L97 is a meniscus lens with negative refractive power, wherein the object side surface S914 is a convex surface, the image side surface S915 is a concave surface, and both of the object side surface S914 and image side surface S915 are aspheric surfaces.

Both of the object side surface S916 and image side surface S917 of the optical filter OF9 are plane surfaces.

The third lens L93 and the fifth lens L95 have positive refractive power at the same time, which can greatly shorten the total lens length of the lens assembly 9.

In order to maintain excellent optical performance of the lens assembly in accordance with the ninth embodiment of the invention, the lens assembly 9 satisfies any of the conditions (1)-(2), (4), (10), and (15), wherein the definition for all of the parameters in the ninth embodiment is the same as that of in the first embodiment, and is not described here again. The lens assembly 9 further satisfies any of the following conditions:

$$1 < R9_{71}/R9_{12} < 3 \qquad (17)$$

$$0.6 < f9/(R9_{71} - R9_{72}) < 1.5 \qquad (18)$$

$$2 < (R9_{71} - R9_{12})/T9_7 < 6 \qquad (19)$$

$$4.5 \text{ mm} < TTL9/F9 < 6 \text{ mm} \qquad (20)$$

$$8 < f9_1/T9_7 < 13 \qquad (21)$$

$$2 < f9_3/f9 < 3.5 \qquad (22)$$

$$0 < D9_1/TTL9 < 1 \qquad (23)$$

$$1.1 < f9/D9_1 < 2.6 \qquad (24)$$

wherein $f9_3$ is an effective focal length of the third lens L93, $R9_{71}$ is a radius of curvature of the object side surface S914 of the seventh lens L97, $R9_{72}$ is a radius of curvature of the image side surface S915 of the seventh lens L97, $T9_7$ is a thickness of the seventh lens L97 along the optical axis OA9.

By the above design of the lenses, stop ST9, and satisfies any one of the conditions (1)-(2), (4), (10), (15), and (17)-(24), the lens assembly 9 is provided with an effective shortened total lens length, an effective decreased F-number, an effective decreased weight, an effective increased resolution, an effective corrected chromatic aberration, and an effective corrected aberration.

In order to achieve the above purposes and effectively enhance the optical performance, the lens assembly 9 in accordance with the ninth embodiment of the invention is provided with the optical specifications shown in Table 25, which include the effective focal length, F-number, total lens length, field of view, radius of curvature of each lens surface, thickness between adjacent surface, refractive index of each lens, and Abbe number of each lens.

TABLE 25

Effective Focal Length = 5.82 mm F-number = 1.45
Total Lens Length = 7.24 mm Field of View = 77 Degrees

| Surface Number | Radius of Curvature (mm) | Thickness (mm) | Nd | Vd | Remark |
|---|---|---|---|---|---|
| S91 | ∞ | −0.89468 | | | Stop ST9 |
| S92 | 2.548033 | 1.142674 | 1.543915 | 55.9512 | The First Lens L91 |
| S93 | 5.671993 | 0.05957 | | | |
| S94 | 4.435673 | 0.299702 | 2.00178 | 19.31 | The Second Lens L92 |
| S95 | 3.620021 | 0.315661 | | | |
| S96 | 4.411847 | 0.442426 | 1.543915 | 55.9512 | The Third Lens L93 |
| S97 | 8.046168 | 0.458031 | | | |
| S98 | 339.3143 | 0.428616 | 1.671339 | 19.24289 | The Fourth Lens L94 |
| S99 | 92.44737 | 0.247879 | | | |
| S910 | −6.01196 | 0.534379 | 1.543915 | 55.9512 | The Fifth Lens L95 |
| S911 | −2.5979 | 0.099879 | | | |
| S912 | −110.108 | 0.599483 | 1.671339 | 19.24289 | The Sixth Lens L96 |
| S913 | 43.43798 | 0.646262 | | | |
| S914 | 8.360571 | 0.84995 | 1.543915 | 55.9512 | The Seventh Lens L97 |
| S915 | 2.254038 | 0.9 | | | |
| S916 | ∞ | 0.21 | 1.5168 | 64.16734 | Optical Filter OF9 |
| S917 | ∞ | 0.014586 | | | |

The definition of aspheric surface sag z of each lens in table 25 is the same as that of in Table 1.

In the ninth embodiment, the conic constant k and the aspheric coefficients A, B, C, D, E, F, G, H, I, K, L, M of each surface are shown in Table 26, and the other aspheric coefficient J is equal to 0.

TABLE 26

| Surface Number | k | A E I | B F K | C G L | D H M |
|---|---|---|---|---|---|
| S92 | −5.52499 | 0.039323179 | −7.52E−03 | 1.70E−03 | −2.65E−04 |
| | | 3.91E−05 | −1.04E−06 | −1.34989E−06 | 0.00E+00 |
| | | 0 | 0 | 0 | 0 |
| S93 | −45.5681 | −0.024873111 | 0.023160294 | −0.011192685 | 0.002668238 |
| | | −0.000284515 | 3.35805E−06 | 7.30652E−07 | 0.00E+00 |
| | | 0 | 0 | 0 | 0 |
| S94 | −14.6929 | −0.033608695 | 0.029455766 | −0.013826259 | 0.003292554 |
| | | −0.000320985 | 2.34042E−05 | −3.34233E−06 | 0 |
| | | 0 | 0 | 0 | 0 |
| S95 | −2.52898 | −0.021372901 | 0.019064769 | −0.009470135 | 0.002641099 |
| | | −0.000389222 | 3.01269E−05 | 1.11438E−05 | 0 |
| | | 0 | −0.000316716 | 0.000107204 | 2.64963E−05 |
| S96 | −1.30626 | −0.010549213 | 0.005207476 | −0.005767418 | 0.002530782 |
| | | −0.001162473 | 0.000144167 | 4.19645E−05 | 0 |
| | | 0 | 0.000997777 | −0.000174671 | −4.58837E−05 |
| S97 | 4.082773 | −0.010250232 | 8.67E−04 | −0.004298489 | 2.41E−03 |
| | | −0.001174554 | 7.53E−05 | 5.51E−05 | 0 |
| | | 0 | −9.97E−04 | 1.33E−04 | −1.86E−04 |
| S98 | 0 | −0.042012974 | 8.25E−04 | −0.004316174 | 2.19E−03 |
| | | −0.001194599 | 2.53E−04 | −1.51E−05 | 0.00E+00 |
| | | 0 | 8.31E−04 | −3.88E−04 | 1.36E−06 |
| S99 | 0 | −0.045124497 | 0.002549972 | 0.000762709 | −0.001708059 |
| | | 0.000853551 | −0.0002402 | 2.34585E−05 | 0 |
| | | 0 | 4.84595E−05 | −2.45494E−05 | −9.17097E−05 |
| S910 | 0.323397 | −0.037981006 | 0.012587787 | 0.002721095 | −0.003025213 |
| | | 0.00082934 | −1.09E−04 | −4.12875E−07 | 0 |
| | | 0 | 0.000860719 | 0.000308703 | −6.92851E−05 |
| S911 | 0.019936 | 0.005611995 | −0.002776985 | 0.002768808 | −0.000614681 |
| | | 6.40E−05 | −7.21E−06 | 1.01741E−06 | 0 |
| | | 0 | −0.001734409 | −0.000257317 | −1.13031E−05 |
| S912 | 0 | 0.027766496 | −0.022975382 | 0.006717991 | −0.001782414 |
| | | 0.000251508 | −1.65E−05 | 8.92E−07 | 8.26E−09 |
| | | −4.21046E−09 | 0.000184276 | 0.000513691 | −1.85952E−05 |
| S913 | 0 | 0.017843892 | −0.007587542 | 0.000709963 | −1.90421E−05 |
| | | 3.10E−06 | −5.97E−07 | 3.34E−08 | 5.82E−11 |
| | | −4.28209E−11 | −0.00575294 | −0.000486045 | 2.87002E−05 |

TABLE 26-continued

| Surface Number | k | A E I | B F K | C G L | D H M |
|---|---|---|---|---|---|
| S914 | 3.412529 | −0.065958678<br>−5.79225E−06<br>−1.04464E−12 | 0.013350756<br>2.34E−07<br>−0.014109141 | −0.001422734<br>−4.41E−09<br>0.000714353 | 0.000102102<br>6.23E−12<br>−7.17272E−06 |
| S915 | −6.40586 | −0.027407355<br>−3.70E−06<br>−1.18744E−13 | 0.005207537<br>1.06E−07<br>−0.002577478 | −0.000767479<br>−1.25E−09<br>0.000256939 | 6.9475E−05<br>1.06E−12<br>−1.82546E−06 |

Table 27 shows the parameters and condition values for conditions (1)-(2), (4), (10), (15), and (17)-(24) in accordance with the ninth embodiment of the invention. As can be seen from Table 27, the lens assembly 9 of the ninth embodiment satisfies the conditions (1)-(2), (4), (10), (15), and (17)-(24).

TABLE 27

| | | | | | |
|---|---|---|---|---|---|
| $f9_1$ | 7.5039 mm | $f9_3$ | 17.1521 mm | $f9_6$ | −45.8287 mm |
| $f9$ | 5.82 mm | $R9_{12}$ | 5.671993 mm | $R9_{21}$ | 4.435673 mm |
| $R9_{22}$ | 3.620021 mm | $R9_{52}$ | −2.5979 mm | $R9_{62}$ | 43.43798 mm |
| $R9_{71}$ | 8.360571 mm | $R9_{72}$ | 2.254038 mm | $T9_5$ | 0.534379 mm |
| $T9_6$ | 0.599483 mm | $T9_7$ | 0.84995 mm | TTL9 | 7.24 mm |
| F9 | 1.45 | $D9_1$ | 3.986193 mm | AAG9 | 1.827282 mm |
| $G9_5$ | 0.099879 mm | | | | |
| $R9_{71}/R9_{12}$ | 1.47 | $f9/(R9_{71} - R9_{72})$ | 0.95 | $(R9_{71} - R9_{12})/T9_7$ | 3.16 |
| TTL9/F9 | 4.99 mm | $f9_1/T9_7$ | 8.83 | $f9_3/f9$ | 2.95 |
| $D9_1$/TTL9 | 0.55 | $f9/D9_1$ | 1.46 | $D9_1/T9_6$ | 6.65 |
| $f9 \times ((f9_1 - f9_6)/(T9_5 + T9_6 - R9_{62} + R9_{52}))$ | | | | | −6.91 mm |
| $|AAG9 \times (R9_{21} + R9_{22})/(R9_{21} - R9_{22})|$ | | | | | 18.05 mm |
| $(f9_1 - f9_6)/((T9_5 + T9_6)/G9_5)$ | | | | | 4.70 mm |
| $(f9_1 - f9_6)/(T9_5 + T9_6 - R9_{62} + R9_{52})$ | | | | | −1.19 |

Figure 14A:
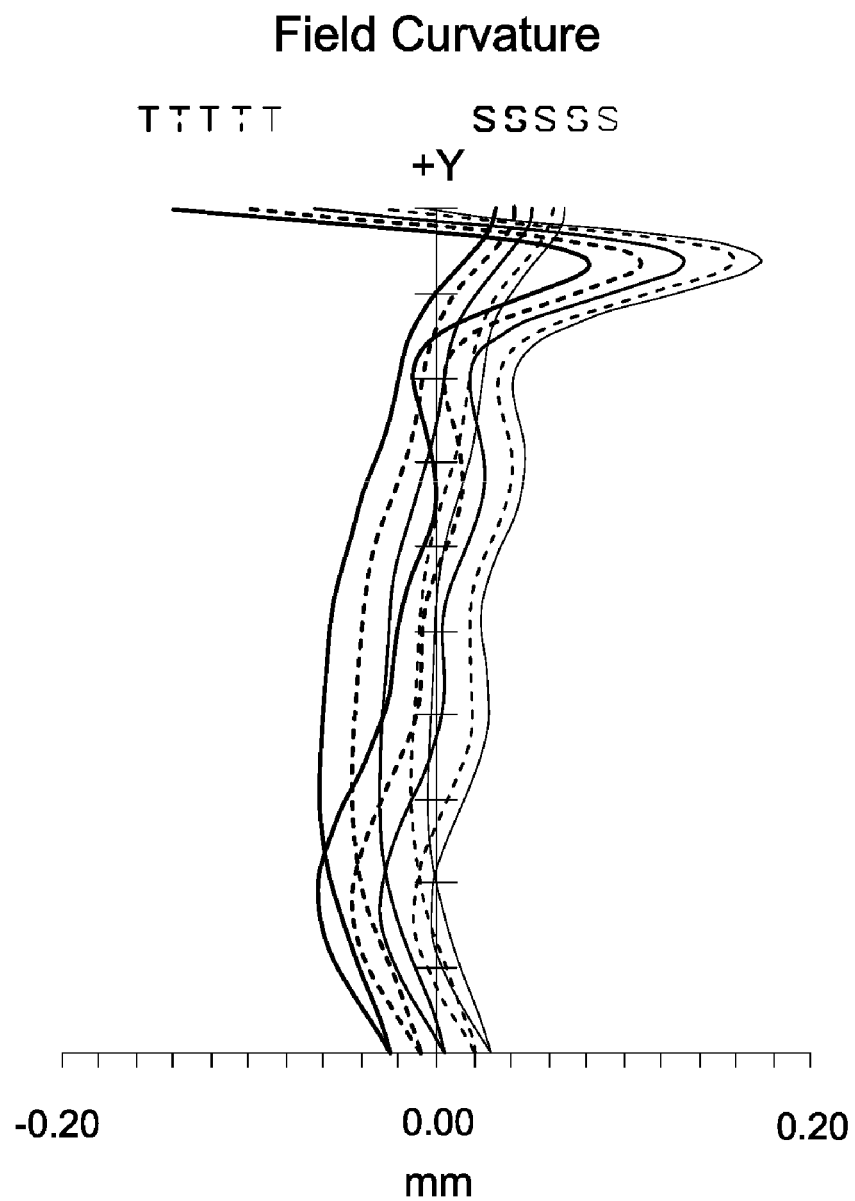
FIG. 14A depicts a field curvature diagram of the lens assembly in accordance with the ninth embodiment of the invention.
Figure 14B:
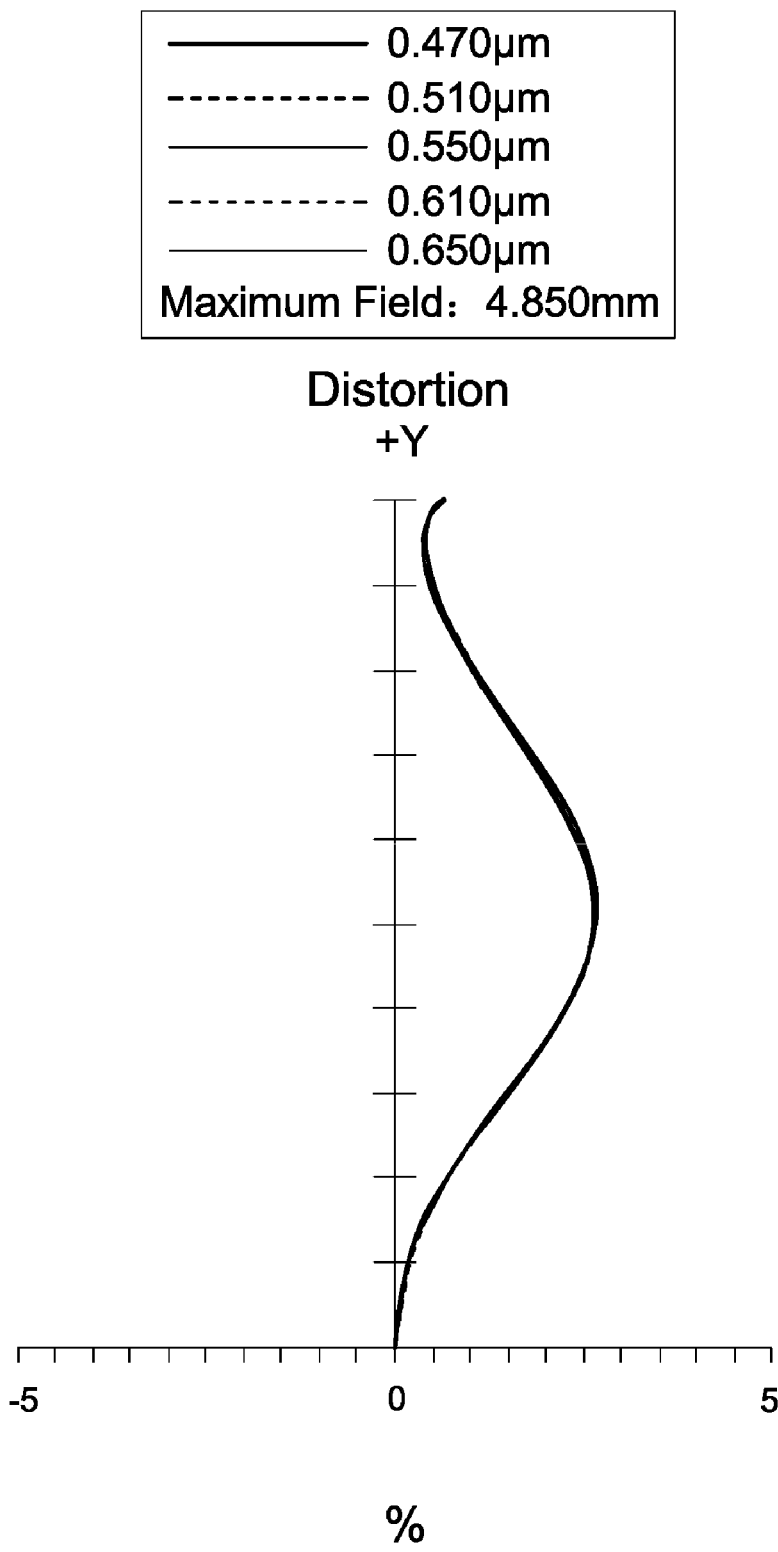
FIG. 14B is a distortion diagram of the lens assembly in accordance with the ninth embodiment of the invention.

By the above arrangements of the lenses and stop ST9, the lens assembly 9 of the ninth embodiment can meet the requirements of optical performance as seen in FIGS. 14A-14C, wherein FIG. 14A shows a field curvature diagram of the lens assembly 9 in accordance with the ninth embodiment of the invention, FIG. 14B shows a distortion diagram of the lens assembly 9 in accordance with the ninth embodiment of the invention, and FIG. 14C shows a modulation transfer function diagram of the lens assembly 9 in accordance with the ninth embodiment of the invention.

It can be seen from FIG. 14A that the field curvature of tangential direction and sagittal direction in the lens assembly 9 of the ninth embodiment ranges from −0.14 mm to 0.18 mm.

It can be seen from FIG. 14B (the five lines in the figure almost coincide to appear as if a signal line) that the distortion in the lens assembly 9 of the ninth embodiment ranges from 0% to 3%.

It can be seen from FIG. 14C that the modulation transfer function of tangential direction and sagittal direction in the lens assembly 9 of the ninth embodiment ranges from 0.04 to 1.0.

It is obvious that the field curvature and the distortion of the lens assembly 9 of the ninth embodiment can be corrected effectively, and the resolution of the lens assembly 9 of the ninth embodiment can meet the requirement. Therefore, the lens assembly 9 of the ninth embodiment is capable of good optical performance.

Figure 15:
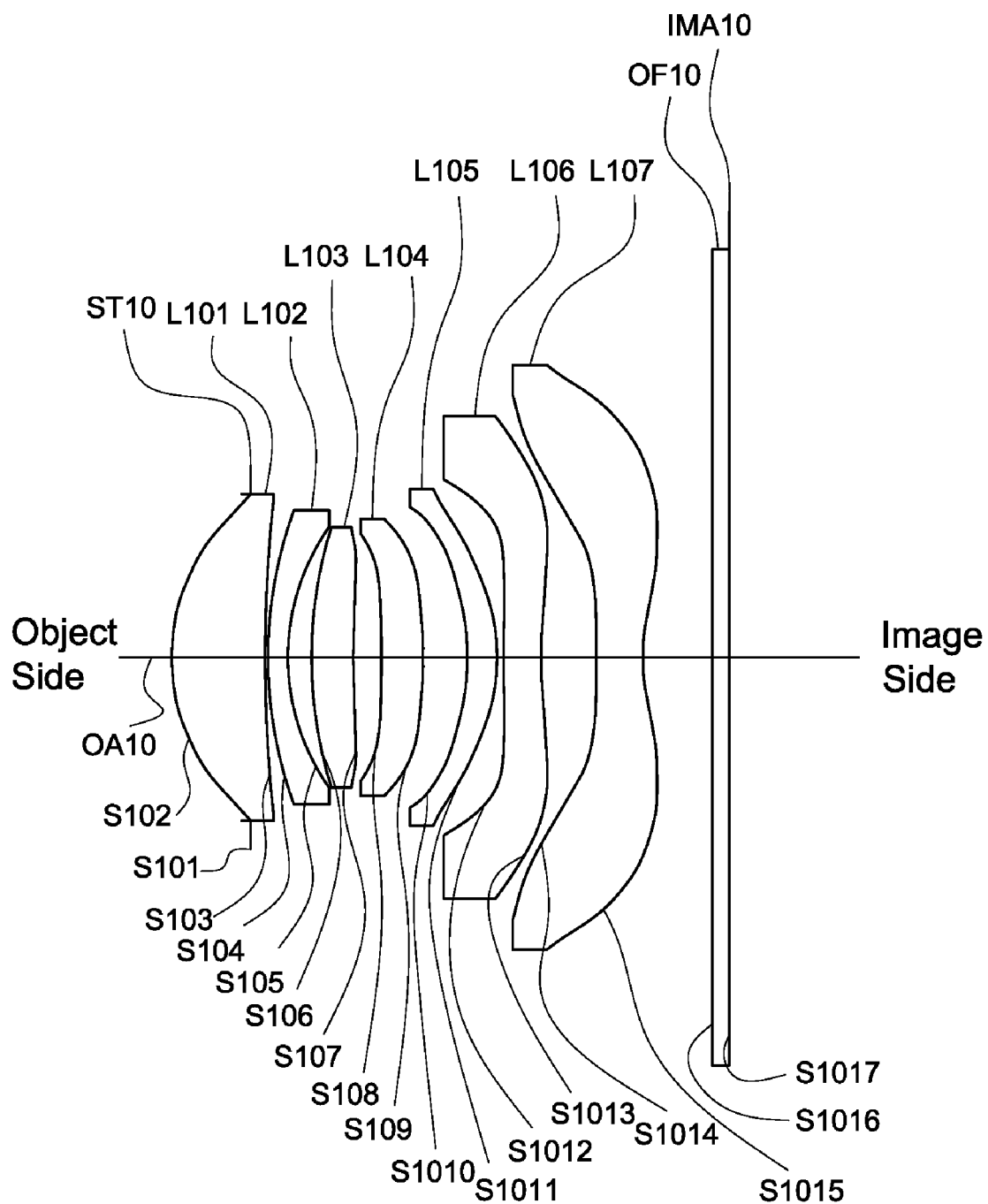
FIG. 15 is a lens layout diagram of a lens assembly in accordance with a tenth embodiment of the invention.

Referring to FIG. 15, FIG. 15 is a lens layout diagram of a lens assembly in accordance with a tenth embodiment of the invention. The lens assembly 10 includes a stop ST10, a first lens L101, a second lens L102, a third lens L103, a fourth lens L104, a fifth lens L105, a sixth lens L106, a seventh lens L107, and an optical filter OF10, all of which are arranged in order from an object side to an image side along an optical axis OA10. In operation, an image of light rays from the object side is formed at an image plane IMA10.

The first lens L101 is a meniscus lens with positive refractive power, wherein the object side surface S102 is a convex surface, the image side surface S103 is a concave surface, and both of the object side surface S102 and image side surface S103 are aspheric surfaces.

The second lens L102 is a meniscus lens with negative refractive power, wherein the object side surface S104 is a convex surface, the image side surface S105 is a concave surface, and both of the object side surface S104 and image side surface S105 are aspheric surfaces.

The third lens L103 is a meniscus lens with positive refractive power, wherein the object side surface S106 is a convex surface, the image side surface S107 is a concave surface, and both of the object side surface S106 and image side surface S107 are aspheric surfaces.

The fourth lens L104 is a meniscus lens with positive refractive power, wherein the object side surface S108 is a concave surface, the image side surface S109 is a convex surface, and both of the object side surface S108 and image side surface S109 are aspheric surfaces.

The fifth lens L105 is a meniscus lens with positive refractive power, wherein the object side surface S1010 is a concave surface, the image side surface S1011 is a convex surface, and both of the object side surface S1010 and image side surface S1011 are aspheric surfaces.

The sixth lens L106 is a meniscus lens with negative refractive power, wherein the object side surface S1012 is a convex surface, the image side surface S1013 is a concave surface, and both of the object side surface S1012 and image side surface S1013 are aspheric surfaces and at least one of which includes at least one inflection point. About two-thirds of the object side surface appearance within the effective optical diameter range is close to plane and the object side surface appearance is concave between two-thirds of the effective optical diameter of the object side surface and the periphery of the object side surface. About one-half of the image side surface appearance within the effective optical diameter range is close to plane and the image side surface appearance is convex between one-half of the effective optical diameter of the image side surface and the periphery of the image side surface. The object side surface away from the optical axis bends toward to the object side and that near the optical axis approximates to plane almost without bending. In terms of thickness, the thickness variation is very small near the optical axis and that is larger at the periphery of the lens, resulting in a thinner thickness near the optical axis and a thicker thickness away from the optical axis. In this way, it is beneficial to shorten total lens length of the lens assembly, achieve miniaturization of the lens assembly, and reduce chromatic aberration and aberrations.

The seventh lens L107 is a meniscus lens with negative refractive power, wherein the object side surface S1014 is a convex surface, the image side surface S1015 is a concave surface, and both of the object side surface S1014 and image side surface S1015 are aspheric surfaces.

Both of the object side surface S1016 and image side surface S1017 of the optical filter OF10 are plane surfaces.

The third lens L103 and the fifth lens L105 have positive refractive power at the same time, which can greatly shorten the total lens length of the lens assembly 10.

In order to maintain excellent optical performance of the lens assembly in accordance with the tenth embodiment of the invention, the lens assembly 10 satisfies any one of the conditions (1)-(2), (4), (10), (15), and (17)-(24), wherein the definition for all of the parameters in the tenth embodiment is the same as that of in the ninth embodiment, and is not described here again.

By the above design of the lenses, stop ST10, and satisfies any one of the conditions (1)-(2), (4), (10), (15), and (17)-(24), the lens assembly 10 is provided with an effective shortened total lens length, an effective decreased F-number, an effective decreased weight, an effective increased resolution, an effective corrected chromatic aberration, and an effective corrected aberration.

In order to achieve the above purposes and effectively enhance the optical performance, the lens assembly 10 in accordance with the tenth embodiment of the invention is provided with the optical specifications shown in Table 28, which include the effective focal length, F-number, total lens length, field of view, radius of curvature of each lens surface, thickness between adjacent surface, refractive index of each lens, and Abbe number of each lens.

TABLE 28

Effective Focal Length = 5.78 mm F-number = 1.45
Total Lens Length = 6.79 mm Field of View = 79.9 Degrees

| Surface Number | Radius of Curvature (mm) | Thickness (mm) | Nd | Vd | Remark |
|---|---|---|---|---|---|
| S101 | ∞ | −0.96756 | | | Stop ST10 |
| S102 | 2.380064 | 1.096488 | 1.543915 | 55.9512 | The First Lens L101 |
| S103 | 6.031325 | 0.061471 | | | |
| S104 | 3.662098 | 0.257887 | 2.00178 | 19.31 | The Second Lens L102 |
| S105 | 2.799102 | 0.28191 | | | |
| S106 | 4.834512 | 0.504507 | 1.543915 | 55.9512 | The Third Lens L103 |
| S107 | 12.07359 | 0.345555 | | | |
| S108 | −20.6406 | 0.498825 | 1.671339 | 19.24289 | The Fourth Lens L104 |
| S109 | −7.64501 | 0.526855 | | | |
| S1010 | −3.5965 | 0.368713 | 1.543915 | 55.9512 | The Fifth Lens L105 |
| S1011 | −2.28708 | 0.072011 | | | |
| S1012 | 20.16057 | 0.467028 | 1.671339 | 19.24289 | The Sixth Lens L106 |
| S1013 | 7.151391 | 0.649368 | | | |
| S1014 | 8.48296 | 0.577132 | 1.543915 | 55.9512 | The Seventh Lens L107 |
| S1015 | 2.122182 | 0.85 | | | |
| S1016 | ∞ | 0.21 | 1.5168 | 64.16734 | Optical Filter OF10 |
| S1017 | ∞ | 0.026731 | | | |

The definition of aspheric surface sag z of each lens in table 28 is the same as that of in Table 1.

In the tenth embodiment, the conic constant k and the aspheric coefficients A, B, C, D, E, F, G, H, I, K, L, M of each surface are shown in Table 29, and the other aspheric coefficient J is equal to 0.

TABLE 29

| Surface Number | k | A E I | B F K | C G L | D H M |
|---|---|---|---|---|---|
| S102 | −4.31122 | 0.03922954 | −6.57E−03 | 1.66E−03 | −2.90E−04 |
| | | 4.07E−05 | 7.65E−07 | −1.90315E−06 | 0.00E+00 |
| | | 0 | 0 | 0 | 0 |

TABLE 29-continued

| Surface Number | k | A<br>E<br>I | B<br>F<br>K | C<br>G<br>L | D<br>H<br>M |
|---|---|---|---|---|---|
| S103 | −15.643 | −0.028072513<br>−0.000287501<br>0 | 0.023475555<br>2.98427E−06<br>0 | −0.011046486<br>8.30534E−07<br>0 | 0.002655116<br>0<br>0 |
| S104 | −10.7066 | −0.036959984<br>−0.000332345<br>0 | 0.029673991<br>1.73781E−05<br>0.010091799 | −0.013615412<br>−2.61323E−06<br>−0.000595706 | 0.00330822<br>0<br>0.000340108 |
| S105 | −5.46829 | −0.022178812<br>−0.000364569<br>0 | 0.021946332<br>6.77907E−05<br>0.015579423 | −0.009693849<br>4.3033E−06<br>0.004577968 | 0.002585103<br>0<br>0.000419741 |
| S106 | 1.642241 | −0.005237239<br>−0.001186505<br>0 | 0.004245456<br>4.6494E−05<br>−0.000788169 | −0.004298886<br>4.87242E−05<br>−0.003564187 | 0.003076486<br>0<br>0.001070998 |
| S107 | 31.73051 | −0.003629891<br>−0.001107412<br>0 | −1.63E−03<br>5.53E−05<br>−6.54E−03 | −0.003410631<br>3.18E−05<br>−4.02E−03 | 2.86E−03<br>0<br>−2.42E−04 |
| S108 | 0 | −0.036360383<br>−0.000965163<br>0 | 4.27E−04<br>3.43E−04<br>5.32E−03 | −0.005306498<br>−6.03E−05<br>5.89E−03 | 2.31E−03<br>0.00E+00<br>−1.59E−03 |
| S109 | 0 | −0.025878012<br>0.001004044<br>0 | 0.000617314<br>−0.000210001<br>0.001318826 | −0.000133959<br>9.16213E−06<br>−0.001031097 | −0.001652855<br>0<br>−0.001110626 |
| S1010 | −6.33405 | −0.037014625<br>0.00091132<br>0 | 0.008058445<br>−3.62E−05<br>−0.006920945 | 0.001500358<br>−1.96115E−05<br>0.014924544 | −0.002787207<br>0<br>−0.004520907 |
| S1011 | −0.05259 | 0.039680471<br>1.32E−04<br>0 | −0.001417036<br>−2.36E−07<br>−0.0261086 | 0.001375386<br>−7.30968E−07<br>0.000214653 | −0.000607057<br>0<br>−0.00134764 |
| S1012 | 0 | −0.021573167<br>0.000251851<br>1.13654E−07 | −0.02766884<br>−2.13E−05<br>−0.001067114 | 0.007160344<br>−1.13E−06<br>0.033860299 | −0.001509528<br>−2.38E−07<br>−0.003761116 |
| S1013 | 0 | 0.004630346<br>5.03E−06<br>−9.16716E−11 | −0.002563568<br>−4.35E−07<br>−0.01831332 | 0.000359076<br>2.99E−08<br>−0.005431011 | −3.52936E−05<br>−1.01E−09<br>0.000252156 |
| S1014 | 1.984473 | −0.066537055<br>−5.58435E−06<br>4.57444E−12 | 0.012670409<br>2.22E−07<br>−0.053875278 | −0.001447743<br>−5.90E−09<br>0.008528705 | 0.000107166<br>−4.67E−12<br>−0.000316372 |
| S1015 | −6.11817 | −0.011793564<br>−3.58E−06<br>1.67436E−11 | 0.004286361<br>8.23E−08<br>−0.051494129 | −0.000755792<br>−3.69E−09<br>0.00151892 | 7.65222E−05<br>−6.33E−11<br>−0.000216916 |

Table 30 shows the parameters and condition values for conditions (1)-(2), (4), (10), (15), and (17)-(24) in accordance with the tenth embodiment of the invention. As can be seen from Table 30, the lens assembly 10 of the tenth embodiment satisfies the conditions (1)-(2), (4), (10), (15), and (17)-(24).

TABLE 30

| | | | | | |
|---|---|---|---|---|---|
| $f10_1$ | 6.511 mm | $f10_3$ | 14.4131 mm | $f10_6$ | −16.5716 mm |
| f10 | 5.78 mm | $R10_{12}$ | 6.031325 mm | $R10_{21}$ | 3.662098 mm |
| $R10_{22}$ | 2.799102 mm | $R10_{52}$ | −2.28708 mm | $R10_{62}$ | 7.151391 mm |
| $R10_{71}$ | 8.48296 mm | $R10_{72}$ | 2.122182 mm | $T10_5$ | 0.368713 mm |
| $T10_6$ | 0.467028 mm | $T10_7$ | 0.577132 mm | TTL10 | 6.79 mm |
| F10 | 1.45 | $D10_1$ | 3.956 mm | AAG10 | 1.93717 mm |
| $G10_5$ | 0.072011 mm | | | | |
| $R10_{71}/R10_{12}$ | 1.41 | $f10/(R10_{71} - R10_{72})$ | 0.91 | $(R10_{71} - R10_{12})/T10_7$ | 4.25 |
| TTL10/F10 | 4.68 mm | $f10_1/T10_7$ | 11.28 | $f10_3/10$ | 2.49 |
| $D10_1$/TTL10 | 0.58 | $f10/D10_1$ | 1.46 | $D10_1/T10_6$ | 8.47 |
| | | $f10 \times ((f10_1 - f10_6)/(T10_5 + T10_6 - R10_{62} + R10_{52}))$ | | −15.51 mm | |
| | | $|AAG10 \times (R10_{21} + R10_{22})/(R10_{21} - R10_{22})|$ | | 14.50 mm | |
| | | $(f10_1 - f10_6)/((T10_5 + T10_6)/G10_5)$ | | 1.99 mm | |
| | | $(f10_1 - f10_6)/(T10_5 + T10_6 - R10_{62} + R10_{52})$ | | −2.68 | |

Figure 16A:
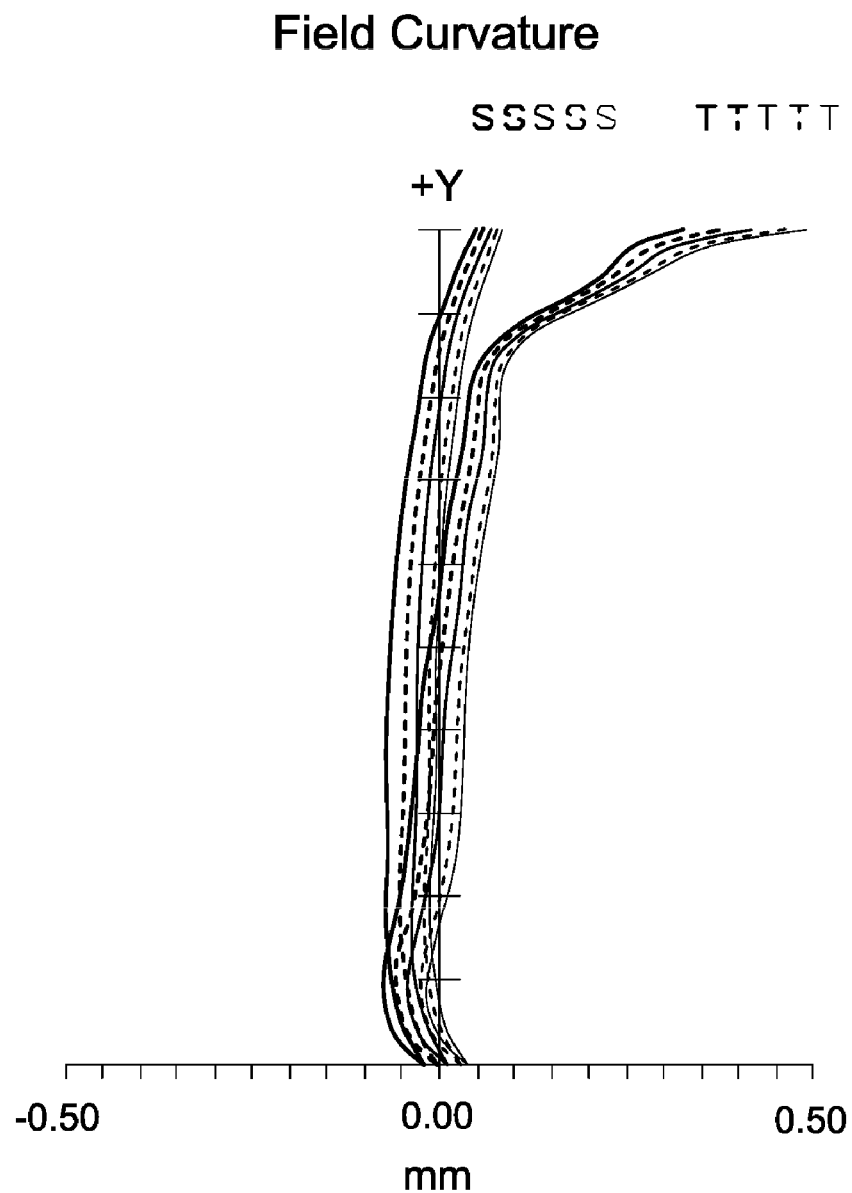
FIG. 16A depicts a field curvature diagram of the lens assembly in accordance with the tenth embodiment of the invention.
Figure 16B:
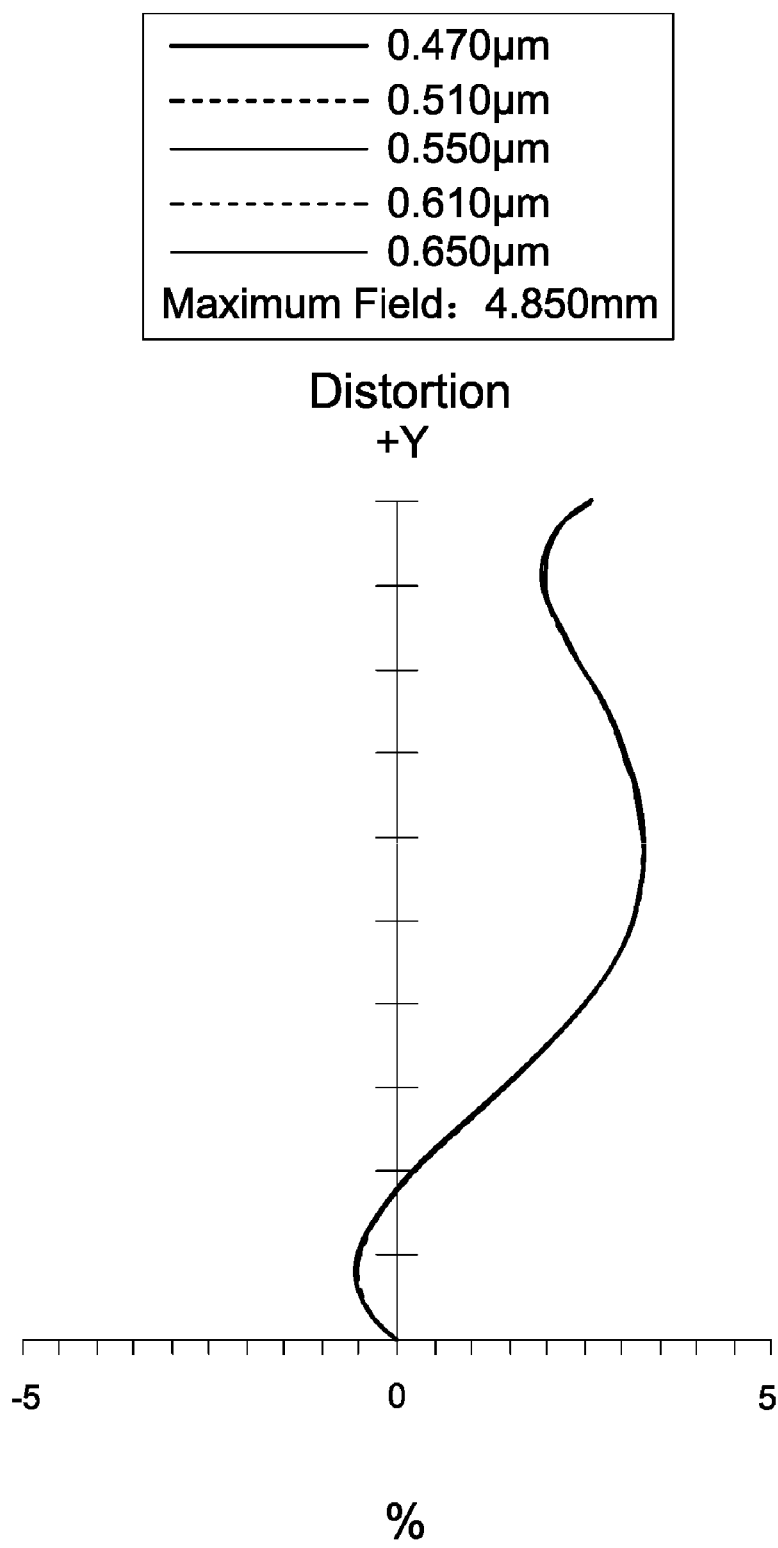
FIG. 16B is a distortion diagram of the lens assembly in accordance with the tenth embodiment of the invention.
Figure 16C:
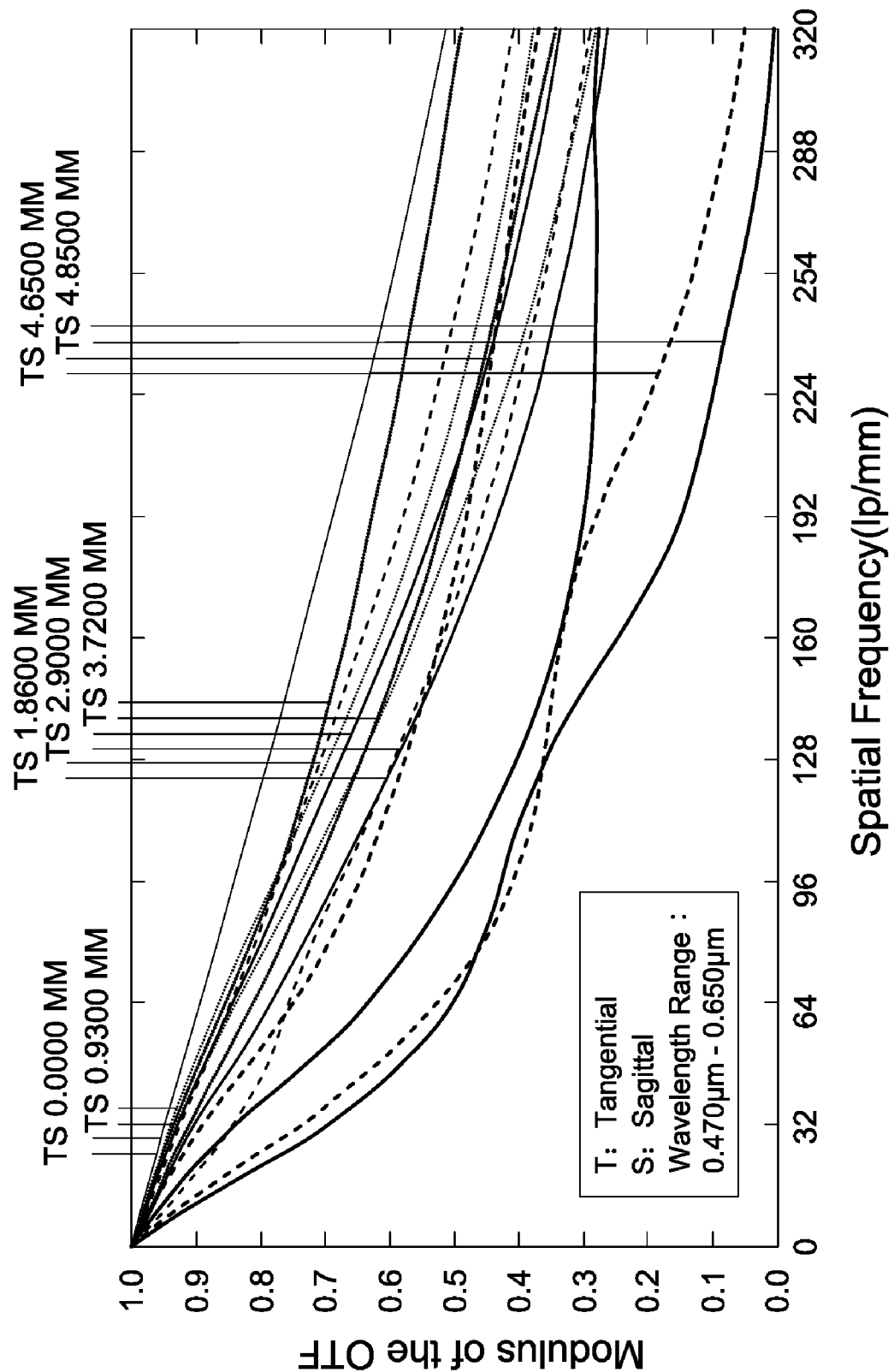
FIG. 16C is a modulation transfer function diagram of the lens assembly in accordance with the tenth embodiment of the invention.

By the above arrangements of the lenses and stop ST10, the lens assembly 10 of the tenth embodiment can meet the requirements of optical performance as seen in FIGS. 16A-16C, wherein FIG. 16A shows a field curvature diagram of the lens assembly 10 in accordance with the tenth embodiment of the invention, FIG. 16B shows a distortion diagram of the lens assembly 10 in accordance with the tenth embodiment of the invention, and FIG. 16C shows a modulation transfer function diagram of the lens assembly 10 in accordance with the tenth embodiment of the invention.

It can be seen from FIG. 16A that the field curvature of tangential direction and sagittal direction in the lens assembly 10 of the tenth embodiment ranges from −0.1 mm to 0.5 mm.

It can be seen from FIG. 16B (the five lines in the figure almost coincide to appear as if a signal line) that the distortion in the lens assembly 10 of the tenth embodiment ranges from −1% to 3.5%.

It can be seen from FIG. 16C that the modulation transfer function of tangential direction and sagittal direction in the lens assembly 10 of the tenth embodiment ranges from 0.01 to 1.0.

It is obvious that the field curvature and the distortion of the lens assembly 10 of the tenth embodiment can be corrected effectively, and the resolution of the lens assembly 10 of the tenth embodiment can meet the requirement. Therefore, the lens assembly 10 of the tenth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
   a first lens which is a meniscus lens with positive refractive power and comprises a convex surface facing an object side and a concave surface facing an image side;
   a second lens which is with refractive power;
   a third lens which is with refractive power;
   a fourth lens which is with positive refractive power and comprises a convex surface facing the object side;
   a fifth lens which is with positive refractive power and comprises a convex surface in a paraxial region facing the image side and a concave surface facing the object side; and
   a sixth lens which is with negative refractive power and comprises a convex surface along an optical axis facing the object side and a concave surface facing the image side;
   wherein the first lens, the second lens, the third lens, the fourth lens, the fifth lens, and the sixth lens are arranged in order from the object side to the image side along the optical axis;
   wherein the lens assembly satisfies following conditions:

$10 \text{ mm} < (R_{11}+R_{12}+R_{52}+R_{62}) \times ((T_5+T_6)/G_5) < 29 \text{ mm};$ $13.97 \text{ mm} < |AAG \times (R_{21}+R_{22})/(R_{21}-R_{22})| < 20 \text{ mm};$ wherein $T_6$ is a thickness of the sixth lens along the optical axis, $T_5$ is a thickness of the fifth lens along the optical axis, $R_{52}$ is a radius of curvature of the convex surface of the fifth lens, $R_{62}$ is a radius of curvature of the concave surface of the sixth lens, $R_{11}$ is a radius of curvature of the convex surface of the first lens, $R_{12}$ is a radius of curvature of the concave surface of the first lens, $G_5$ is an air interval from the convex surface of the fifth lens to an object side surface of the sixth lens along the optical axis, AAG is a total air interval from the concave surface of the first lens to an object side surface of a lens which is closest to the image side along the optical axis, $R_{21}$ is a radius of curvature of an object side surface of the second lens, and $R_{22}$ is a radius of curvature of an image side surface of the second lens.

2. The lens assembly as claimed in claim 1, wherein:
   the second lens is a meniscus lens with negative refractive power and comprises a convex surface facing the object side and a concave surface facing the image side;
   the third lens is with positive refractive power and comprises a convex surface facing the object side; and
   the lens assembly satisfies at least one of following conditions:

$1.2 < f/D_1 < 2.5;$ $-10 < F \times ((f_1-f_6)/(T_5+T_6-R_{62}+R_{52})) < -3;$ $-5 < (f_1-f_6)/(T_5+T_6-R_{62}+R_{52}) < -1;$ $1.3 \text{ mm} < (f_1-f_6)/((T_5+T_6)/G_5) < 5 \text{ mm};$ $3 < D_1/T_6 < 9$ $-3.5 < (f_1+f_5+f_6)/(T_5+T_6-R_{62}+R_{52}) < -1.5;$ wherein $G_5$ is the air interval from the convex surface of the fifth lens to the object side surface of the sixth lens along the optical axis, $D_1$ is an effective optical diameter of the convex surface of the first lens, f is an effective focal length of the lens assembly, $f_1$ is an effective focal length of the first lens, $f_6$ is an effective focal length of the sixth lens, $f_5$ is an effective focal length of the fifth lens, $T_5$ is the thickness of the fifth lens along the optical axis, $R_{52}$ is the radius of curvature of the convex surface of the fifth lens, $R_{62}$ is the radius of curvature of the concave surface of the sixth lens, and F is a F-number of the lens assembly.

3. The lens assembly as claimed in claim 2, wherein:
   the lens assembly further comprises a seventh lens disposed between the fourth lens and the fifth lens, wherein the seventh lens is with negative refractive power;
   the fourth lens comprises a convex surface facing the object side;
   the fifth lens further comprises a concave surface facing the object side; and
   the sixth lens further comprises a convex surface facing the object side.

4. The tens assembly as claimed in claim 2, wherein the lens assembly satisfies:

$-20 \text{ mm} < f \times ((f_1-f_6)/(T_5+T_6-R_{62}+R_{52})) < -5 \text{ mm};$ wherein $T_5$ is the thickness of the fifth lens along the optical axis, $T_6$ is the thickness of the sixth lens along the optical axis, $R_{52}$ is the radius of curvature of the convex surface of the fifth lens, $R_{62}$ is the radius of curvature of the concave surface of the sixth lens, f is the effective focal length of the lens assembly, $f_1$ is the effective focal length of the first lens, and $f_6$ is the effective focal length of the sixth lens.

5. The lens assembly as claimed in claim 3, wherein the lens assembly satisfies:

$-1.8 \text{ mm} < (R_{52}+R_{62}) \times (R_{31}/f_1) < 0 \text{ mm};$ wherein $f_1$ is an effective focal length of the first lens, $R_{31}$ is a radius of curvature of the convex surface of the third lens, $R_{52}$ is a radius of curvature of the convex surface of the fifth lens, and $R_{62}$ is a radius of curvature of the concave surface of the sixth lens.

6. The lens assembly as claimed in claim 5, wherein the lens assembly satisfies:

$37 \text{ mm} < |f \times (R_{21}+R_{22})/(R_{21}-R_{22})| < 55 \text{ mm};$ $16 < |F \times (R_{21}+R_{22})/(R_{21}-R_{22})| < 25;$ wherein f is an effective focal length of the lens assembly, F is a F-number of the lens assembly, $R_{21}$ is a radius of curvature of an object side surface of the second lens, and $R_{22}$ is a radius of curvature of an image side surface of the second lens.

7. The lens assembly as claimed in claim 3, wherein the lens assembly satisfies:

$$0 \text{ mm} < |f_{234}| < 50 \text{ mm}$$

$$-35 \text{ mm} < (f_1 \times f_6)/(T_1 + T_2 + T_6) < -6 \text{ mm};$$

$$-3.5 < (R_{11} + R_{12})/(R_{52} - R_{62}) < -1;$$

$$0.5 < TTL/(R_{62} - R_{52}) < 1.9;$$

wherein $f_{234}$ is an effective focal length of a combination of the second lens, the third lens, and the fourth lens, $f_1$ is an effective focal length of the first lens, $f_6$ is an effective focal length of the sixth lens, $T_1$ is a thickness of the first lens along the optical axis, $T_2$ is a thickness of the second lens along the optical axis, $T_6$ is a thickness of the sixth lens along the optical axis, $R_{11}$ is a radius of curvature of the convex surface of the first lens, $R_{12}$ is a radius of curvature of the concave surface of the first lens, $R_{52}$ is a radius of curvature of the convex surface of the fifth lens, $R_{62}$ is a radius of curvature of the concave surface of the sixth lens, and TTL is an interval from the convex surface of the first lens to an image plane along the optical axis.

8. The lens assembly as claimed in claim 1, wherein:
the second lens is a meniscus lens with negative refractive power and comprises a convex surface facing the object side and a concave surface facing the image side;
the third lens is a meniscus lens with positive refractive power and comprises a convex surface facing the object side and a concave surface facing the image side; and
the lens assembly further comprises a seventh lens disposed between the sixth lens and the image side, wherein the seventh lens is a meniscus lens with negative refractive power and comprises a convex surface facing the object side and a concave surface facing the image side.

9. The lens assembly as claimed in claim 8, wherein:
the fourth lens is a meniscus lens with negative refractive power and comprises a convex surface facing the object side and a concave surface facing the image side;
the fifth lens further comprises a concave surface facing the object side; and
the sixth lens further comprises a concave surface facing the object side.

10. The lens assembly as claimed in claim 8, wherein:
the fourth lens is a meniscus lens with positive refractive power and comprises a concave surface facing the object side and a convex surface facing the image side;
the fifth lens further comprises a concave surface facing the object side; and
the sixth lens further comprises a convex surface facing the object side.

11. The lens assembly as claimed in claim 8, wherein the lens assembly satisfies:

$$4.5 \text{ mm} < TTL/F < 6 \text{ mm};$$

$$0 < D_1/TTL < 1;$$

wherein TTL is an interval from the convex surface of the first lens to an image plane along the optical axis, F is a F-number of the lens assembly, and $D_1$ is an effective optical diameter of the convex surface of the first lens.

12. The lens assembly as claimed in claim 8, wherein the lens assembly satisfies:

$$2 < (R_{71} - R_{12})/T_7 < 6;$$

$$8 < f_1/T_7 < 13;$$

$$2 < f_3/f < 3.5;$$

wherein f is an effective focal length of the lens assembly, $f_1$ is an effective focal length of the first lens, $f_3$ is an effective focal length of the third lens, $T_7$ is a thickness of the seventh lens along the optical axis, $R_{12}$ is a radius of curvature of the concave surface of the first lens, and $R_{71}$ is a radius of curvature of the convex surface of the seventh lens.

* * * * *